(12) United States Patent
Rakib

(10) Patent No.: US 9,584,869 B2
(45) Date of Patent: *Feb. 28, 2017

(54) VIRTUAL CCAP CABLE MODEM TERMINATION SYSTEM WITH SOFTWARE RECONFIGURABLE MAC

(71) Applicant: Gainspeed, Inc., Sunnyvale, CA (US)

(72) Inventor: Shlomo Selim Rakib, Saratoga, CA (US)

(73) Assignee: Gainspeed, Inc., Sunnyvale, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 14/171,740

(22) Filed: Feb. 3, 2014

(65) Prior Publication Data

US 2014/0150047 A1    May 29, 2014

Related U.S. Application Data

(63) Continuation-in-part of application No. 14/098,656, filed on Dec. 6, 2012, now Pat. No. 8,938,769, and a
(Continued)

(51) Int. Cl.
*H04N 21/61* (2011.01)
*H04N 21/2383* (2011.01)
(Continued)

(52) U.S. Cl.
CPC ..... *H04N 21/6118* (2013.01); *H04N 21/2383* (2013.01); *H04N 21/478* (2013.01); *H04N 21/4782* (2013.01); *H04N 21/4786* (2013.01)

(58) Field of Classification Search
None
See application file for complete search history.

(56) References Cited

U.S. PATENT DOCUMENTS 5,793,958 A    8/1998 Clement et al.
5,991,308 A    11/1999 Fuhrmann et al.
(Continued)

FOREIGN PATENT DOCUMENTS

EP    1241566    9/2002
EP    2526694    11/2012
(Continued)

OTHER PUBLICATIONS

Harris, F., Dick, C, Rice, M. "Digital Receivers and Transmitters Using Polyphase Filter Banks for Wireless Communications" IEEE Transactions on Microwave Theory and Techniques, 51(4), pp. 1395-1412, 2003.
Portions of prosecution history of U.S. Appl. No. 12/692,582, Jul. 17, 2012, Rakib, Selim Shlomo.
Portions of prosecution history of U.S. Appl. No. 13/555,170, Dec. 30, 2013, Rakib, Sholomo Selim.
(Continued)

Primary Examiner — Omar S Parra

(57) ABSTRACT

Distributed and software reconfigurable remote CMTS (CMRTS) device, based on MAC and PHY units with FPGA and DSP components, for a HFC CATV network. The various CATV RF modulators, such as QAM modulators, may be located entirely at the fiber nodes if desired. Although a basic set of CATV QAM data waveforms may optionally be transmitted to the nodes using a first fiber, in a preferred embodiment, all data may be transmitted to the nodes using other protocols such as Ethernet protocols. The nodes will extract the data specific to each neighborhood and inject this data into the cable portion of the system as RF waveforms, such as RF QAM channels. A computerized "virtual shelf" control system for managing and reconfiguring the FPGA and DSP based CMTRS units, as well as a new type of edge router based all-digital virtual head end (virtual converged cable access platform) is also disclosed.

26 Claims, 25 Drawing Sheets

Related U.S. Application Data continuation-in-part of application No. 13/674,936, filed on Nov. 12, 2012, now Pat. No. 8,782,729, and a continuation-in-part of application No. 13/756,302, filed on Jan. 31, 2013, now Pat. No. 8,910,230, and a continuation-in-part of application No. 13/964,394, filed on Aug. 12, 2013, which is a continuation-in-part of application No. 13/346,709, filed on Jan. 9, 2012, now Pat. No. 8,510,786, application No. 14/171,740, which is a continuation-in-part of application No. 13/555,170, filed on Jul. 22, 2012, now Pat. No. 8,644,706, which is a continuation-in-part of application No. 13/035,993, filed on Feb. 27, 2011, now Pat. No. 8,365,237, application No. 14/171,740, which is a continuation-in-part of application No. 13/400,415, filed on Feb. 20, 2012, now Pat. No. 8,863,213, and a continuation-in-part of application No. 12/907,970, filed on Oct. 19, 2010, now Pat. No. 8,826,359, which is a continuation-in-part of application No. 12/692,582, filed on Jan. 22, 2010, now Pat. No. 8,311,412, application No. 14/171,740, which is a continuation-in-part of application No. 13/478,461, filed on May 23, 2012, now Pat. No. 8,773,965, said application No. 14/098,656 is a continuation of application No. PCT/US2013/069760, filed on Nov. 12, 2013.

(60) Provisional application No. 61/870,226, filed on Aug. 26, 2013, provisional application No. 61/551,395, filed on Oct. 25, 2011, provisional application No. 61/385,125, filed on Sep. 21, 2012, provisional application No. 61/622,132, filed on Apr. 10, 2012.

(51) Int. Cl.
*H04N 21/478* (2011.01)
*H04N 21/4782* (2011.01)
*H04N 21/4786* (2011.01)

(56) References Cited

U.S. PATENT DOCUMENTS

| | | | |
|---|---|---|---|
| 6,490,727 | B1 | 12/2002 | Nazarathy et al. |
| 6,993,016 | B1 | 1/2006 | Liva et al. |
| 7,072,337 | B1 | 7/2006 | Arutyunov et al. |
| 7,089,577 | B1 | 8/2006 | Rakib et al. |
| 7,146,630 | B2 | 12/2006 | Dravida et al. |
| 7,149,223 | B2 | 12/2006 | Liva et al. |
| 7,197,045 | B2 | 3/2007 | Amit |
| 7,539,208 | B2 | 5/2009 | Chapman et al. |
| 7,583,704 | B1 | 9/2009 | Walker et al. |
| 7,742,407 | B2 | 6/2010 | Versteeg et al. |
| 8,311,412 | B2 | 11/2012 | Rakib |
| 8,578,437 | B2 | 11/2013 | Nielsen et al. |
| 8,588,198 | B2 | 11/2013 | Salinger |
| 8,644,706 | B2 | 2/2014 | Rakib |
| 8,782,729 | B2 | 7/2014 | Rakib |
| 8,910,230 | B2 | 12/2014 | Rakib |
| 8,935,739 | B1 | 1/2015 | Rakib |
| 8,938,769 | B2 | 1/2015 | Rakib |
| 9,191,113 | B1 | 11/2015 | Rakib |
| 2003/0033379 | A1 | 2/2003 | Civanlar et al. |
| 2003/0066087 | A1* | 4/2003 | Sawyer .............. H04N 7/17309 725/111 |
| 2003/0200336 | A1 | 10/2003 | Pal et al. |
| 2004/0141747 | A1 | 7/2004 | Kenny et al. |
| 2004/0177133 | A1 | 9/2004 | Harrison et al. |
| 2004/0202202 | A1* | 10/2004 | Kolze ................. H04J 3/0638 370/503 |
| 2004/0244043 | A1* | 12/2004 | Lind .................. H04L 12/2801 725/111 |
| 2005/0246756 | A1 | 11/2005 | Leddy et al. |
| 2005/0283816 | A1 | 12/2005 | Weinstein et al. |
| 2006/0056323 | A1 | 3/2006 | Currivan |
| 2006/0067698 | A1 | 3/2006 | Chan et al. |
| 2007/0032256 | A1 | 2/2007 | Kolze |
| 2007/0189770 | A1 | 8/2007 | Sucharczuk et al. |
| 2007/0223512 | A1 | 9/2007 | Cooper et al. |
| 2008/0138071 | A1 | 6/2008 | Lee et al. |
| 2008/0216144 | A1 | 9/2008 | Weinstein et al. |
| 2009/0074095 | A1 | 3/2009 | Geile et al. |
| 2009/0205007 | A1 | 8/2009 | Woodward |
| 2010/0031305 | A1 | 2/2010 | Liva et al. |
| 2010/0061234 | A1 | 3/2010 | Pai et al. |
| 2011/0078755 | A1 | 3/2011 | Dai |
| 2012/0093150 | A1 | 4/2012 | Kini |
| 2012/0216225 | A1 | 8/2012 | Britt |
| 2013/0070640 | A1 | 3/2013 | Chapman |
| 2013/0070765 | A1 | 3/2013 | Chapman et al. |
| 2013/0070825 | A1 | 3/2013 | Chapman |
| 2013/0074138 | A1 | 3/2013 | Chapman |
| 2013/0125194 | A1 | 5/2013 | Finkelstein et al. |
| 2014/0150041 | A1 | 5/2014 | Rakib |
| 2015/0172071 | A1 | 6/2015 | Rakib |
| 2015/0172072 | A1 | 6/2015 | Rakib |

FOREIGN PATENT DOCUMENTS

| | | |
|---|---|---|
| WO | WO 03/009527 | 1/2003 |
| WO | WO 2010/027534 | 3/2010 |
| WO | WO 2011/091447 | 7/2011 |
| WO | WO 2013/126310 | 8/2013 |
| WO | WO 2014/075106 | 5/2014 |

OTHER PUBLICATIONS

Portions of prosecution history of U.S. Appl. No. 14/170,579, Jan. 20, 2015, Rakib, Sholomo Selim.
Portions of prosecution history of U.S. Appl. No. 14/098,656, Dec. 2, 2014, Rakib, Sholomo Selim.
Portions of prosecution history of U.S. Appl. No. 14/461,114, Dec. 4, 2014, Rakib, Sholomo Selim.
International Search Report and Written Opinion for PCT/US2011/029113, Jun. 9, 2011 (mailing date), Rakib, Selim Shlomo.
Portions of prosecution history of EP11735370.6, Nov. 28, 2014 (mailing date), Rakib, Selim Shlomo.
International Search Report and Written Opinion for PCT/US2013/026608, Apr. 24, 2013 (mailing date), Rakib, Shlomo.
International Search Report for PCT/US2013/069760, Mar. 28, 2014 (mailing date), Gainspeed, Inc.
Author Unknown, "Data-Over-Cable Service Interface Specifications, CMAP Arichitecture Technical Report CM-TR-CMAP-V01-101222," Dec. 22, 2010, 48 pages, Cable Television Laboratories.
Author Unknown, "Data-Over-Cable Service Interface Specifications, Converged Cable Access Platform Arichitecture Technical Report CM-TR-CMAP-V02-110614," Jun. 14, 2011, 46 pages, Cable Television Laboratories.
U.S. Appl. No. 14/328,494, filed Jul. 10, 2014, Rakib, Shlomo Selim.
Portions of prosecution history of U.S. Appl. No. 14/328,494, Jan. 11, 2016, Rakib, Shlomo Selim.
Portions of prosecution history of U.S. Appl. No. 14/546,991, Aug. 31, 2015, Rakib, Shlomo Selim.
Portions of prosecution history of U.S. Appl. No. 14/579,028, Mar. 15, 2016, Rakib, Shlomo Selim.
Portions of prosecution history of U.S. Appl. No. 14/579,707, Mar. 4, 2016, Rakib, Shlomo Selim.
Updated portions of prosecution history of U.S. Appl. No. 14/170,579, Jan. 4, 2016, Rakib, Shlomo Selim.
Updated portions of prosecution history of EP11735370.6, Feb. 23, 2016 (mailing date), Rakib, Selim Shlomo.

* cited by examiner

Simplified CATV spectrum diagram

Prior Art (downstream)

VIRTUAL CCAP CABLE MODEM TERMINATION SYSTEM WITH SOFTWARE RECONFIGURABLE MAC

CROSS REFERENCE TO RELATED APPLICATIONS

This application is a continuation in part of U.S. patent application Ser. No. 13/555,170 "DISTRIBUTED CABLE MODEM TERMINATION SYSTEM WITH SOFTWARE RECONFIGURABLE MAC AND PHY CAPABILITY", inventor Shlomo Selim Rakib, filed Jul. 22, 2012; and application Ser. No. 13/555,170 is also a continuation in part of U.S. patent application Ser. No. 13/035,993 "METHOD OF CATV CABLE SAME-FREQUENCY TIME DIVISION DUPLEX DATA TRANSMISSION", inventor Shlomo Selim Rakib, filed Feb. 27, 2011, now U.S. Pat. No. 8,365,237; application Ser. No. 13/555,170 also claimed the priority benefit of U.S. provisional application 61/511,395 "IMPROVED HYBRID FIBER CABLE SYSTEM AND METHOD", inventor Shlomo Selim Rakib, filed Jul. 25, 2011; This application is also a continuation in part of U.S. patent application Ser. No. 14/098,656 "VIRTUAL CONVERGED CABLE ACCESS PLATFORMS FOR HFC CABLE NETWORKS", filed Dec. 6, 2013; application Ser. No. 14/098,656 in turn was a continuation of PCT application PCT/US13/69760, "VIRTUAL CONVERGED CABLE ACCESS PLATFORMS FOR HFC CABLE NETWORKS", filed Nov. 12, 2013, inventor Shlomo Selim Rakib; this application also claims the priority benefit of U.S. provisional patent application 61/870,226 "VIRTUAL HFC CONVERGED CABLE ACCESS PLATFORM", inventor Shlomo Selim Rakib, filed Aug. 26, 2013; this application is also a continuation in part of U.S. patent application Ser. No. 13/674,936 "HYBRID ALL DIGITAL FIBER TO CATV CABLE SYSTEM AND METHOD", filed Nov. 12, 2012; this application is also a continuation in part of U.S. patent application Ser. No. 13/756,302 "METHOD OF TRANSFORMING HFC CATV ANALOG FIBER TRANSMISSION TO DIGITAL FIBER TRANSMISSION", inventor Shlomo Selim Rakib, filed Jan. 31, 2013; this application is also a continuation in part of U.S. patent application Ser. No. 13/964,394 "HFC CABLE SYSTEM WITH ALTERNATIVE WIDEBAND COMMUNICATIONS PATHWAYS AND COAX DOMAIN AMPLIFIER-REPEATERS", inventor Shlomo Selim Rakib, filed Aug. 12, 2013; application Ser. No. 13/964,394 is also a continuation in part of U.S. patent application Ser. No. 13/346,709 "HFC CABLE SYSTEM WITH WIDEBAND COMMUNICATIONS PATHWAYS AND COAX DOMAIN NODES, filed Jan. 9, 2012, now U.S. Pat. No. 8,510,786; this application is also a continuation in part of U.S. patent application Ser. No. 13/400,415 "METHODS OF ADAPTIVE CANCELLING AND SECONDARY COMMUNICATIONS CHANNELS FOR EXTENDED CAPABILITY HFC CABLE SYSTEMS", inventor Shlomo Selim Rakib, filed Feb. 20, 2012; this application is also a continuation in part of U.S. patent application Ser. No. 12/907,970 "HFC CABLE SYSTEM WITH SHADOW FIBER AND COAX FIBER TERMINALS", inventor Shlomo Selim Rakib, filed Oct. 19, 2010; application Ser. No. 12/907,970 was a continuation in part of application Ser. No. 12/692,582 "Distributed Cable Modem Termination System", inventor Shlomo Selim Rakib, filed Jan. 22, 2010, now U.S. Pat. No. 8,311,412; application Ser. No. 12/907,970 also claimed the priority benefit of U.S. provisional application 61/385,125 "IMPROVED HYBRID FIBER CABLE SYSTEM AND METHOD", inventor Shlomo Selim Rakib, filed Sep. 21, 2010; this application is also a continuation in part of U.S. patent application Ser. No. 13/478,461 "EFFICIENT BANDWIDTH UTILIZATION METHODS FOR CATV DOCSIS CHANNELS AND OTHER APPLICATIONS", inventor Shlomo Selim Rakib, filed May 23, 2012; U.S. patent application Ser. No. 13/478,461 claimed the priority benefit of U.S. provisional application 61/622,132 "EFFICIENT BANDWIDTH UTILIZATION METHODS FOR CATV DOCSIS CHANNELS AND OTHER APPLICATIONS", inventor Shlomo Selim Rakib, filed Apr. 10, 2012; the contents of all of these applications are incorporated in their entirety by reference.

BACKGROUND OF THE INVENTION

Cable television (CATV), originally introduced in the late 1940's as a way to transmit television signals by coaxial cables to houses in areas of poor reception, has over the years been modified and extended to enable the cable medium to transport a growing number of different types of digital data, including both digital television and broadband Internet data.

One of the most significant improvements occurred in the 1990's, when a number of major electronics and cable operator companies, working through CableLabs, a non-profit R&D consortium, introduced the Data Over Cable Service Interface Specification (DOCSIS). First introduced in the late 1990's as DOCSIS version 1.0, and upgraded many times since (currently at DOCSIS version 3.0, with a draft DOCSIS 3.1 specification released in 2013), the DOCSIS standard defines the Physical Layers (PHY) and Media Access Control (MAC) layers needed to send relatively large amounts of digital data through coaxial cables that were originally designed to handle analog standard definition television channels.

Originally, analog television (in the US) transmitted television channels as a series of roughly 6 MHz bandwidth radiofrequency waveforms at frequencies ranging from about 54 MHz (originally used for VHF Channel 2) up to about 885 MHz for now no-longer used UHF channel 83. This television signal was transmitted as a combination amplitude modulated signal (for the black and white portion), quadrature-amplitude modulated signal (for the color portion), and frequency modulated signal (for the audio portion), and this combined signal will be designated as a Frequency Division Multiplexed (FDM) signal.

With the advent of digital television and high definition television standardization in the late 1980's and early 1990's, the basic 6 MHz bandwidth spectrum of analog television was retained, but the modulation scheme was changed to a more sophisticated and higher data rate Quadrature Amplitude Modulation (QAM) scheme, which can encode digital information onto a very complex QAM analog signal (waveform).

The DOCSIS standard built upon this analog and digital TV foundation, and specified additional standards to provide broadband Internet services (Internet protocols, or IP), voice over IP, custom video on demand, and other modern services based upon the QAM data transmission waveforms (generally also 6 MHz wide) previously established for digital and high definition television.

As a result, by a series of steps, simple coaxial cables, originally run at great expense to millions of households starting from the 1950's and 1960's, has been gradually upgraded to accommodate ever increasing demands for digital data. At each house (or apartment, office, store, restaurant or other location), the household connects to the CATV cable by a cable modem, uses the cable modem to extract downstream DOCSIS digital data (frequently used for high-speed Internet), and inject upstream DOCSIS digital data (again frequently used for high-speed Internet applications).

Unfortunately, even in a coax cable, there is a finite amount of bandwidth available to transmit data. Coax cables and their associated radiofrequency interface equipment have typically only used the frequency range under about 1000 MHz, and so there are limits to how much data the 1950's era coaxial cable can ultimately transmit.

By contrast, optical fiber (fiber optics, fiber) technology, which uses much higher optical frequencies (with wavelengths typically in the 800-2000 nanometer range), can transmit a much higher amount of data. Optical fiber data rates typically are in the tens or even hundreds of gigabits per second. Indeed, the entire RF CATV cable spectrum from 0 to 1000 MHz can be converted to optical wavelengths (such as 1310 nm or 1550 nm), be carried over an optical fiber, and then be converted back to the full RF CATV cable spectrum at the other end of the fiber, without coming close to exhausting the ability of the optical fiber to carry additional data.

This conversion process can be achieved by relatively simple optical to digital or digital to optical converters, in which the CATV RF waveforms are simply converted back and forth to a light signal by simple ("dumb") E/O or O/E converters, located in nodes that connect optical fibers to CATV cable (fiber nodes).

The higher data carrying capacity of optical fibers allows additional data to be carried as well, and in some schemes, the essentially analog (digital encoded in analog) spectrum of CATV waveforms is carried at one optical wavelength (such as 1310 nm), and digital data encoded by entirely different protocols may be carried at an alternate optical wavelength (such as 1550 nm). This dual scheme is often referred to as wavelength-division multiplexing.

Optical fiber technology has been widely used for high capacity computer networks, and these networks often do not use the DOCSIS protocols or QAM protocols to transmit data. Rather, these high capacity computer networks use entirely different types of data transmission protocols, such as the Ethernet protocols IEEE 802.3ah, 1000BASE-LX10, 1000Base-BX10, and others. These networks and protocols are often referred to as GigE networks, which is an abbreviation of the Gigabyte speeds and Ethernet protocols used for fiber based computer network.

Thus if a user desires to transfer computer data from RF QAM waveforms transported over a CATV cable to a high speed GigE fiber network, the data must be transformed back and forth between the DOCSIS cable QAM waveforms and the alternate protocols (often Ethernet protocols) used in fiber GigE networks.

Although ideally, the best way to satisfy the ever increasing household demand for digital data (e.g. video—on demand, high speed Internet, voice over IP, etc.) would be by extending optical fiber to each household, this would be an incredibly expensive solution. By contrast, cable based CATV solutions have already been implemented for tens of millions of households, and this expense has already been borne and amortized over decades of use, starting from the 1950s. As a result, it is far more economically attractive to find schemes enable the existing, if bandwidth limited, CATV cable system, to be further extended to meet the ever growing demands for additional data.

Cable System Components:

At the "head" end of a typical CATV cable network (cable), the challenging task of combining the many different types of data (analog television channels, digital television channels, on-demand channels, voice over IP, DOCSIS channels, etc.) and sending this data to users (households) scattered through many different neighborhoods in various regions of towns, cities, counties and even states is handled, in part, by Cable Modem Termination Systems (CMTS) devices. These CMTS devices connect to the various data sources (television stations, video servers, the Internet, etc.) at one end, and to many different CATV cables at the other end.

Typically the CMTS device will have a connection to the various data sources and appropriate data switches (such as a Level 2/3 switch) at one end, and often a plurality of different line cards (often physically packaged to look like blade servers, and put into a main CTMS box that holds multiple line cards) at the other end. Each line card will typically be connected to either cables or optical fibers that travel away from the cable head towards various groups of multiple neighborhoods, where typically each group of multiple neighborhoods will be in a roughly contiguous geographic region. The line card cables or optical fibers are then typically subdivided further by various splitters and nodes, and eventually the signals flow to the individual neighborhoods, each served by its own CATV cable.

At the neighborhood level, an individual CATV cable will serve between about 25 and a few hundred households (houses, apartments). These connect to the individual cable by cable modems. Here each cable modem will be considered to be a household or "house", regardless of if the cable modem serves a house, apartment, office, workplace, or other application.

The CMTS line cards will typically contain at least the MAC and PHY devices needed to transmit and receive the appropriate CATV signals. Typically the line card PHY devices will contain a plurality of QAM modulators that can modulate the digital signals that a Level 2/3 switch has sent to that particular line card, and send the signals out over cable or fiber as a plurality of QAM channels. The line cards will also typically contain MAC and PHY devices to receive upstream data sent back to the cable head from the various cables and cable modems in the field.

It is impractical to directly connect each individual neighborhood CATV cable directly to the cable head. Rather cable networks are arranged in more complex schemes, where the signals to and from many different individual neighborhoods are combined by the network prior to reaching the cable head. Thus each CMTS line card will typically send and receive signals to and from multiple neighborhoods.

Instead of sending and receiving data by cable, the various CMTS line cards can instead communicate to their various groups of neighborhoods by optical fiber. However it is also impractical to run individual fibers directly from individual neighborhoods to the cable head as well. Thus fiber networks are also usually arranged in more complex schemes, where the signals to and from different individual neighborhoods are also combined by the optical fiber network before the signals reach the cable head.

At a minimum, the optical fiber network will at least typically split (or combine) the fiber signals, often by "dumb" optical fiber splitters/combiners (here called splitters) that do not alter the fiber signal, and the split signal then will be sent by sub-fibers to the various neighborhoods. There, the optical fiber signal can be converted to and from a RF signal (suitable for the individual cable) by a "dumb"

fiber node that itself simply converts the optical to RF and RF to optical signals without otherwise altering their content. These hybrid optical fiber to cable networks are called Hybrid Fiber Cable (HFC) networks.

Prior art work with various types of CMTS systems and fiber nodes includes Liva et. al., U.S. Pat. No. 7,149,223; Sucharczuk et. al. US patent application 2007/0189770; and Amit, U.S. Pat. No. 7,197,045.

Typically, nearly all CATV users want immediate access to at least a standard set of cable television channels, and thus to satisfy this basic expectation, usually all CATV cables will receive a basic set of television channels that correspond to this "basic" or "standard" package (which may include various commonly used premium channels as well). Additionally, most users will wish access to a wide range of individualized data, and here the limited bandwidth of the CATV cable starts to become more of a nuisance.

As a first step towards more efficient cable utilization, analog television is being phased out, freeing much FDM bandwidth (analog standard definition TV channels) that can be replaced by more efficient QAM channels carrying both digital TV and DOCSIS data. However phasing out old-fashioned FDM TV signals, although freeing up additional cable bandwidth, will at most satisfy the ever increasing household demand for digital TV and DOCSIS services (data) for only a few years. Thus additional methods to supply a greater amount of data, in particular on-demand video data, voice over IP data, broadband Internet (IP) data, and other data, are desirable.

DOCSIS Standards:

Unless otherwise specified references herein to "DOCSIS" will refer to both the Cablelabs DOCSIS® 3.0 specifications and the Cablelabs draft DOCSIS 3.1 specifications.

The DOCSIS 3.0 specifications are more specifically defined in the following publications: Data-Over-Cable Service Interface Specifications DOCSIS 3.0 Security Specification CM-SP-SECv3.0-I13-100611; Cable Modem to Customer Premise Equipment Interface Specification CM-SP-CMCIv3.0-I01-080320; Physical Layer Specification CM-SP-PHYv3.0-I10-111117; MAC and Upper Layer Protocols Interface Specification CM-SP-MULPIv3.0-I18-120329; Operations Support System Interface Specification CM-SP-OSSIv3.0-I18-120329. Additional documentation can be found in the DOCSIS 3.0 Technical Reports CM-TR-MGMTv3.0-DIFF-V01-071228; and CM-TR-OSSIv3.0-CM-V01-080926.

The DOCSIS 3.1 specifications are more specifically defined in the following Data-Over-Cable Service Interface Specifications DOCSIS® 3.1 publications published on Oct. 29, 2013: Physical Layer Specification CM-SP-PHYv3.1-I01-131029; and MAC and Upper Layer Protocols Interface Specification CM-SP-MULPIv3.1-I01-131029.

For purposes of this specification, features that implement an otherwise compatible subset of the DOCSIS 3.0 or DOCSIS 3.1 specification are termed a DOCSIS subset, and features that implement either additional functions not specified in DOCSIS 3.0 or DOCSIS 3.1, or incompatible with DOCSIS 3.0 or DOCSIS 3.1, are termed "non-DOCSIS functionality".

Remotely Situated QAM Modulators:

Liva et. al., in U.S. Pat. No. 6,933,016 taught a method of transmitting an information channel by a unique method of processing the information channel, transmitting the information channel to a destination by packet techniques, and then reconstructing the channel. Additionally Sawyer, in US Publication 2003/0066087, taught a hybrid distributed cable modem termination system having mini fiber nodes containing CMTS modulators remotely located from the head end.

Field-Programmable Gate Array (FPGA) Technology:

Field-programmable gate arrays (FPGA), a type of programmable logic device (PLD), are integrated circuit devices and "chips" designed to allow the configuration of the chip's various internal electrical circuits to be reconfigured after the chip has been manufactured. FPGAs contain programmable logic blocks with reconfigurable connections that allow the wiring between the various logic gates in the blocks to be rewired, even after the chip has been incorporated into other devices. In addition to digital functions, FPGA can handle analog functions. Various mixed signal FPGA, with integrated analog to digital converters (ADC) and digital to analog converters (DAC) are also available. Examples of FPGA include the popular Artix, Kintex, Virtex, and Spartan series of chips produced by Xilinx Inc., San Jose, Calif., the popular Cyclone, Arria, Stratix series of chips produced by Altera Corporation, San Jose Calif., and others.

Digital Signal Processor (DSP) Technology:

Digital signal processor (DSP) devices and "chips" are microprocessors with an architecture that is specialized for high speed digital signal processing. Although standard processors can perform complex signal processing as well, due to the nature of the standard instruction set hardware, complex signal processing often requires a large (hundreds, thousands, or more) number of instructions to perform complex functions. By contrast, DSP chips often contain at least some specialized hardware for digital signal processing, including circular buffers, separate program and data memories (e.g. Harvard architecture), very long instruction words (VLIW), various types of single instruction multiple data (SIMD) instructions, fast multiply-accumulate (MAC) hardware, bit reversed addressing, special loop controls, and the like. This specialized hardware allow complex signal processing to be done in a relatively few number of operations, thus often speeding up complex computations by many orders of magnitude in time. To further reduce processing time DSP are often constructed without memory management units, thus avoiding time delays due to memory management unit induced context switching.

Examples of DSP include the popular C6000 series of DSP produced by Texas Instruments, Inc, Dallas Tex., the StarCore DSP produced by Freescale Semiconductor Holdings, Ltd., Austin Tex., and others.

Examples of the use of FPGA and DSP to produce dynamically reconfigurable communications devices include Dick, U.S. Pat. No. 7,583,725, and Raha et. al., U.S. Pat. No. 7,724,815, both assigned to Xilinx, the contents of both of which are incorporated herein by reference.

BRIEF SUMMARY OF THE INVENTION

Here, a new type of highly flexible and reconfigurable distributed functionality CMTS system and method for HFC networks is disclosed. This system and method divides the various CMTS functions between cable head CMTS devices, and remote fiber node CMTS (here called Cable Modem Remote Termination Systems, or CMRTS) devices, under an overall computer-controlled, device and network configuration and data distribution scheme.

In some embodiments, this computer controlled signal and data distribution scheme may be configured to maximize the granularity (neighborhood specificity) of customized data delivered to individual CATV cables serving individual neighborhoods. In this type of configuration, often the system and method can be further configured to preserve backward compatibility with legacy HFC networks and devices, as well as to gracefully degrade from a higher level of standard and customized data delivery service, to the prior art level of standard and customized data delivery service, under many different CMRTS device failure scenarios. This type of configuration allows existing HFC networks to be gradually upgraded to provide improved custom (IP-on demand) service to selected neighborhoods on a cost effective basis, and can eventually allow all neighborhoods to be upgraded as demand and financing allows.

In some embodiments, the invention may be configured to work with legacy head ends and accommodate legacy optical fiber waveforms on the optical fiber portion of the HFC system. Such legacy optical fiber waveforms may often include, for example, the optical fiber equivalent of CATV RF waveforms that have simply been frequency shifted and transduced to HFC optical fiber frequencies or wavelengths. In other embodiments, the invention may be configured to work with non-legacy head ends, such as novel edge-router based all-digital head-ends, where no legacy optical fiber waveforms are transmitted over the HFC system optical fiber. Here for example, all optical fiber transmissions may be in the form of various optical fiber optimized digital data packets, such as optical fiber optimized Ethernet frames, and the like.

The disclosure relies, in part, upon a distributed CMTS design in which RF transmitters (here usually exemplified by QAM modulators, but other types of RF modulation/transmission schemes may also be used) in the CMTS PHY section (used to ultimately provide the waveforms used to send data signals to a given individual cable) are constructed from software reconfigurable FPGA and DSP devices, and then divided and distributed throughout the HFC network. Here, in certain legacy embodiments, on occasion some legacy QAM modulators may optionally remain located in the PHY units of main (centralized, e.g.—cable head) CMTS line cards on the central CMTS units. However other software reconfigurable FPGA and DSP based RF modulators, such as QAM modulators are located in the FPGA and DSP based PHY sections of remote or distributed CMTS. These remote CMTS units are here referred to as Cable Modem Remote Termination System (CMRTS) units.

In other embodiments, no legacy QAM modulators need be located in the PHY units of the main (centralized) cable head end. Instead all transmissions over the HFC optical fiber between the head end and the remote or distributed CMTS may be digital transmissions (such as various Ethernet data packets/frames). At the CMRTS units, the software reconfigurable FPGA and DSP based RF modulators (such as QAM modulators are located in the FPGA and DSP based CMRTS PHY sections), can be used to translate between the RF cable portion of the HFC system (where legacy non-Ethernet frames and waveforms may continue to be used), and the optical fiber portion of the HFC system, were only digital formats such as Ethernet data packets/frames may be used.

Occasionally, to emphasize the fact that when constructed with FPGA and DSP MAC and PHY units, these CMRTS units can also be configured to give them entirely new types of functionality, these CMRTS units will be referred to in the alternative as FPGA-DSP CMRTS units. For brevity, however, the CMRTS nomenclature will prevail, and in general unless otherwise specified otherwise, all CMRTS units discussed in this specification should be considered to be constructed with FPGA and DSP based MAC and PHY units. Also for brevity, although this specification will often refer to a QAM transmitters and receivers, which produce and receive a specific form of RF modulation popular in prior art DOCSIS CATV cable implementations, unless otherwise specified, the invention will also contemplate other forms of RF modulation as well such as CDMA and OFDM modulation. Thus QAM should be understood as being but one example (albeit a very popular example) of the various RF modulation schemes contemplated by the present disclosure.

According to the invention, these CMRTS units will often be located at the final network fiber nodes (FN) between the fiber portions of the HFC system, and the cable portions of the HFC system.

In one embodiment, any remaining QAM modulators located in the centralized CMTS PHY sections may primarily focus on sending data, such as a standardized package of cable TV channels and perhaps a basic level of DOCSIS service, which is generally requested by many neighborhoods in general. Thus, in a simplified example, any remaining central QAM units in a central CMTS line card driving three cables in three neighborhoods would send the same QAM signals to all three neighborhoods. At the same time, this central CMTS unit and CMTS line card may optionally coordinate its work (i.e. divide the responsibility for generating QAM channels) with remote or distributed QAM modulators located in up to three remote CMTS (CMRTS) units located in the in the final optical fiber nodes (FN) that connect the fiber portion of the HFC network with the three cables that supply the three neighborhoods.

Alternatively, the head end (e.g. central CMTS units and CMTS line cards) may be devoid of any central QAM units or other RF modulators, and instead "coordinate" is work (i.e. divide the responsibility for generating QAM channels) with remote or distributed QAM modulators on the CMRTS units) by giving the remote CMRTS units full responsibility for generating all QAM channels or other RF channels on the cable portion of the HFC system. In this embodiment, the CMRTS need not have any dumb" optical to RF (radio frequency) O/E or E/O conversion devices because all signals travelling between the RF cable portion of the HFC system and the optical fiber portion of the HFC system will need much more sophisticated conversion and signal modulation processes.

The invention's CMRTS units will typically be designed to be both highly software configurable to allow high operational flexibility without altering the basic characteristics of the units MAC and PHY units. However according to the invention, there is an additional advantage in that in addition to this operational flexibility, the basic hardware characteristics of the CMRTS units MAC and PHY units can also be changed as needed. This is because the CMRTS units are designed with software reconfigurable FPGA and DSP based MAC and PHY units. This enables the CMRTS units to have an almost infinite number of different ways in which they can operate their remote or distributed QAM modulators (or other RF modulators/transmitters) to send downstream data.

Additionally, due to the use of software reconfigurable FPGA and DSP based MAC and PHY units, the ability of the CMRTS units to operate various types of RF packet processors that receive multiple RF bursts of modulated upstream data from various cable modems, demodulate the bursts, digitizes and reassemble this upstream data into packets, and retransmit this data back upstream, can be both hardware (e.g. changed to entirely different type of RF receiver and processor) and also operationally reconfigured by remote software as well. These improvements over the prior art can not only can act simplify the management and configuration of the distributed CMRTS network, but can also greatly expand its standard functionality as well.

In some configurations, in order to supply a standardized set of TV channels and other services to, for example, three cables in three neighborhoods, the central CMTS unit and central CMTS line card may have the QAM modulators in the CMTS line card set to drive an optical fiber with multiple QAM signals at optical wavelengths, with the QAM waveforms being such that these optical QAM waveforms can be directly converted to radiofrequency QAM waveforms with inexpensive "dumb" converters, and directly injected into the three cables to provide the basic level of service. In other configurations, the central CMTS units and any central CMTS line cards may have no QAM modulators at all. Indeed, the central CMTS units and any central CMTS line cards may be replaced by one or more edge-routers and various control equipment, and serve only Ethernet data packets/frames out to the various optical fiber nodes.

In order to supply data to drive the remote CMRTS QAM modulators, to provide a higher level of service, various options are possible.

In a first option that is more backwards compatible with existing CTMS designs, the data to drive the remote CMRTS QAM modulators may be sent using a separate Level 2 switch and separate optical fiber system, typically using digital Ethernet protocols. This Level 2 switch and second optical fiber system will operate largely independently of the cable head CTMS unit. Here the operator of the cable head CTMS unit may simply configure the CTMS to have some empty QAM channels available for subsequent use by FPGA and DSP based MAC and PHY units in the remote CMRTS units that are configured to act as QAM modulators, but otherwise operate the standard (prior art) CTMS according to normal methods.

In a second option that represents a more radical departure from prior CMTS designs, in addition to sending the standard set of CATV RF data, the centralized CMTS unit and CMTS line card also send additional data to the CMRTS units on a second communications media, and intelligently coordinate which information gets sent on the first communications media, and which information gets sent on the second communications media, in order to maximize overall system functionality.

In a third option that is a still more radical departure from prior HFC designs, no legacy optical fiber waveforms and legacy formatted data need be sent from the HFC head end to the various CMRTS units at all. Instead various types of simplified head ends, such as the virtual converged cable access platform (virtual CCAP) system previously described the inventor in U.S. provisional application 61/870,226, PCT application PCT/US13/69760, and U.S. patent application Ser. No. 14/098,656 may be used. The entire contents of U.S. application 61/870,226, PCT application PCT/US13/69760, and U.S. patent application Ser. No. 14/098,656 are incorporated herein by reference in their entirety. In such virtual CCAP designs, only digital signals, which may be formatted using non-legacy CATV waveforms, are sent over the optical fiber portion of the HFC cable system. Put alternatively, to extent that the "first communications media" is transmitting legacy HFC optical fiber signals, in the more radical virtual CCAP environment, there need not be any "first communications data" transmitted at all.

According to the invention, however, regardless of if any legacy HFC optical fiber signals are being transmitted, the invention's CMRTS units may be flexibly configured or reconfigured to convert at least some of the all digital signals to and from various legacy CATV RF waveforms for the cable portion of the HFC cable system. Thus although head end and the optical fiber signals of the more radical virtual CCAP system may be radically different from legacy HFC cable systems (possibly generating no legacy optical fiber signals at all) the great flexibility of the invention's CMRTS units allows (when desired) legacy household cable modems and other legacy customer premises equipment to continue to operate, thus continuing to preserve backward compatibility when desired.

One advantage of the invention's CMRTS units is that because they can be designed to be highly software configurable, and additionally to have software configurable hardware as well due to FPGA and DSP based MAC and PHY components, the same CMRTS units can be reconfigured to work with the first backwards compatible CMRT option, the second more radical CMTS option (design), or a wide variety of other options, such as the previously discussed virtual CCAP system as well. Because the CMRTS design is both software configurable and in some configurations can (but need not) allow for the pass through of prior art CATV RF to optical signals, the CMRTS can be configured to be also highly backward compatible as needed, and can be implemented in a way that can be largely transparent to the cable operator until the higher functionality of the CMRTS is required.

In some embodiments, the first communications media, used to transmit legacy CATV data over the optical fiber, may handle a substantial part of the data that is ultimately delivered to and from the various sections of neighborhood cable. In other embodiments, the first communications media may handle no legacy CATV data whatsoever, and all data that is ultimately delivered to and from the various sections of neighborhood cable will travel through the second communications media. In these later embodiments, there essentially may be no first communications media. Nonetheless, because the present invention enables both possibilities, it is useful to retain the nomenclature of a first communications media that is used to transmit legacy CATV signals over optical fiber, and a second communications media, which may physically be identical with the first communications media, that is used to transmit Ethernet data packets/frames and the like that will require either decoding and reformatting at the CMRTS units, or else remodulation at the CMRTS units, in order to transfer information between the optical and cable portions of the HFC system.

For either the first or second option, the second communications media used to transmit data to the CMRTS may optionally use a second optical fiber and an alternative data transmission protocol, such as various Ethernet protocols previously discussed. If this scheme was used, the data would require conversion, reformatting, and QAM modulation by the remote CMRTS units. Here, for example, the FPGA and DSP units in the CMRTS units could be configured as QAM modulators that would then provide a radiofrequency (RF) QAM signal that can be injected into the cable, and recognized by cable modems attached to the various cables. In this configuration, to avoid conflicts, if any data is being transmitted over the first communications media, then to avoid interference, it may be useful to have the frequency (or at least time slice) of the QAM waveforms provided by the CMRTS units differ from the frequency (or at least time slice) of any QAM waveforms provided by the central CMTS QAM modulators.

Alternatively, this second communications media may carry data to the CMRTS units using the same (first or main)

optical fiber that may have been or could have also been used to carry QAM signals from the CMTS. In this alternative configuration, the CMRTS data may be carried at an alternate wavelength if desired. For example, the CMTS data, which may carry any main package of CATV TV stations and perhaps some DOCSIS services, may, if it exists, communicate using a 1310 nm optical wavelength, while the CMRTS data, which may carry the supplemental IP/On-demand data, may communicate using a 1550 nm optical wavelength. This type of scheme is often called wavelength-division multiplexing. As previously discussed, this supplemental CMRTS data need not be encoded using CATV compliant QAM modulation (although it could be), but rather may be carried using different protocols and modulation schemes, such as the previously discussed GigE Ethernet protocols. Here again, because of the fact that the CMRTS units have highly reconfigurable FPGA and DSP based MAC and PHY units, almost any protocol and modulation scheme, including protocols and modulation schemes that were not even invented at the time that the various CMRTS units were first placed in the field, may be used.

As previously discussed, when used in alternative all-digital over fiber schemes, such as the previously discussed virtual converged cable access platform (virtual CCAP) system that may operate with no legacy optical fiber waveforms at all, it should be understood that there may be no "first communications media". Alternatively, the "first communications media" can be considered to be transmitting no signals. In this case, for internal consistency, the all-digital signals used by the virtual CCAP system will still be referred to as the second communications media (to recognize the fact that non-legacy all-digital signals are being transmitted). Note however that if there is no "first communications" signals or "first communications media", then the second communications media may use exactly the same optical fibers and wavelengths that might otherwise have been assigned to the legacy "first communications media". That there will be no barrier to using any wavelength desired, such as the 1310 nm optical wavelength, and any optical fiber desired to use for the second communications media. Thus in this situation, wave division multiplexing may not be needed, although it can be used if desired.

In such a situation, the "supplemental CMRTS" data is in fact not supplementing anything because there are no first communications media signals to supplement. In such a situation, the "supplemental CMRTS" data in fact can carry data that might have originally been intended to be communicated using the first communications media signals, as well as additional data intended to bring higher HFC functionality.

This second communications media, being an optical fiber media itself, will generally be capable of transmitting far more IP/on-demand data than could be possibly be transmitted over a standard CATV cable. Unfortunately, at the end of the fiber network, we again reach the CATV cable bandwidth bottleneck, which again limits the amount of data that can be transmitted to any given individual neighborhood.

The invention relies, in part, upon the observation that at the present level of rather coarse granularity (where multiple neighborhoods are served by the same CATV QAM signals) the aggregate demands for IP-on demand data from multiple cables serving multiple neighborhoods may easily saturate the limited CATV bandwidth. However at a finer level of granularity (where each neighborhood might get its own customized CATV signal), the IP-on demand data for an individual neighborhood is more likely to fit within the limited bandwidth of each neighborhood's CATV cable. The trick is thus to avoid overloading each neighborhood's particular CATV cable bandwidth by picking and choosing the mix of standard QAM and QAM IP/on-demand signals are delivered to each neighborhood. This scheme of delivering a potentially ever changing mix of neighborhood specific CATV channels, as well as providing a capability to provide services different from the current DOCSIS standard (presently DOCSIS 3.0, and soon DOCSIS 3.1) creates some rather complex network management issues, however.

As previously discussed, to cope with these complex network management issues, this disclosure also relies, in part, upon a sophisticated computer control system to frequently (or even continually) adjust the operation of both the central CMTS (if any) and the remote CMRTS units to carefully balance user demands for standard data (e.g. standard QAM TV channels and perhaps a limited standard level of DOCSIS service) and customized data (e.g. IP/on-demand data). This computer control system can additionally be assigned the responsibility for configuring the CMRTS hardware via programming/configuring the various FPGA and DSP components that comprise the MAC and PHY CMRTS units.

The computer control system may, for example in addition to configuring the various CMRTS MAC and PHY units via configuring their respective FPGA and DSP components, manage the available bandwidth on the various cables that serve the various neighborhoods. When used in a more backward compatible first option mode, any "standard" QAM channels that are transmitted from the cable head end, and which are fixed by the cable operator in advance, may remain relatively constant. When used in the higher throughput and more radical second option mode, the computerized system may vary both any "standard" QAM channels being transmitted by any given central CMRT line card, and the user-customized or "premium" IP/on-demand QAM channels being transmitted by the remote CMRTS units. Alternatively if no standard QAM channels are being transmitted by any given CMRT line card or other head end device, then the computerized system will vary only the QAM channels being transmitted by the remote CMRTS, be these channels either standard QAM channels or premium or IP/on-demand QAM channels.

In CATV jargon, the various CMTS systems at the cable head are often referred to as a "shelf" or "CMTS shelf". Although the invention distributes either some or all of functionality of the CMTS unit from the cable head to throughout the entire network, from a network management perspective, in some embodiments, it may be simpler for the other network equipment and software to continue to communicate with this network distributed CMTS as if it was still a single cable head CMTS. Thus, in one embodiment, this CMTS and CMRTS computer control system and software that manages the network distributed CMTS will also be called "virtual shelf" hardware and software, because the computer control system may both manage the complex configuration issues involved in running a distributed CMTS system, and then shield this complexity from the rest of the system when needed. Thus the remainder of the cable head system need not be redesigned to handle the distributed CMTS functionality, but may continue to address the invention's distributed CMTS as if it was a prior art non-distributed CMTS.

Thus the virtual shelf hardware/software system may, for example, take as inputs, user demand over multiple neighborhoods for basic TV channels and basic DOCSIS services, user demand in individual neighborhoods for advanced or premium on-demand TV or premium DOCSIS IP service (IP-on demand), and the limited number of total QAM channels that can be carried over cable.

In the first option, the virtual shelf system will simply work using whatever empty QAM channels are made available by the cable operator, and will work to optimize data to users within this overall constraint.

In the second option, in order to send still more data, the virtual shelf system may be much more active. It may, for example, elect to direct the QAM modulators in the PHY unit of a central CMTS line card to stop sending signals on one QAM channel (frequency), or even on all QAM and other channels (frequencies), in order to free up these QAM channel(s) for one or more neighborhood specific QAM channel(s) (one or more frequencies). Indeed, in some embodiments such as the virtual CCAP system embodiments, there may be no central CMTS line cards at all, and all cable RF QAM channels may open and available for use.

In a third option, in order to send and receive even more data, the virtual shelf system may even send data to the FPGA and DSP based MAC and PHY units of the various CMRTS units in the field and instruct the MAC and PHY units to reconfigure themselves to handle additional functionality beyond the present DOCSIS 3.0 standard or proposed DOCSIS 3.1 standard (i.e. non-DOCSIS functionality). This additional functionality can, as needed, be proprietary to that particular CATV cable operator and may not otherwise need to be a recognized standard. This feature enables different cable operators to further differentiate their services from each other.

In general reconfiguring the basic functionality of the MAC and PHY units in the various CMRTS units may be a comparatively rare event—perhaps more often than a field hardware upgrade, but not necessarily a daily activity either. By contrast, often on a more frequent basis (e.g. perhaps even many times a day), the virtual shelf system then send neighborhood specific (IP/on-demand data) to those neighborhoods using the second communications media and by, for example an Ethernet modulated transmission protocol. The virtual shelf system may then instruct previously FPGA and DSP configured MAC and PHY units on the remote CMRTS unit on the fiber node serving the target neighborhood to take this IP/on-demand data from the second communications media, decode and QAM modulate the data, and inject this now RF modulated QAM data on the cable for that particular neighborhood using various empty cable QAM channel(s) (or cable frequencies).

The virtual shelf system can also instruct another remote CMRTS units on different fiber nodes serving a different neighborhood to take the IP/on-demand data for this neighborhood from the second communications media, decode and QAM modulate this data and inject this now RF modulated QAM data on the cable for this neighborhood as well.

Note that by this method, even though both neighborhoods may receive some common QAM channels and data from the same centralized CMTS line card, the overall CATV QAM channels are not the same. Rather, at least for the IP/On-demand data, the same QAM channel (frequency) now carries different data for the two different neighborhoods. Of course some of the CMRTS generated cable QAM channels can carry the same information between some of all different neighborhoods. Thus using this scheme, the common QAM channels and data that might otherwise have been generated by a (now unused) centralized CMTS line card or other head end modulator may be instead generated at the various CMRTS units instead.

Using these systems and methods, the effective data carrying capacity of the various cables and QAM channels has been increased. Yet, at the same time, if the centralized computer system (virtual shelf) is properly configured, most of the complexity of the switching arrangement can be selectively hidden from both the upstream (cable head) and downstream (cable modem) systems, thus enabling good backward compatibility with existing HFC equipment.

Alternatively, as will be discussed, the entire head end can be switched out to a non-legacy virtual CCAP system, and this change can at least still be selectively hidden from the downstream cable modem and other cable customer premises equipment, as desired.

The use of FPGA and DSP based MAC and PHY units on the CMRTS units, particularly remotely configurable FPGA and DSP based MAC and PHY units, allows additional functionality to be easily implemented as well. This additional functionality can include an ability to handle non-DOCSIS 3.0 RF waveforms such as QAM, CDMA, or OFDM waveforms, and other waveforms not contemplated by the DOCSIS 3.1 standard as well. It can also include an ability to configure the particular CMRTS RF modulators (e.g. QAM modulators) to pre-distort or customize the RF waveforms emitted by that CMRTS unit in order to, for example, correct for RF signal impairments on that stretch of CATV cable. Alternatively, the MAC and PHY units may be configured to allow the RF receivers on board the CMRTS units to better equalize or adjust of for distorted upstream RF signals (often originating from household cable modems).

Additionally, the reconfigurable FPGA and DSP based MAC and PHY units can be reconfigured to allow for narrower spacing between regularly spaced communications channels, thus increasing throughput.

CMRTS units employing software reconfigurable FPGA and DSP based MAC and PHY units can be used for other CATV applications and functionality as well. Examples of such other applications include the applications described in parent U.S. patent application Ser. Nos. 12/907,970; 13/346,709; 13/555,170; 13/674,936; 13/756,302; and 14/098,656, as well as U.S. provisional applications 61/385,125; 61/870,226; and 61/622,132; and U.S. patent application Ser. Nos. 12/692,582 and 13/478,462. The contents of all of these applications are incorporated herein by reference.

DETAILED DESCRIPTION OF THE INVENTION

Figure 1:
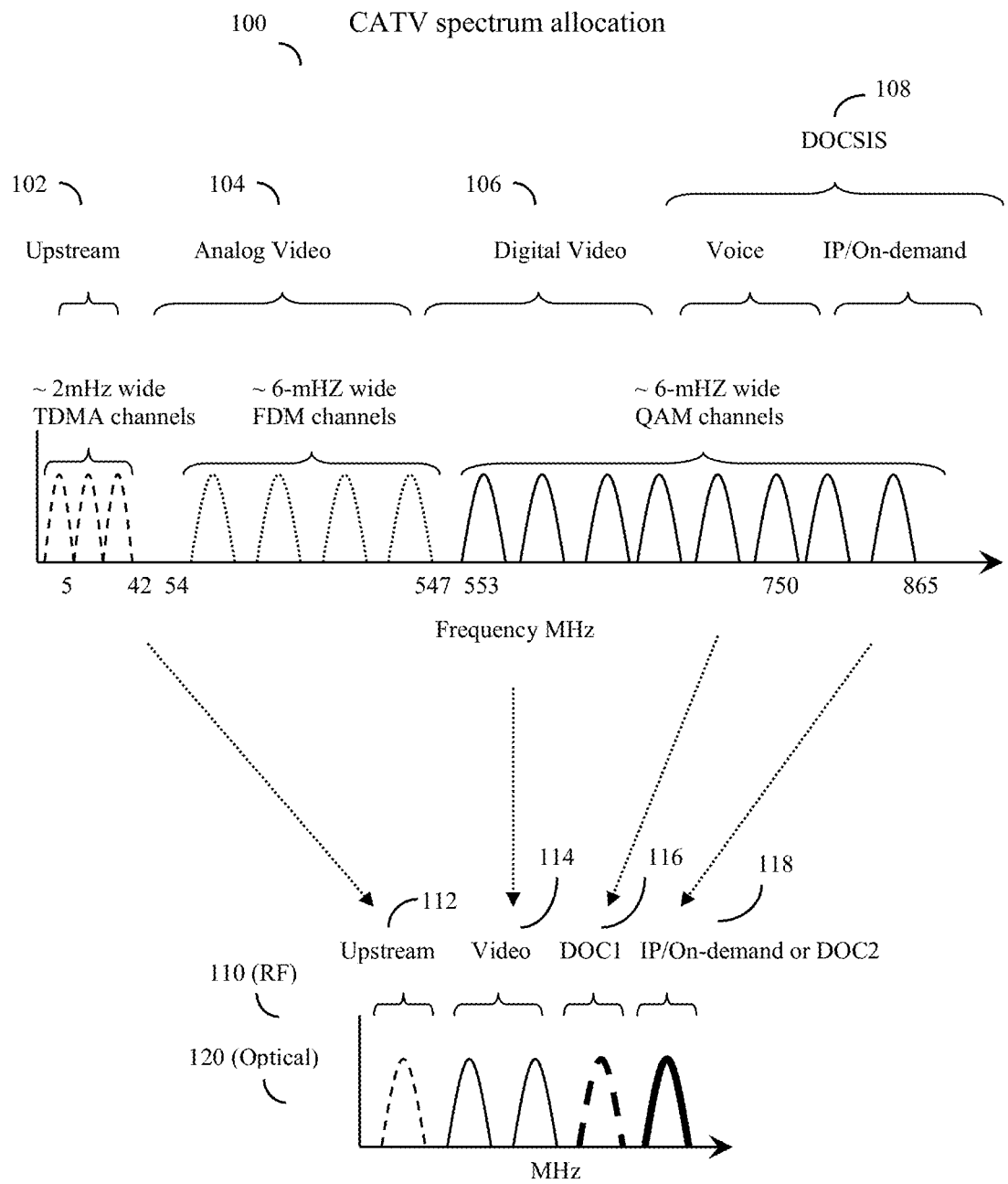
FIG. 1 shows an overall view of the various frequencies and data channels allocated for a typical CATV cable carrying legacy analog television FDM channels, QAM digital television channels, and various types of DOCSIS data.

In one embodiment, the invention may be a distributed Cable Modem Termination System (CMTS) for a Hybrid Fiber Cable (HFC) network. This system will typically consist of multiple parts.

In some embodiments, the system will work essentially independently of the CMTS at the cable head, and will essentially act to supplement the functionality of prior art cable heads and CMTS by adding a minimal amount of new equipment at the cable head. Here, this new equipment at the cable head cable may mainly consist of a Level 2/3 switch, a virtual shelf management system (to be described), and appropriate MAC and PHY devices to send and receive data along optical fibers. The prior art cable head CMTS may continue to operate as before, with the one exception that the cable operator should provide for at least some empty cable channels in order to provide space for the new channels provided by the invention.

In some embodiments, however, the prior art cable head and CMTS may be replaced by a radically new type of edge-server based virtual converged cable access platform (virtual CCAP system), previously described in parent application Ser. No. 14/098,656, the contents of which are incorporated herein by reference. In this embodiment, no legacy optical fiber signals may be transmitted from the head end at all. Put alternatively the cable operator is providing that all cable channels on the cable are empty to provide space for the new channels provided by the invention.

In other embodiments, parts of the system will be embedded into an advanced CMTS head with at least a first packet switch, a first MAC (Media Access Control), and a first PHY (Physical Layer) capable of sending and receiving data from a layer 2-3 switch to a first end of a first optical fiber as at least a plurality of first digitally encoded analog QAM waveforms (first optical signals).

In some embodiments, The CMTS head may also have a second MAC and a second PHY capable of sending and receiving data from the layer 2-3 switch to either the first end of the first optical fiber, or the first end of a second optical fiber. If the first end of the first optical fiber is used, and the cable operator wishes to transmit at least some legacy cable waveforms from the head end, then to avoid interference with the legacy signals, then the second PHY may send and receive data using an alternate wavelength and/or often an alternative data transmission protocol such as an Ethernet protocol, although QAM waveforms may also be used). For example, if the cable operator wishes to continue to transmit at least some legacy optical fiber signals for direct (dumb) conversion and retransmission on the cable as RF waveforms, then the first wavelength may be 1310 nm, and the second wavelength used to carry the additional data may be 1550 nm. In general, if there is a crosstalk problem requiring two or more different wavelengths to alleviate the problem, then the two different wavelengths may be spaced apart enough to avoid crosstalk, often with spacing of 20 nm, 50 nm, 100 nm, or more depending upon the bandwidth of the optical signals.

Alternatively if the cable operator wishes to transmit at least some legacy cable waveforms from the head end, then to avoid interference with the legacy signals the second MAC and second PHY may send this data out using the first end of a second optical fiber. In both cases, these are designated as the second optical signals. For simplicity and ease of discussion, this second signal will often also be designated as "Fiber 2", and drawn as a separate fiber, regardless of if the second signal is actually being sent on a second fiber, or simply on a second wavelength on the first fiber. Indeed, even if no legacy signals are being transmitted, thus potentially eliminating any need for a second fiber or second wavelength, the channel used to transmit non legacy data will still be designated as second optical signals.

The system will also usually have one or more remote CMRTS fiber node(s) located at the second end(s) of the first optical fiber. (Here the term "second end(s)" will also be used to designate the distal (furthest away from the CMTS and the cable head) end of an optical fiber, even after splitting.)

When the cable operator wishes to transmit at least some legacy first optical signals, one optional component of the CMRTS fiber node(s) may be a first "dumb" optical to RF (radio frequency) conversion device that directly converts the first optical signals (sent as QAM waveforms by the CMTS at the first end of the fiber) to a first set of RF signals. These are typically designated as O/E or E/O converters, depending upon the direction of the electrical RF to fiber optic conversion. Of course if no legacy first optical signals are being transmitted in either direction, such O/E or E/O converters will often not be useful, and thus may be omitted.

Another component this CMRTS may be least one RF modulator, such as a QAM modulator device capable of detecting and encoding selected portions of the second optical signals into a second set of RF QAM waveforms. This RF modulator may be part of a CMRTS PHY unit, and the CMRTS may often have the corresponding MAC and packet switching capability, as well as an optional controller (e.g. microprocessor and associated software) to select portions of the second optical signals and control the packet switching, MAC and PHY (including the CMRTS QAM modulators) as needed.

As previously, discussed, in a preferred embodiment, the CMRTS PHY unit and MAC unit for this RF modulator/transmitter will be based on FPGA and DSP components, and the CMRTS will often be further designed so that these FPGA and DSP components can be configured by data and signals carried by usually at least one of the first or second communications channel, such as optical fiber, thus enabling the RF modulation capability of the CMRTS units to be radically reconfigured even after being installed in the field.

The CMRTS will also usually contain at least one software controllable switch, often different from the FPGA and DSP components, that can be remotely directed to select at least some of the second optical signals (selected second optical signals) and direct said at least one CMRTS QAM modulator device to encode the selected second optical signals into a second set of RF QAM waveforms at a selected set of frequencies (remotely generated QAM signals). Often this software controllable switch will be part of, or be controlled by, the optional controller.

The CMRTS may also contain at least one remotely software controllable RF packet processor capable of detecting upstream data carried by CATV RF upstream signals generated by at least one cable modem, and digitally repackaging and said upstream data and retransmitting said upstream data as a third upstream digital optical fiber signal.

Also as previously, discussed, in a preferred embodiment, the CMRTS PHY unit and MAC unit for this software controllable RF packet processor (receiver) will also be based on FPGA and DSP components, and the CMRTS will often be further designed so that these FPGA and DSP components can be configured by data and signals carried by the first or second communications channel, such as optical fiber, thus enabling the RF packet processing capability of the CMRTS units to be radically reconfigured even after being installed in the field.

Usually the software controllable switch(s) and/or software controllable RF packet processor(s) are capable of being remotely configured by software to implement at least a subset of the standard DOCSIS 3.0 or 3.1 upstream and downstream functions. For example, on the upstream side, one or more of the DOCSIS upstream Time Division Multiple Access (TDMA) and DOCSIS Synchronous Code Division Multiple Access (SCDMA) functions may be implemented. On the downstream side, one or more of the various DOCSIS QAM modulation modes, such as 16-level, 32-level, 64-level, 128-level, and 256-level QAM modulation modes may be implemented. Depending upon the level of functionality of the CMRTS that is desired, the CMRTS may, at the fiber node, generate QAM channels carrying digital broadcast video, digital video on demand, digital High Definition (HD) video, Voice data, and DOCSIS (data) channels.

In still other embodiments, additional functions that are not yet officially part of the DOCSIS 3.0 or 3.1 specification (i.e. non-DOCSIS functionality), such as upstream data from various new models of non-DOCSIS standard set-top box gateways, may also be implemented by the CMRTS. This can be easily accomplished by uploading the appropriate configuration data and programs to the CMRTS FPGA and DSP units that comprise the CMRTS MAC and PHY. This would enable a cable provider to distinguish itself by being able to provide cutting edge services ahead of its competitors. In this example, the CMRTS can be viewed as handling a superset of the DOCSIS functions, because it is being used to extend the functionality of the HFC system beyond that of the standard DOCSIS 3.0 or 3.1 functions. Here, as previously discussed, the term "superset" is being used to denote the additional (non-standard DOCSIS) functionality. Thus again, a CMRTS that does either a full set of DOCSIS functions or a subset of DOCSIS functions would be described as implementing a DOCSIS "superset" if it also implements additional non-standard DOCSIS functions. Other examples of additional non-standard DOCSIS functionality (non-DOCSIS functionality), at least beyond the present DOCSIS 3.0 standard (DOCSIS 3.1 still being in a preliminary format) includes functionality to transmit various forms of digital video such as standard digital video, high definition HD digital video, and various forms of digital video upon demand.

In addition to the FPGA and DSP components, both the software controllable switch(s) and software controllable RF packet processor(s) will often incorporate their own microprocessors or microcontrollers, as well as memory (such as flash memory, ROM, RAM, or other memory storage devices) to incorporate software needed to operate the switches and processors, interpret command packets sent from the virtual shelf manager, and transmit data packets to the virtual shelf manager.

At least in situations where the cable operator contemplates transmitting legacy signals over the first optical fiber or communications channel, the CMRTS may also have a combiner device, or at least be attached to a combiner device (such as a Diplex device), that combines the first set of RF signals (if any) and the remotely generated QAM signals to produce a combined RF signal suitable for injection into a CATV cable connected to at least one cable modem. Alternatively, this optional Diplex device may be external to the actual CMRTS unit, however the CMRTS unit in this embodiment may normally depend upon either an internal or external combiner (e.g. a Diplex device) for functionality.

The system will also usually have a centralized computer system or computer processor running software (e.g. virtual shelf software) that controls many aspects of its function. As previously discussed, because the prior art non-dispersed functionally CMTS units were often referred to as a "shelf", the computer software that controls the functionality of the dispersed CMTS-CMRTS units of this invention will be referred to in the alternative as a "virtual shelf". This "virtual shelf" software will ideally manage the much higher complexity of the dispersed CMTS-CMRTS system in a way that will be easy to manage, and ideally sometimes almost transparent, to the cable head, so that other systems in the cable head can often handle the more complex data distribution properties of the invention's dispersed CMTS-CMRTS system as if the system behaved more like a simpler, prior art, CMTS system.

Alternatively, in some embodiments where the head end may be partially or completely replaced by more advanced systems, such as the edge-router based virtual CCAP system described on parent application Ser. No. 14/098,656, the functions of the virtual shelf software may be implemented by the virtual CCAP software and/or Gainspeed controller described in that application. Thus in edge-router based head ends, the term "virtual shelf software" used herein should generally be understood to also apply to similar functionality as implemented by the virtual CCAP software and/or controller software as well.

In particular, one important function of the computer processor and "virtual shelf" software will be to select and control at least the second optical signals and the remotely generated QAM signals. These will be managed in a way that, as will be discussed, greatly increases the amount of IP-on-demand data available for cable system users.

Often, another important function of the computer processor and "virtual shelf" software will be to store the software and data used to configure the various FPGA and DSP components in the various CMRTS units in the field. Often the "virtual shelf" software, working with appropriate feedback signals from the field CMRTS units and other devices, will often determine when certain CMRTS units may need to be upgraded by, for example, loading appropriate FPGA and DSP configuration data to the remote CMRTS to do pre-distortion or equalization to cope with cable impairments on various stretches of CATV cable. In addition, often as the human managers of the CATV system may dictate, the "virtual shelf" software may be used to upgrade (or sometimes downgrade) various CMRTS units to add or subtract additional functionality as the user payments, user demand, and competitive situation dictate.

Thus in one embodiment, the invention may be a remote CMTS fiber node (CMRTS) system for a Hybrid Fiber Cable (HFC) network. This CMRTS portion of this system will optionally comprise a first optical to RF (radio frequency) conversion device that directly converts a first set of RF modulated optical fiber signals to a first set of CATV RF signals. The CMRTS portion will also often comprise at least one RF modulator device, such as a QAM modulator capable of encoding selected portions of digitally encoded second optical fiber signals into a second set of RF waveforms. The CMRTs portion will also often comprise at least one software controllable switch that can be remotely directed to select at least some of the second optical fiber signals (selected second optical signals) and direct the at least one RF modulator device to encode certain selected second optical signals into a second set of RF waveforms at a selected set of frequencies. These will be called remotely generated RF signals. The CMRTS portion will also often comprise at least one remotely software controllable RF packet processor (and associated MAC and PHY units) capable of detecting upstream data carried by CATV RF upstream signals generated by at least one cable modem, digitally repackaging this upstream data and then retransmitting this upstream data back (often eventually usually back to the cable head) as a third upstream digital optical fiber signal.

In a preferred embodiment, the at least one software controllable RF modulator device and/or software controllable RF packet processor will comprise at least one FPGA and DSP device(s) that are capable of being remotely configured by software to implement various types of MAC and PHY units. At least some of these MAC and PHY units may be capable of implementing additional non-DOCSIS functionality, a full set of DOCSIS functionality, or a subset of the standard DOCSIS upstream and downstream functions.

Note that to enable an enhanced user data experience, the CMRTS may, but need not, implement a full set of standard DOCSIS 3.0 or 3.1 functionality. This is because in some embodiments, at least some of the DOCSIS functionality that is ultimately delivered to the various cable modems on the various houses may be delivered by the directly converted CATV RF signals obtained from the CMTS at the cable head. However in the case where no CATV RF signals are obtained from the cable head, then of course it tends to be more desirable for the CMRTS to implement a greater subset of full set of DOCSIS 3.0 or 3.1 functionality.

In many embodiments of the invention, the functioning of the at least one software controllable switch and the functioning of said at least one remotely software controllable RF packet processor are preferably controlled a remote virtual shelf manager system/virtual CCAP software system.

In another embodiment, the invention may be a system and/or method for enhancing the data carrying capacity of a hybrid fiber cable (HFC) network with a cable head, an optical fiber network, a plurality of optical fiber nodes, a plurality of individual CATV cables connected to said plurality of optical fiber nodes, and a plurality of individual cable modems, each with differing data requirements, connected each of said individual CATV cables. This method may optionally, but need not include transporting a first set of data from the cable head to the optical fiber nodes using a plurality of RF waveforms, such as QAM RF waveforms, that are capable of being directly injected into individual CATV cables by an optical to RF converter.

The method will also usually include transporting a second set of data from the cable head to the optical fiber nodes. Here, this second set of data will usually not be capable of being directly injected into individual CATV cables by an optical to RF converter. Rather, the method will instead usually convert at least a selected portion of this second set of data into RF waveforms (e.g. RF QAM waveforms) at the optical fiber nodes. These remotely produced RF waveforms from selected portions of the second set of data will be called second RF waveforms.

In some embodiments, the method may then combine the first RF waveforms (if any) with the second RF waveforms, and inject the combined RF waveforms into individual CATV cables serving individual neighborhoods.

The method may control this selection and mixing process so that for each individual CATV cable (which may be a part of a group or plurality containing a number of other individual CATV cables), the first RF waveforms (if any) and the second RF waveforms will be selected so that the combined RF waveforms do not exceed the available bandwidth any of the individual CATV cables.

Here, the method will often control the second set of data and the selected portion of the second set of data to satisfy (usually better satisfy than prior art methods) the differing data requirements for a number of different of cable modems. Here, in general, different individual CATV cables, when considered in contrast to a group of multiple individual CATV cables, will generally carry at least some differing second RF waveforms, where at least some of these differing RF waveform may generally satisfy the unique data requirements for the various cable modems hooked up to the particular individual CATV cable.

FIG. 1 shows an overall view of the various frequencies and data channels allocated for CATV (100). Typically the lower frequencies, such as 5-42 MHz, are allocated for use in transmitting data "upstream" from the individual cable modems back to the Cable Head (102). Typically upstream data is transmitted using a time-share TDMA (Time Division Multiple Access) manner in which individual cable modems are allocated certain times on roughly 2 MHz wide QAM channels to transmit data. Starting at around 54 MHz on up to roughly 547 MHz, space is currently allocated for legacy analog video channels (104), which transmit on roughly 6 MHz wide FDM channels. At frequencies above that, frequencies (space, bandwidth) is currently allocated for digital television transmitting on roughly 6 MHz wide QAM channels (106), and above that, space is currently allocated for DOCSIS services (108) that may transmit voice, on-demand video, IP, and other information, again generally as a series of 6 MHz wide QAM channels. Above about 1 GHz, cable bandwidth is seldom used at present. Note however, that by using CMRTS units composed of FPGA and DSP MAC and PHY units, in conjunction with the methods discussed in copending application Ser. No. 13/467,709, the contents of which are incorporated herein by reference, the teaching of the present invention may also be used to extend CATV functionality to the 1 GHz+frequency region.

The invention is indifferent as to the use of higher frequency (e.g. 1 GHz+) cable bandwidth and channels. If available, the invention may use them. If not available, the invention will cope with existing cable frequencies and bandwidth.

CATV cable thus has a finite bandwidth of at most about 100-200 QAM channels. When this bandwidth is used to serve a large amount of different customized types of data to a large amount of different subscribers, this bandwidth quickly becomes exhausted.

A drawing showing how the CATV spectrum allocation can be described in a more simplified diagram is shown below (110), (120). This diagram will be used in various figures to more clearly show some of the CATV spectrum allocation aspects of the invention.

The "upstream" segment (112) is an abstraction of all upstream channels, including both presently used upstream channels in the 5-42 MHz region, as well as present and future higher frequency upstream DOCSIS channels. The "video" segment (114) is an abstraction of both the almost obsolete analog TV FDM channels, as well as the standard "digital video" channels, as well as the projected digital video channels that will occupy the soon to be reclaimed analog bandwidths once the analog channels are phased out. Segment (114) also represents other standard digital radio and FM channels, and in general may represent any standardized set of downstream channels that will usually not be customized between different sets of users and neighborhoods.

The "DOC1" channel (116) may be (depending upon mode of use) either a full set or subset of present or future DOCSIS channels. As commonly used in this specification, DOC1 can represents a basic set of DOCSIS services that would be made available for fallback use by neighborhoods in the event of a failure of the higher performance IP/on demand or DOC2 channels (118). Alternatively, if no legacy channels are being transmitted by the head end, then DOC 1 may represent a basic set of DOCSIS services that will generally be provided by the various CMRTS units irrespective of any premium or alternative services.

The DOC1 QAM channels are normally chosen so as to not exhaust the full bandwidth of the CATV cable, so that at least some remaining QAM channels are available for the neighborhood customized DOC2 channels. The "IP/On-demand or DOC2" channel (118) is essentially (depending upon mode of use) the remaining available downstream bandwidth on the CATV cable, and is usually reserved for transmitting neighborhood specific data (IP/On-demand data). If the head end is transmitting legacy DOC1 channels, then the DOC2 channels will often transported by a different communications media (such as a second fiber or second wavelength, and often by a non-QAM protocol) from the cable head to individual neighborhoods.

Note that when discussing prior art usage, the sum of the DOC1 (116) and IP/On demand (118) channels sent by optical fiber to a group of neighborhoods can (or at least should) never exceed the effective bandwidth (i.e. the carrying ability of the CATV cable and the ability of cable modems to detect the cable RF signal) of the CATV cable.

By contrast, when discussing the invention, the sum of the DOC1 (116) and IP/On-demand (118) channels sent by optical fiber to a group of neighborhoods will often exceed the effective bandwidth of the CATV cable on a group of neighborhoods basis, although the sum of DOC1 (116) and IP/On-demand (118) will never exceed the effective bandwidth of the CATV cable on a per-neighborhood basis.

If the same CATV spectrum is transmitted by optical methods (i.e. optical fiber), so that the same waveforms are transmitted at the same frequency spacing, but simply transposed to optical wavelengths, then this spectrum will be designated as (120), but the various waveforms will otherwise keep the same nomenclature to minimize confusion.

Figure 2:
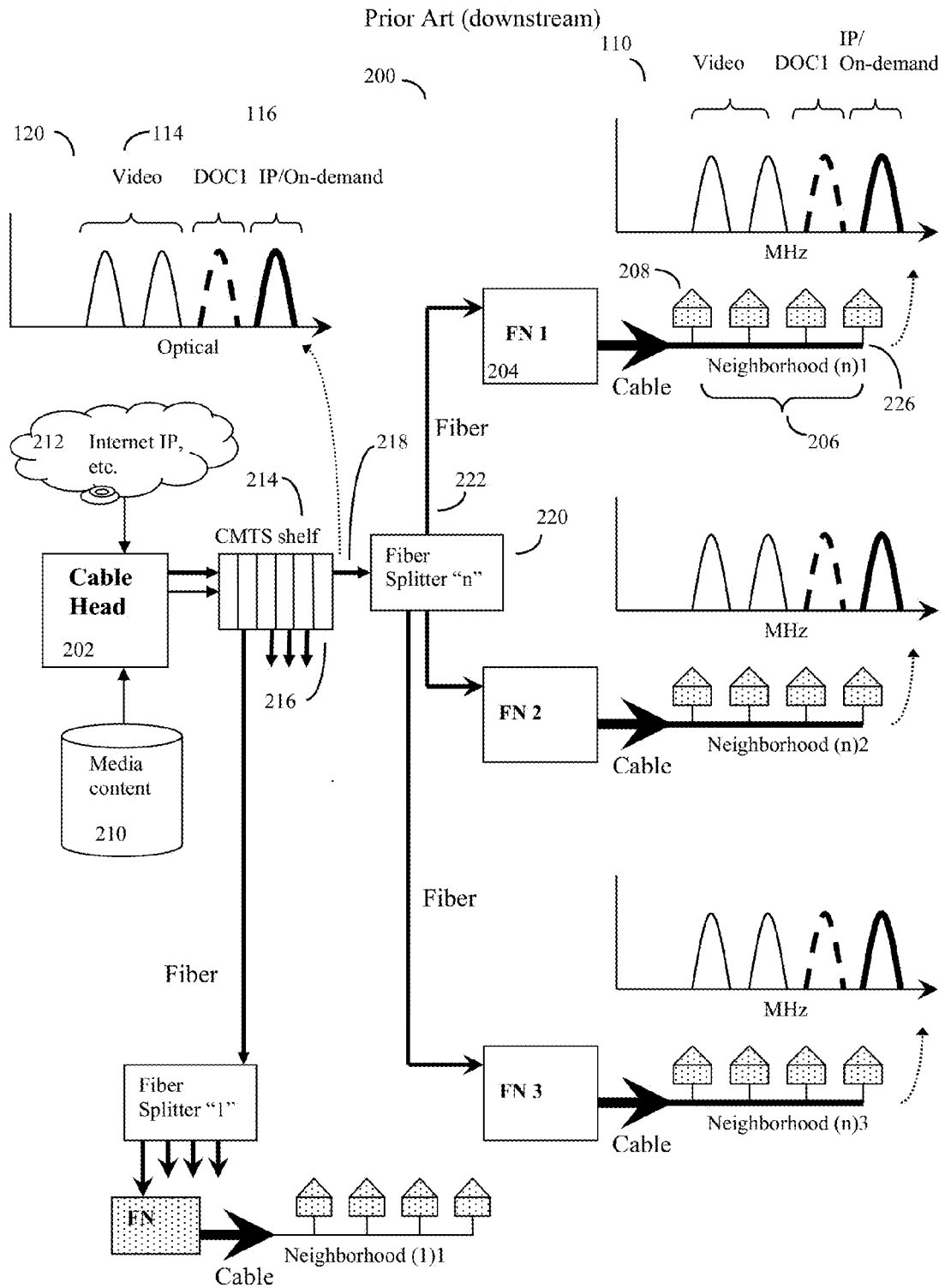
FIG. 2 shows an example of a prior art HFC cable system transmitting data from the cable head to various individual cables using optical fibers and optical fiber nodes.

FIG. 2 shows a simplified version of how prior art HFC systems (200) transmit data from the cable head (202) to different optical fiber nodes (204) serving different neighborhoods (206). Each neighborhood will typically consist of up to several hundred different houses, apartments, offices or stores (208) (here referred to generically as "houses"), each equipped with their own cable modems (not shown). Here, for simplicity, only the downstream portion of the HFC system is shown.

The cable head will obtain standardized media content (210) (such as a standard assortment of analog and digital video channels) from one set of sources, and also obtain more individualized data (212), such as video on demand, IP from the Internet, and other individualized data from other sources. This data is compiled into a large number of different QAM (and at present also FDM) modulated CATV broadcast channels at the CTMS shelf (214). This CMTS (214) will often have a number of different blade-like line cards (216). These line cards transmit the signals by optical fibers (218) to different areas (groups of neighborhoods).

Note that the FDM modulated CATV broadcast signal is an analog signal (for older style analog televisions), and even the QAM signal, although it carries digitally encoded information, is itself an analog signal as well. For historical reasons, in the downstream direction, both FDM and QAM waveforms (signals) usually have a bandwidth of about 6 MHz in the US.

To show this, as previously discussed in FIG. 1, the FDM and QAM signals are shown as having a center wavelength and bandwidth in order to emphasize the essentially analog nature of this signal, even when carrying digital information. If legacy head end operation is desired, these analog signals can be carried by optical fibers, and converted into RF signals for the CATV cable part of the network, using very simple and inexpensive equipment. If legacy head end operation is not desired, then these analog signals may instead be carried digitally over the optical fiber to the various CMRTS units, by digital methods, such as Ethernet data packets/frames, previously discussed in parent application Ser. Nos. 13/674,936; 13/756,302; 14/098,656; the contents of which are incorporated herein by reference.

As previously discussed, typical HFC networks actually have a rather complex topology. Rather than sending one optical fiber from the CTMS to each different neighborhood, typically optical fibers will serve multiple neighborhoods. To do this, the signal from the CTMS side optical fiber will at least usually be split (by an optical fiber splitter (220)) into several different optical sub-fibers (222), and each sub-fiber in turn will in turn carry the signal to a different fiber optic node (fiber node, FN) (204). Here the rather complex ring topology of HFC networks will be simplified and instead represented by these fiber splitters.

At the fiber node (FN) (204), the optical signal is converted into a CATV radio frequency (RF) signal and sent via CATV cables (226) to individual cable modems at individual houses (208) in each neighborhood. Typically each neighborhood will consist of 25 to several hundred houses, served by a CATV cable (226) that connects to the local fiber node (204).

Since the CATV cable (226) is connected to all of the houses (208) in the neighborhood (206), if the cable modem in one house in a neighborhood wants to request customized on-demand video or IP, then all of the houses in the neighborhood that are attached to that particular CATV cable will actually receive the customized signal. Although only the cable modem associated with the requesting house (not shown) will actually tune into and decode the requested signal, it should be appreciated that if each individual house in the neighborhood were to simultaneously request its own customized set of video on demand or IP at the same time, the limited bandwidth of the CATV cable would be rapidly saturated. As a result, there is an upper end to the amount of customized data that can be transmitted to each house, beyond which bandwidth must be limited and/or requests for additional customized data will have to be denied.

Although the different blades or line cards (216) of the CMTS shelf (214) at the cable head (202) can send different customized IP/on-demand channels to different groups of neighborhoods, the granularity of this process is sub-optimal, because all individual neighborhoods connected to the same fiber splitter will get the same customized IP/on-demand signal. Given the limited bandwidth of the CATV cable, if all neighborhoods get the same signal, then the amount of data that can be sent to each individual neighborhood must, by necessity, be limited so as not to exceed the total available bandwidth.

Figure 3:
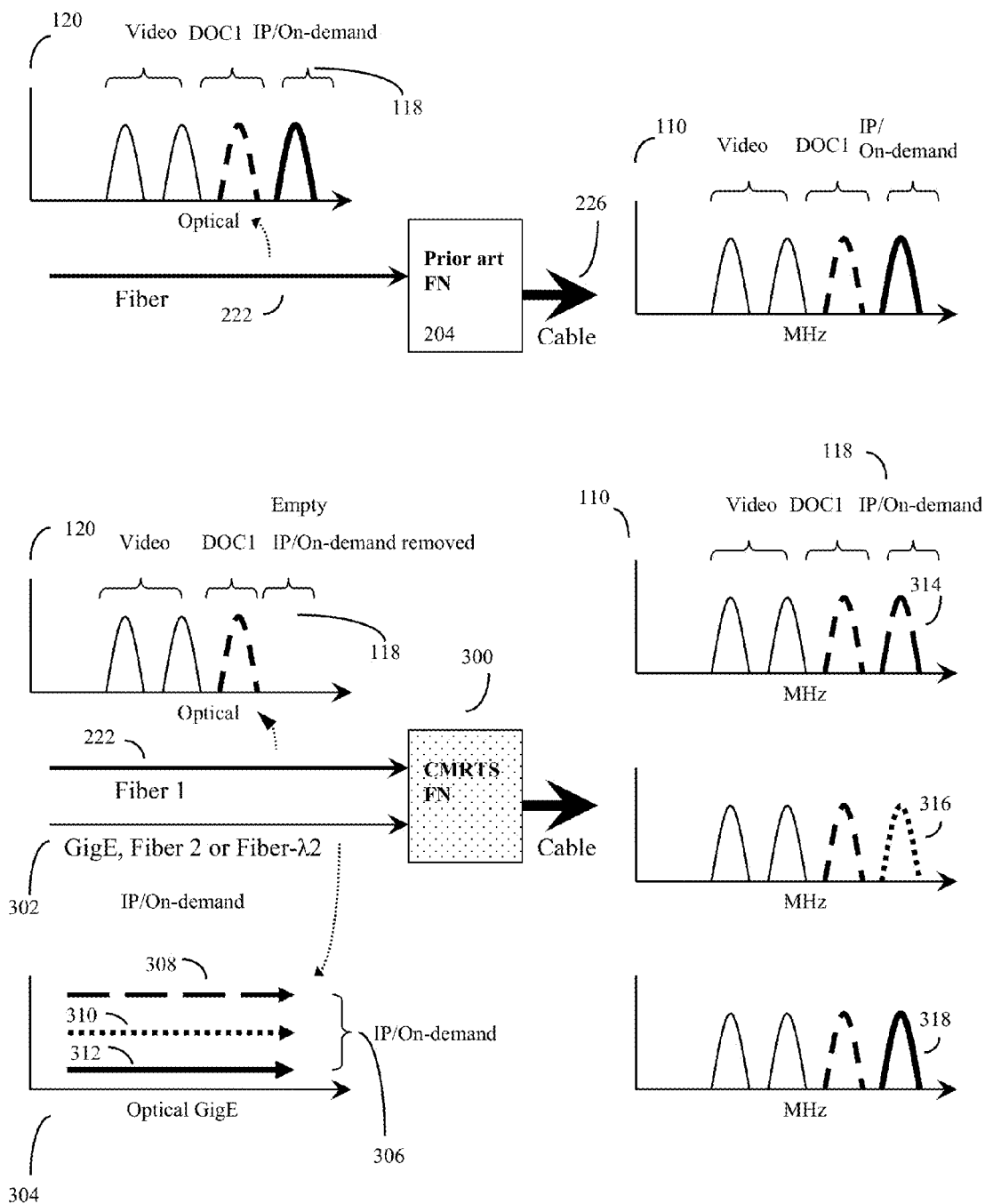
FIG. 3 contrasts the difference between a prior art optical fiber to cable (fiber) node and the invention's improved cable modem remote termination system (CMRTS) fiber node.

FIG. 3 contrasts the conversion process between the optical fiber (222) and the CATV cable (226) that occurs with a typical prior art fiber node (204), and with an embodiment of the invention's improved CMRTS fiber node (300). Here, for simplicity, only the downstream portion of the process is illustrated.

In the prior art conversion process (top), the optical fiber (218) carries both the standardized video signals, and the analog QAM signal (that contains digital information) for both digital television and DOCSIS use (that can carry on demand video or IP data).

In the prior art "dumb" fiber node (204) simply converts the optical fiber's optical FDM or QAM analog signals into RF FDM or QAM signals and passes these signals to the CATV cable (226). Thus if, for example, there are four different optical fibers connecting to this different fiber node, all will get the same customized IP/On-demand signal, and this in turn may be rather inefficiently transmitted to potentially thousands of non-target households that did not request the customized signal.

By contrast, by using the invention's improved "smart" CMRTS fiber nodes (300), if the cable operator desires to transmit legacy head end signals, the standardized signal (e.g. the standardized video channels) and (for backwards compatibility) either a full set or subset of the DOCSIS QAM channels can be carried by the "main" optical fiber channel, here designated as "Fiber 1", and drawn as a thicker line. For backwards compatibility, Fiber 1 can often be the same fiber used to carry the prior-art signals, and to emphasize this backwards compatibility aspect of the invention, Fiber 1 will be designated by the same number (222).

If legacy head end signals are being transmitted, typically, Fiber 1 (222) may carry the CATV spectrum as a series of optical waveforms that directly correspond to the RF QAM waveforms that will be injected into the CATV cable (120).

In the invention, however, either a subset, full set, or superset of the DOCSIS QAM channels or other type RF modulated signals can also be carried by other physical media means, such as by a second fiber, or by an alternate wavelength of light on the Fiber 1, or by any Fiber 1 wavelength if no legacy head end signals are being transmitted. For simplicity, the media that carries this additional set of data will be designated as "Fiber 2", and will be drawn as a thinner line (302) to emphasize that, at least in the initial stages, Fiber 2 may be used to carry supplemental data to extend the data carrying capability of the backward compatible Fiber 1 line (222). Eventually of course, Fiber 2 may likely carry substantially more data than Fiber 1, and indeed the legacy Fiber 1 data may be completely phased out altogether.

Although Fiber 2 (302) could also transmit its data by optical QAM waveforms suitable for simple conversion to the RF QAM waveforms used on the cable (by perhaps just QAM modulating the same signal at a different frequency), there is no requirement that Fiber 2 in-fact use any type of QAM encoding at all. Often, Fiber 2 may transmit this supplemental data by standard gigabit Ethernet protocols. To emphasize the fact that Fiber 2 is often carrying data by non-CATV-compatible or QAM signal carrying methods, the Fiber 2 signal (304) is shown as a series of lines (306) to symbolize the fact, that for example, alternative digital methods of signal transmission may be used. Here each line represents the data that ultimately will be converted to a QAM signal and sent to a specific neighborhood.

As will be discussed, in some embodiments, such as a system composed entirely of "smart" CMRTS fiber nodes (300), Fiber 1 (222) need not carry any customized (user specific) information, such as DOCSIS information (116), or IP/on-demand channels (118), at all, or even any standard (non-user specific) information. These customized channels can either be removed from Fiber 1 (222) (i.e. by filtering) or more usually, some or all of the customized IP/on-demand channels/DOCSIS or standard channels will simply not be injected into Fiber 1 by the cable head CMTS in the first place.

Alternatively, if the cable operator desires to preserve some legacy head end operation, Fiber 1 (222) may carry the standardized video channels (114), and some of the customized DOCSIS (116) or IP/On-demand-DOCSIS information (118), and this partial set of IP/On-demand-DOCSIS information can be sent to those users that are still being served by prior-art "dumb" fiber nodes. The users served by the invention's improved CMRTS fiber nodes, however will be able to access the additional information sent by optical fiber 2, GigE, or Fiber wavelength 2 (304). Of course, if no legacy signals are being transmitted, then the cable users served by the prior art "dumb" fiber nodes may receive no RF cable signals, or at least no signals that would be readable by legacy cable equipment.

At the invention's improved CMRTS fiber node (300), the fiber node's CMRTS unit will determine (or at least select, often based on instructions from the cable head end) which set of customized data (308), (310), (312) its particular neighborhood requested, and retrieve this information from the Fiber 2 media (302). This information will then be QAM modulated and converted to the appropriate RF frequency, put onto a suitable empty IP/On-demand QAM CATV cable channel (314), (316), (318), and then sent by CATV cable to the neighborhood that requested that particular data. At the neighborhood, the particular cable modem from the house that requested that data can tune into this QAM channel and extract the data, while the other cable modems also attached to that cable will ignore the QAM channel and/or ignore the data.

As will be discussed shortly, this method allows for much finer granularity, and a correspondingly higher rate of transmission of customized data.

Figure 4:
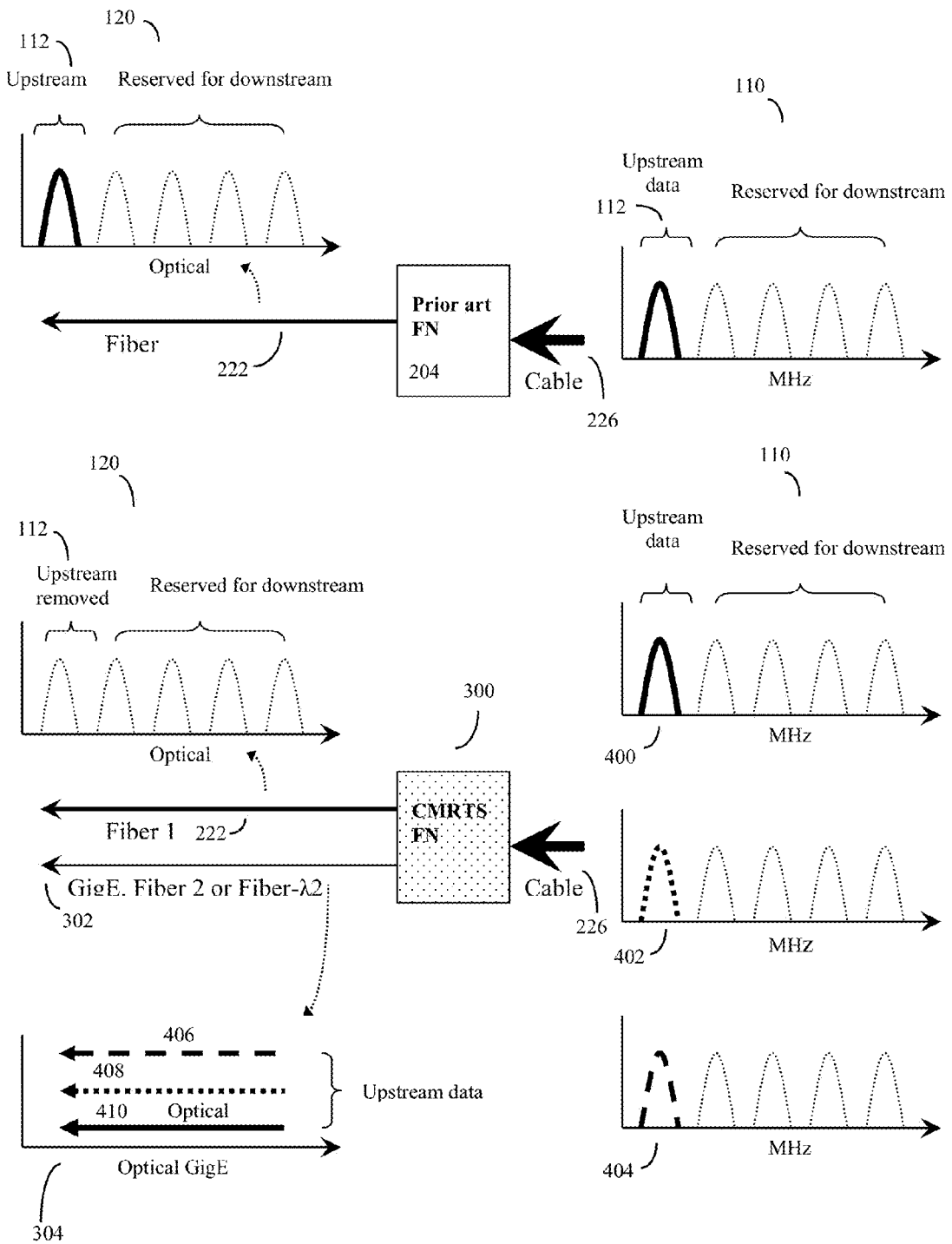
FIG. 4 shows how the invention's improved CMRTS fiber node can also transmit a greater amount of upstream data.

FIG. 4 shows that the invention may use a similar system and method to transmit a higher amount of data upstream as well. As previously discussed, only a limited amount of bandwidth (112) is allocated to transmit data upstream from the individual cable modems in a neighborhood back to the cable head. In this example, the limited region from 5-42 MHz is shown (112). In the prior art process, signals from multiple different fibers would be consolidated onto a single fiber (222), again raising congestion issues. By contrast, using the improved CMRTS fiber node (300), the upstream data from each neighborhood (400), (402), (404) can be extracted, the QAM signal optionally decoded, the data put on an appropriate (empty) return channel (or an empty TDMA time slice of an appropriate return channel) (406), (408) (410), and sent back to the cable head, in some embodiments by a less congested second customized data transmission media, such as Fiber 2 (302).

Alternatively, particularly when the cable operator wishes to preserve legacy head end equipment, to preserve backward compatibility, prior art upstream methods may continue to be used. As yet another alternative, the new method and the prior art method may be used interchangeably by the cable system as system configurations and needs dictate. Here, due to the unique remote reconfigurability of the invention's FPGA and DSP MAC and PHY units in the CMRTS units, the various CMRTS units can be remotely upgraded to implement new methods according to the wishes of the cable system management. Thus the cable operator can initially install CMRTS units in the field while continuing to use legacy head end equipment, and then later upgrade the head end to operate more advanced head end equipment, such as the virtual CCAP equipment described in U.S. Ser. No. 14,098,656, as desired.

Figure 5:
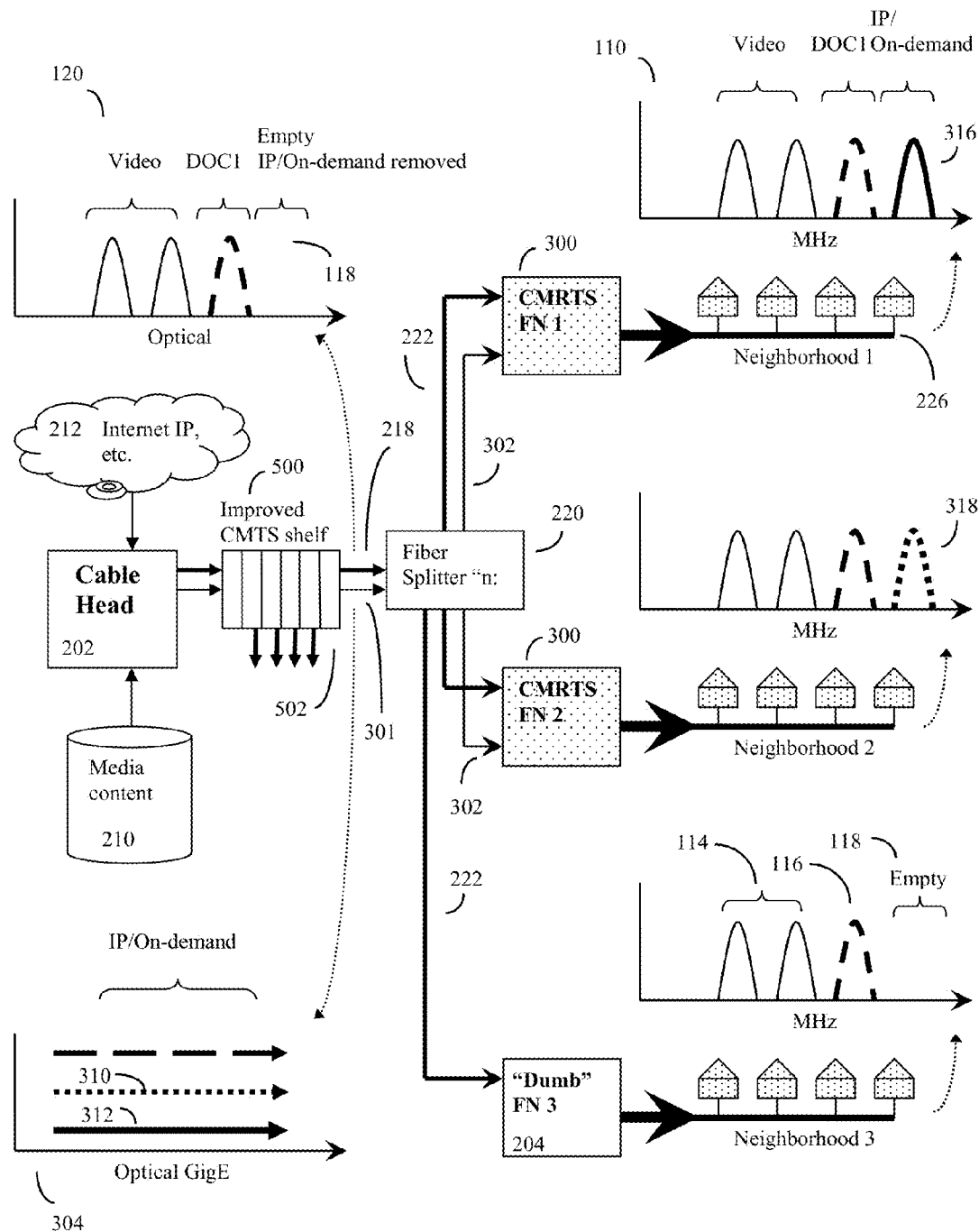
FIG. 5 shows how one embodiment (here the second option is shown) of the invention's distributed cable modem termination system, working with an advanced CMTS at the cable head, can distribute a greater effective amount of downstream data to various CATV cables serving multiple users in different neighborhoods.

FIG. 5 shows an example of the previously discussed second option in which both the distribution of RF QAM channels produced by the CMTS, and the distribution of QAM channels produced by the CMRTS, are managed together in a more sophisticated system employing both CMRTS and a new type of higher functionality CMTS.

Here, in this embodiment, the improved "smart" CMRTS fiber node (300) can transport a higher effective amount of customized user data. Here these improved "smart" CMRTS fiber nodes (300) are shown working in conjunction with an improved CMTS shelf (500) and improved CMTS line cards (502) at the cable head.

In the prior art system example previously shown in FIG. 2, an optical fiber (218) from the prior art CMTS unit (214) at the cable head was split at by a fiber splitter (220) into three sub-optical fibers (all carrying the same data) (222), and these sub-optical fibers were then routed to three different neighborhoods. Because all optical fibers coming from the fiber splitter will carry the same data, the customized data is inefficiently sent to all three neighborhoods, even though only one house from one neighborhood may have actually requested the customized data.

As a result, the limited carrying capacity (bandwidth) of the CATV customized IP/video on-demand channels can become saturated.

By contrast, by using an improved CMTS shelf (500) and improved CMTS line cards (502) capable of taking the incoming data, and partitioning the data into two transport media (e.g. optical fibers 1 (218) and un-split optical fiber (301)). The "smart" CMRTS fiber nodes (300) of the invention (usually after splitter (220) further splits optical fiber 1 and optical fiber 2 into sub-fibers (222), (302)) can now convey a much higher amount of data.

As previously discussed, more data can be communicated because at each different CMRTS fiber node (300), the different CMRTS fiber nodes can customize and optimize the DOCSIS or other signals to and from the cable serving that particular neighborhood to better serve that neighborhood, and do so in a way that is much less constrained by overall cable bandwidth.

Here, assume that the improved CMTS (500) and improved CMTS line cards (502) have placed the appropriate data onto Fiber 1 (218) (222) and Fiber 2 (301) (302). (This aspect will be discussed shortly.)

To do this, the "smart" CMRTS fiber node (300) retrieves additional data (304) from Fiber 2 (302); QAM modulates this additional data, and puts it onto a suitable empty QAM CATV cable channel (118).

In FIG. 5, neighborhood 1 has requested IP/On-demand data (312). This is selected by the neighborhood 1 CMRTS (300), QAM modulated by the CMRTS, and put onto the cable (226) serving neighborhood 1 as IP/On-demand signal or waveform (316) in the IP/On-demand channel(s) (118). Similarly neighborhood 2 has requested IP/On-demand data (310). This is selected by the neighborhood 2 CMRTS (300), QAM modulated by the CMRTS, and put onto the cable serving neighborhood 2 as IP/On-demand signal or waveform (318). Note that the QAM channel or frequency (318) may occupy the exact same channel(s) (118) as signal (316). Thus more data has been transmitted, while at the same time, the limited bandwidth of the CATV cables serving the two neighborhoods has not been exceeded.

Thus if the neighborhood served by that smart CMRTS fiber node has not requested that data, then the empty QAM CATV cable channel (118) becomes available to carry alternate types of data to that neighborhood. Rather than filling up the limited carrying capacity of the CATV cable with unwanted QAM channels intended for other neighborhoods, the limited carrying capacity of the CATV cable can instead be focused on the needs of that particular neighborhood.

In FIG. 5, neighborhoods 1 and 2 are served by the invention's improved "smart" CMRTS fiber nodes (300). By contrast, neighborhood 3 is only served by a prior art "dumb" fiber node (204).

In order to continue to provide a decent level of DOCSIS or other customized services to neighborhood 3, the Improved CMTS shelf (500) and CMTS line card (502) may elect to send at least a subset of the DOCSIS QAM channels (116) (here shown as DOC1), needed by neighborhood 3.

Here this will be less efficient, because the neighborhood 3 data is also sent to all neighborhoods by Fiber 1, along with the video data (114) generally used by all neighborhoods, and neighborhoods 1 and 2 are not interested in this neighborhood 3 data. However this preserves neighborhood 3 service, and keeps backward compatibility intact.

In order to provide superior DOCSIS or other IP/on-demand services to neighborhood 1 and 2, the improved CMTS (500) and CMTS line cards (502) have loaded the customized data requested by neighborhoods 1 and 2 onto Fiber 2 (302) (304) (312), (310). Fiber 2 will usually be routed to all neighborhoods, and indeed may of course simply be Fiber 1 using an alternative wavelength and optionally a different protocol.

As a result, the system's effective ability to deliver customized data to neighborhoods 1 and 2, served by the improved "smart" CMRTS fiber nodes (300) and improved CMTS (500), (502) has substantially increased, because the IP/On-demand channels can be customized with data specific to each neighborhood. At the same time, backward compatibility is preserved because neighborhood 3, which still uses a prior art dumb fiber node 3 (204) can continue to make use of the DOCSIS subset channels transmitted by Fiber 1 (222).

Figure 5A:
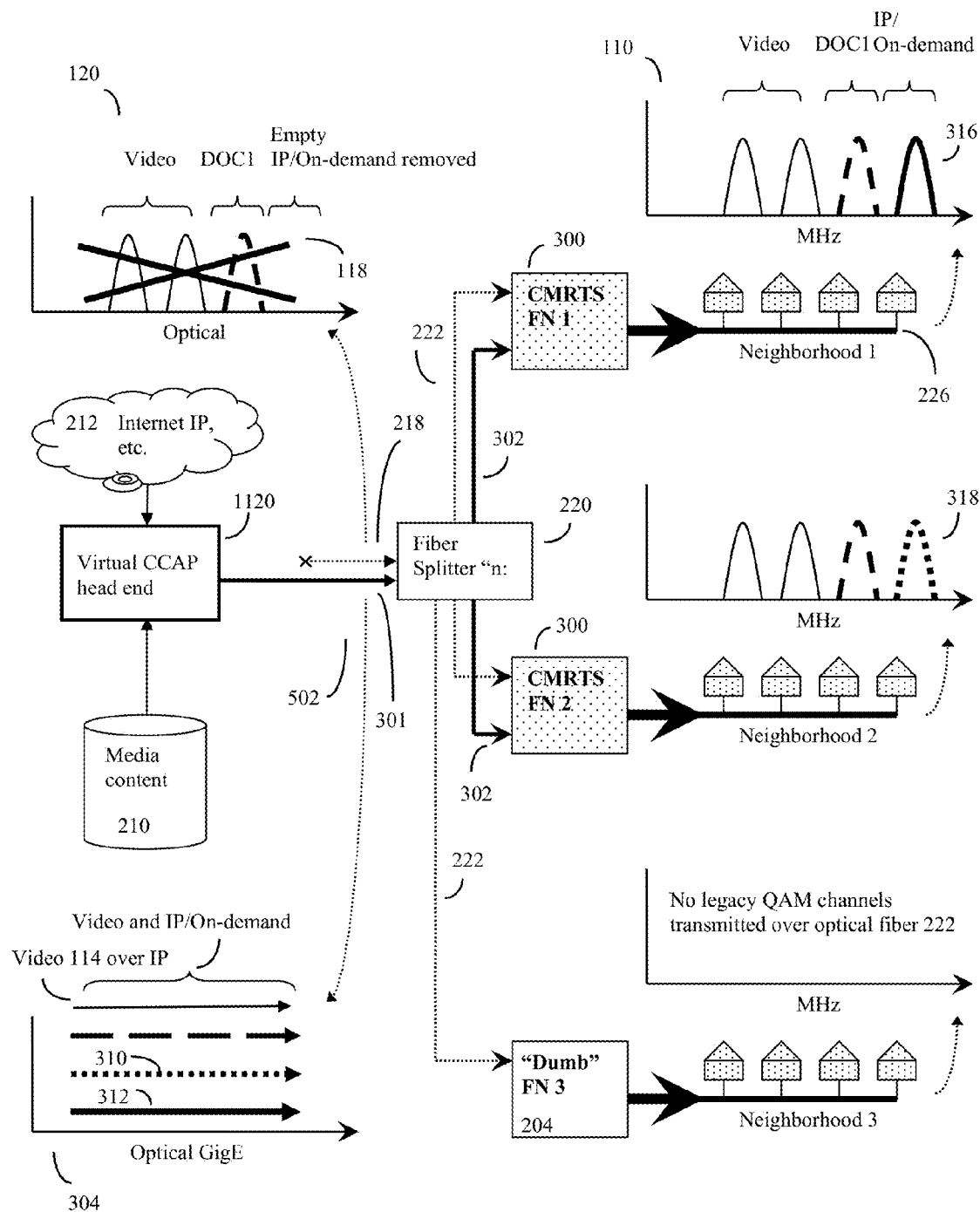
FIG. 5A shows an alternative embodiment using an edge-router based virtual CCAP or virtual cable head that only works on an IP basis (e.g. sending and receiving only Ethernet packets), and otherwise generates no legacy QAM signals at the cable head at all. Instead the various CMRTS units at the various optical fiber nodes take Ethernet packets or other digital data format, and generate all cable QAM signals or other legacy cable RF waveforms. Thus in this scheme, a legacy "dumb" optical fiber node would send and receive no signals at all to and from its neighborhood CATV cable.

FIG. 5A shows an alternative embodiment using an edge-router based virtual CCAP or virtual cable head (1120) that only works on an IP basis (e.g. sending and receiving only Ethernet packets), and otherwise generates no legacy QAM signals (120) at the cable head at all. Instead the various CMRTS units at the various optical fiber nodes take Ethernet packets or other digital data format, and generate all cable QAM signals or other legacy cable RF waveforms. Thus in this scheme, a legacy "dumb" optical fiber node (204) would send and receive no signals at all to and from its neighborhood CATV cable. Neighborhood 3 will be cut off from the HFC system until its "dumb" optical fiber node 3 (204) is upgraded to a CMRTS optical fiber node.

Here optical fibers (218) and (222) may carry no legacy signals at all, and thus (218) and (222) are shown with smaller dotted lines to illustrate this difference. By contrast, all the data is now traveling over the optical fiber (301) and (302), and in a digital format (304). Thus (301) and (302) are shown with heavier lines to illustrate that they are now handling all of the data traffic. Note that in this scheme, although certain standard channels, such as video (114), may still be transmitted to all cable users, even these standard video channels will be digitized at the head end, transmitted to the various CMRTS units as digital traffic (e.g. Ethernet packets/frames), and reconstituted by QAM modulators at the CMRTS units.

Note of course that since the first optical fiber (218) and (222) is no longer being used to transmit any legacy CATV signals, then the cable operator does not actually need to run a second physical optical fiber (301), (302) or use a second optical fiber wavelength to carry the digital traffic. However for consistency between the various embodiments of the invention, the term "second optical fiber" will continue to be used in this case.

Figure 6:
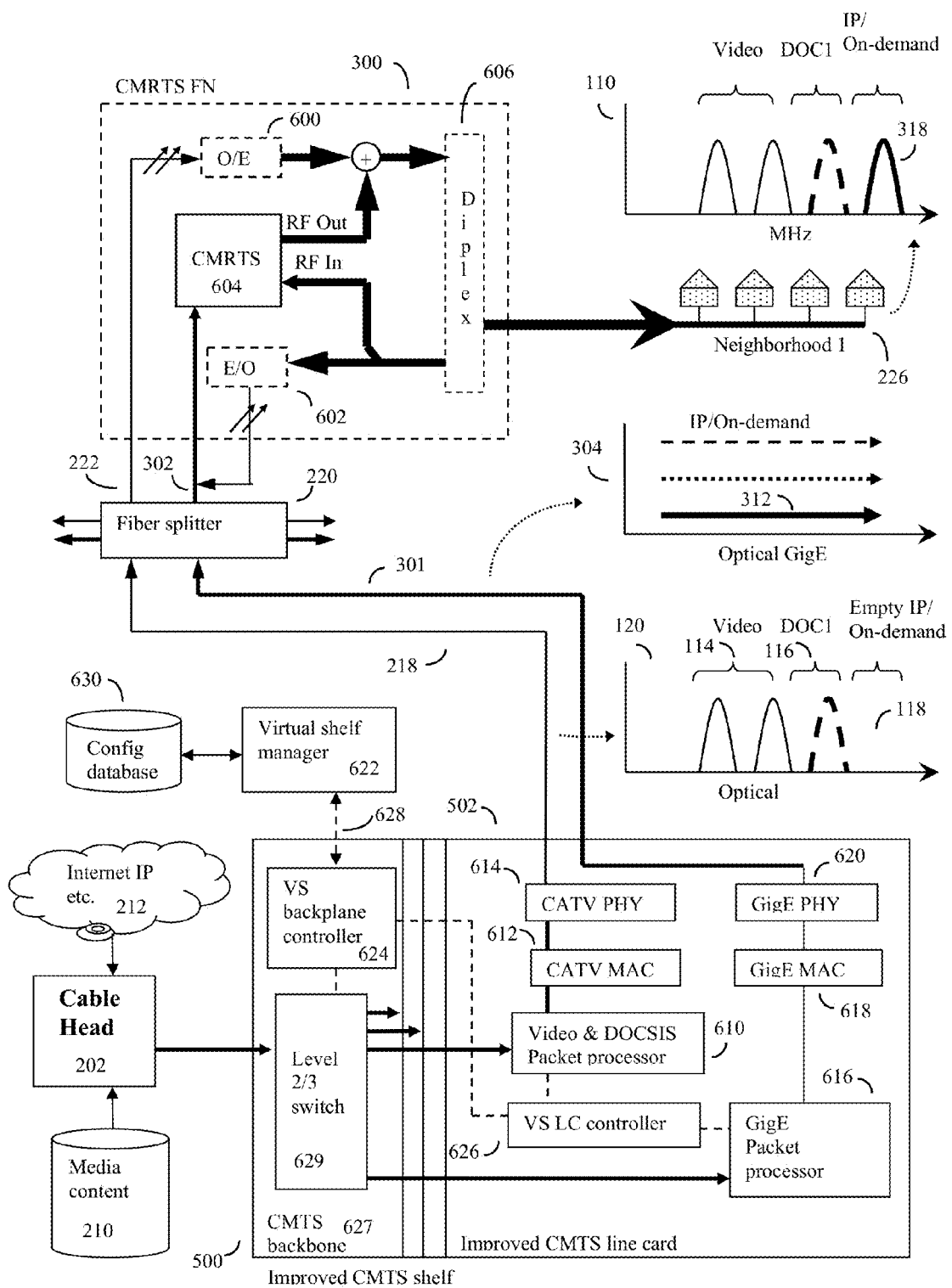
FIG. 6 shows additional details of how some embodiments of the CMRTS fiber nodes may be constructed and operate in the second option.

FIG. 6 shows additional details of how the "smart" CMRTS fiber nodes (300) may operate in conjunction with an improved cable head of cable head CMTS (500) and improved CMTS line cards (502). For simplicity, again primarily the downstream portion of the system is shown. The CMRTS fiber nodes (300) may have an optional simple optical to electric (O/E) (600) converter (here shown with a dashed line to illustrate the optional nature of this converter) to convert the main (standardized) CATV analog (FDM and QAM) data/waveforms (120) optically transmitted by Fiber 1 into an RF signal. That is, this optional O/E converter is an optical to RF (radio frequency) conversion device that directly converts a first set of RF modulated optical fiber signals to a first set of CATV RF signals. The CMRTS fiber nodes (300) may often also have an optional electric/optical (E/O) (602) converter (here shown with a dashed line to illustrate the optional nature of this converter as well) to take the upstream RF data from the CATV cable, and convert it to an optical signal suitable for sending back to the cable head by either Fiber 1 (not shown) or Fiber 2 as desired. In other words, this optional E/O converter is a RF (radio frequency) to optical conversion device that, at least when legacy head end operation is desired, directly converts a first set of upstream CATV RF signals to RF modulated optical fiber signals and sends said RF modulated optical fiber signals upstream relative to the CMRTS unit.

The CMRTS fiber node (300) will also contain a CMRTS unit (604) that will take the customized IP/on-demand data signal (304) from Fiber 2 (301), (302), RF modulate this data (often RF QAM modulate) to an appropriate empty CATV RF QAM channel (118), and transmit this customized data onto the CATV cable (226). When no legacy head end operation is desired, all CATV RF QAM channels and other RF channels may be transmitted by this method.

The RF converted main CATV analog (e.g. QAM channels) signal (114), (116) from fiber 1 (if any) (218), (222), and the frequency shifted standard or customized IP/on-demand QAM channel (318) from fiber 2 (301), (302), (312), may be combined as needed (for example by using a Diplex unit (606) located either inside or outside of the CMRTS fiber node (300)), and the full reconstituted CATV signal containing any standard CATV video (114) and DOCSIS CATV subset (116), and the standard or extended IP/On-demand QAM modulated data (318) is then sent out to the various houses in the neighborhood using the CATV cable (226).

As previously discussed, it should be appreciated that since at least initially most HFC systems will consist of a changing mix of both improved CMRTS fiber nodes and older "dumb" fiber nodes; this will impose a considerable configuration and management problem on the CMTS unit (500) at the cable head (202), particularly since at least some cable operators may wish to phase in operations of virtual head ends (1120). This for both situations, this complexity can be handled by a computerized network management system and software variously termed the "virtual shelf", or (for the virtual CCAP systems taught in application Ser. No. 14/098,656), the virtual CCAP software.

In one embodiment of the improved "virtual shelf" system, particularly useful when at least some preservation of legacy head end equipment is desired, the CMTS (500) and improved CMTS line cards (502) may be configured with both packet processors (610), and MAC (612) and PHY (614) devices or functionality to transmit standard CATV analog, QAM, and DOCSIS signals onto the first (main) optical fiber 1. The same line cards may also be configured with packet processors (616), MAC (618) and PHY (620) functionality to transmit supplemental IP/On-demand extended DOCSIS data on optical fiber line 2 or fiber wavelength 2. As previously discussed, the Fiber 2 extended data may often be encoded by an entirely different (non-QAM) methodology (304), such as Ethernet data packets/frames. As a result, the MAC (618) and PHY (620) for Fiber 2 can be different (e.g. follow standard GigE protocols) from the MAC (612) and PHY (614) used for Fiber 1. Again, of course, if no legacy CATV signals, such as legacy QAM signals are being used by the head end, such as in a virtual CCAP head end, then the GigE signals or other data packets can be transmitted using Fiber 1 as well.

The exact mix of Fiber 1 and Fiber 2 signals transmitted and received by the improved line card will vary depending upon what sort of fiber nodes are connected downstream (southern end) to the line card (502).

For example, if all of the fiber nodes were "dumb" prior art fiber nodes (204), then the CMTS line card would only transmit on Fiber 1, and the functionality of that particular CMTS line card would be backward compatible with prior art CATV DOCSIS equipment and fiber nodes. That is, Fiber 1 (218), (222) would transmit the full set of DOCSIS channels, and Fiber 2 (301), (302) will transmit nothing because there are no CMRTS fiber nodes (300) available to listen to the Fiber 2 data.

By contrast, if all of the fiber nodes were "smart" improved CMRTS fiber nodes (300), then the improved CMTS (500) and CMRTS line card (502) might elect to maximize all DOCSIS channels (116) and transmit all available customizable data to the various households on Fiber 2. In this case, Fiber 1 would only be used for transmitting standard video channels (114).

If all of the fiber nodes were "smart" improved CMRTS fiber nodes (300), and the legacy head end (202), (214) was replaced with an edge router (1104) type virtual CCAP head end (1120), then even the standard video channels (114) would be digitized and sent over Fiber 2, often in the form of Ethernet packets/frames, and reconstituted at the improved CMRTS fiber nodes (300). In this case no legacy signals would be sent over Fiber 1. Fiber 1 being empty of all legacy signals, the cable operator would be free to use it instead of Fiber 2. That is, one of the fibers, either 1 or 2 may be redundant in this case.

These alternative schemes would maximize the number of vacant QAM channels on the CATV cable, and thus allow the highest amount of customized data to be sent to the houses on that particular stretch of cable.

In a mixed "dumb" fiber node (204) and "smart" CMRTS fiber node (300) situation, where some legacy video and other CATV signals are still transmitted from the head end (as previously shown in FIG. 5), the improved CMTS (500) and CMRTS line card (502) should ideally elect to transmit and receive standard video channels (114) and a subset of DOCSIS (116) information to and from neighborhood 3 (served by the "dumb" fiber node), using Fiber 1 to continue giving adequate service to neighborhood 3.

However to give superior performance to neighborhoods 1 and 2 (served by the "smart" CMRTS fiber nodes (300)), the improved CMTS (500) and CMTS line card (502) should ideally keep at least some DOCSIS QAM channels vacant on Fiber 1. The "smart" CMRTS fiber node (300), which may be instructed by outside commands (to be discussed) will then determine or at least select what GigE data (304) (e.g. Ethernet packets/frames) transmitted by Fiber 2 (302) is needed by its particular neighborhood, QAM modulate it, and distribute it to its neighborhood on the empty QAM channel. In the FIG. 6 example, data (312) has been QAM modulated and transmitted as QAM waveform or data (318).

Thus the same empty QAM channel frequency can transmit one set of data to the houses in neighborhood 1, and a different set of data on the same empty QAM channel frequency to the houses in neighborhood 2.

This scheme is both highly efficient and backwards compatible, however it imposes a significant configuration and management burden on the cable head CMTS. This is because each time a "dumb" fiber optic node (204) is converted to a "smart" CMRTS fiber node (300), the configuration of the network changes. This burden becomes even greater for virtual CCAP systems.

As previously discussed, in order to manage this complexity, the functionality of the improved CMTS (500) and CMTS line cards (502), as well as usually the functionality of the CMRTS fiber nodes (300), may be extended by use of additional "virtual shelf" network management computers, controllers, and software. If a virtual CCAP head end is being used, this virtual shelf network management system may be further extended to add additional edge router control functions, in which case the virtual shelf will be termed virtual CCAP software.

In one embodiment, a unified network management system (exemplified by, for example, the ConfD management system provided by Tail-f incorporated) is added to the improved CMTS (500) and line card (502) to unify the network and CMTS hardware and virtualization layer, provide operating system services, manage middleware, and configure the system to use the proper networking protocols. In this embodiment, all or at least much network configuration data is stored on a database in the CMTS manager, and the configuration of the network is controlled by a process in which the management software (ConfD) communicates over IPC (sockets) with apps that control the function of various packet processors, MAC, and PHY devices on the improved CMTS and CMRTS units.

Here the a computer or processor and associated software memory (622) are shown directly controlling the operation of an improved CMTS unit (500) by way of various other controllers (624), (626) located in the improved CMTS backbone (627) and line cards (502). The communications between this "virtual shelf manager" (622) and the local controller processors (624), (626) are shown as dashed lines (628). The virtual shelf manager may also control the operation of a level 2/3 switch (629) and/or other devices that connect the improved CMTS unit to the media content (210), Internet IP/On-demand data or "cloud" (212), and other services provided by the cable head (202).

In the case where the virtual shelf manager is virtual CCAP software used to manage a virtual CCAP head end, such as an edge router (1104) and controller (1102) previously described in parent application Ser. No. 14/098,656, much of the underlying logic may be the same as above, except that here commands that would normally be directed to the head end line cards and controllers discussed above will instead be directed and formatted to manage the edge router (1104).

The virtual shelf manager (or virtual CCAP software) may often also manage the configuration of the various "smart" CMRTS fiber nodes (300), often by communicating with controllers and applications software embedded with the CMRTS fiber nodes (not shown). Given the typically long distances between the CMRTS fiber nodes (300) and the virtual shelf manager (622) and improved CMRT (500) (which will often be located at the cable head, miles or more away from the various nodes (300)), the CMRTS fiber node (300) to virtual shelf manager (622) communication will often be done by various signals and signal protocols communicated by optical fibers 1 or 2. In one preferred embodiment, socket based inter-process communication (IPC) protocols are used.

This enables the configuration of the CMTS shelf, (or virtual CCAP system) and indeed the overall network, to be rapidly reconfigured to meet the ever changing network model generated by the invention. Often it will be convenient to store this network configuration, as well as the properties of the various network devices, in a configuration database (630) and configuration database memory device (not shown).

Figure 7A:
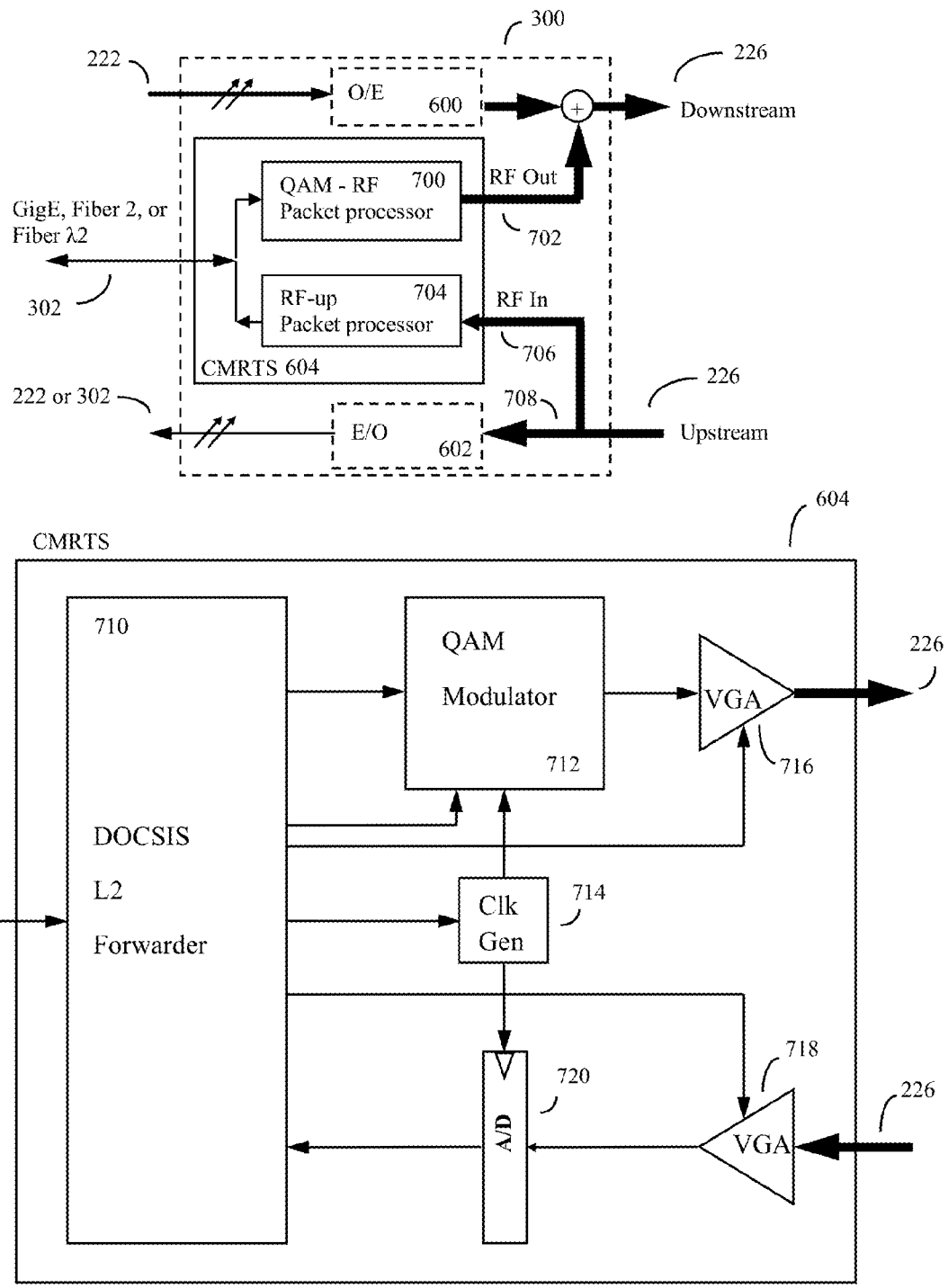
FIG. 7A shows additional details of the CMRTS fiber nodes.

FIG. 7A shows more details of the CMRTS fiber node (300) (here shown without the diplex unit and/or signal combiner (606) (e.g. a diplex RF signal combiner device) and the CMRTS unit (604). At a higher or at least alternate level of abstraction, the CMRTS unit of the CMRTS fiber node will typically comprise a first QAM-RF packet processor (700) with MAC and PHY units that convert the downstream data on Fiber 2 to a plurality of radiofrequency (RF) QAM waveforms (channels) and output this data downstream (702) to the local CATV cable. As previously discussed, if additional legacy fallback capability is desired, the CMRTS fiber node may also have an optional optical to electrical converter (600) capable of directly converting the CATV waveforms sent on Fiber 1 to RF CATV waveforms suitable for injecting into cable (226)

This CMRTS unit may also optionally comprise a second RF-upstream packet processor (704) that will read the upstream RF signals (data) sent by cable modems connected to the local CATV cable (706), and convert this upstream data to appropriate Ethernet or other data communications protocols suitable for communicating this cable modem data back upstream to the improved CMTS (500) at the cable head by way of Fiber 2. In some embodiments, this RF-upstream packet processor is optional because alternatively (for backward compatibility) the upstream data sent by the cable modems may be returned to the CMTS by simply taking the upstream RF signal (708), running it through an electrical to optical converter (602), and transmitting it back to the CMTS by way of Fiber 1 (222). However for the virtual CCAP embodiment, where the head end may be based on an edge router that can only handle digital signals such as Ethernet data packets/frames, the RF upstream packet process is generally not optional, and instead it is the electrical to optical converter (602) that is optional.

The operation of both packet processors (700), (704) and if desired, the optional O/E and E/O converters (600), (602) may be remotely controlled by the virtual shelf manager (622) by way of suitable controllers (often microprocessors), and local applications software (Apps) that intercept data from Fiber 1 (222) or Fiber 2 (302), and receive and send commands, often by way of a specialized communications protocol such as the previously discussed sockets protocol.

At a deeper level that exposes more details of the PHY units in both the QAM-RF packet processor (700) and the optional RF-upstream packet processor (704), The CMRTS unit (604) will normally comprise a data switch, such as a DOCSIS Level 2 forwarder (710), at least one controller (often a microprocessor and associated software, not shown), various QAM modulators (712) to take the DOCSIS data and/or other IP/on-demand data from Fiber 2 (302) and convert, QAM modulate, and frequency shift the data as needed to fit into suitable empty CATV channels. To do this, CMRTS unit may employ a controllable clock generator (714) to control the frequency and timing of the QAM channels, as well as variable gain amplifier (VGA) units (716), (718) to help the PHY portions of the units manage the analog processes in converting signals back and forth between the CMRTS unit (300) and the cable RF signals.

As before, the DOCSIS Level 2 forwarder (710) switches, and the switches that control the QAM modulators (712) and analog to digital (A/D) units (720) may be remotely controlled by the virtual shelf manager (622) by local (embedded) controllers (often microprocessors) and associated applications software by commands to and from the Virtual Shelf software. As before, often these commands may be sent over the same Fiber 1 or Fiber 2 pathways normally used to transmit other data, and again may use socket based inter-process communication (IPC) protocols.

In some embodiments, particularly useful when legacy head end equipment is being used, the return process for processing upstream data can implement the earlier electronic to optical (E/O) converters and send the upstream signals back with essentially no modification other than the conversion to light wavelengths. Alternatively, the upstream process may be an upstream version of the invention's previously discussed downstream processes, in which CMRTS digitizes the upstream data and converts it to digital data packets, such as Ethernet data packets/frames, prior to upstream transmission over optical fiber 1 or 2.

In one embodiment, the variable gain amplifier (VGA) units (718) will convert the incoming upstream RF signal from the local neighborhood CATV cable into a signal which is then tuned into and digitized by the clock generator and A/D converter, and then forwarded by the DOCSIS Level 2 forwarder or other switch (710) towards the cable head, often using Fiber 2 (302) so as to allow greater amount of upstream data to be sent. Here again, the DOCSIS Level 2 forwarder and conversion circuitry (710) may be controlled by commands from the Virtual Shelf software.

Figure 7B:
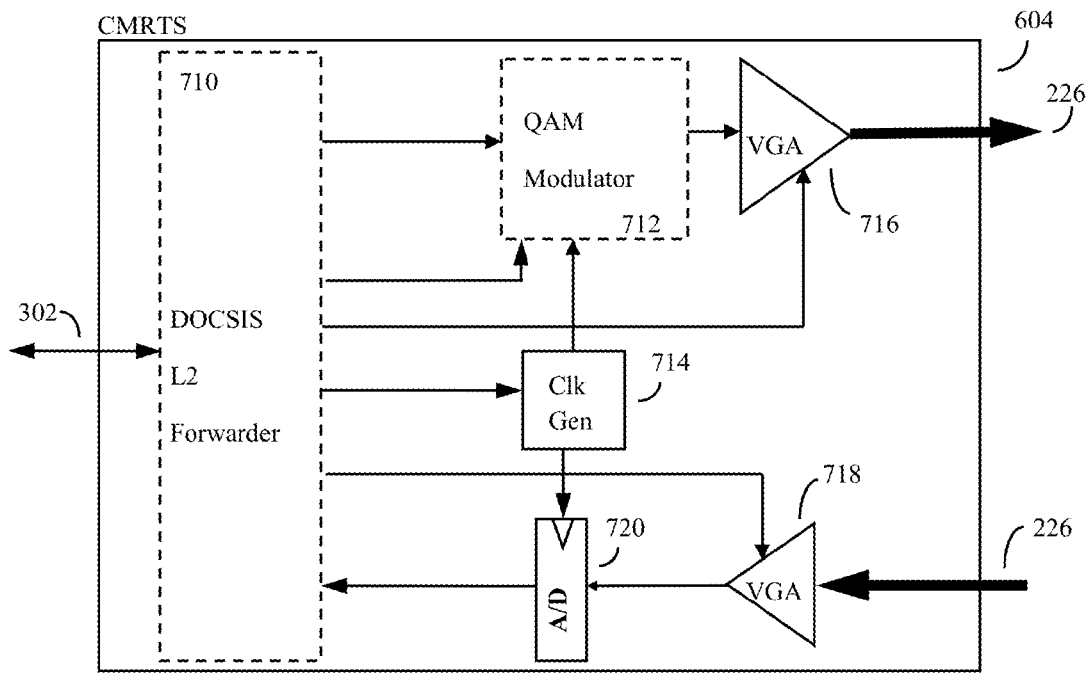
FIG. 7B shows additional details of CMRTS fiber nodes employing FPGA and DSP based MAC and PHY units, here configured to reproduce the same functionality as previously shown in FIG. 7A.

FIG. 7B shows additional details of CMRTS fiber nodes employing FPGA and DSP based MAC and PHY units, here configured to reproduce the same functionality as previously shown in FIG. 7A. Here DSP (740) and the FPGA (742) devices implement the functionality of the MAC and PNY units of the DOCSIS Level 2 Forwarder (710) and QAM modulator (712). Depending on the FPGA used, other functions, such as the A/D and D/A converters, may either be implemented by the FPGA or by other devices external to the FPGA. In some embodiments, to be described, the FPGA (742) can be configured to implement a filter bank type RF QAM modulator to replace the functions of QAM modulator (712). Here again depending on the characteristics of the FPGA used, the FPGA output may be further processed through a D/A converter (744) and power amplifier (746) to produce RF modulated signals (here QAM RF signals) of sufficient power levels for the CATV cable (226).

Program and data memory for the DSP can be stored in computer memory such as Flash and DRAM memory, shown as (748) and (750) respectively.

Figure 8:
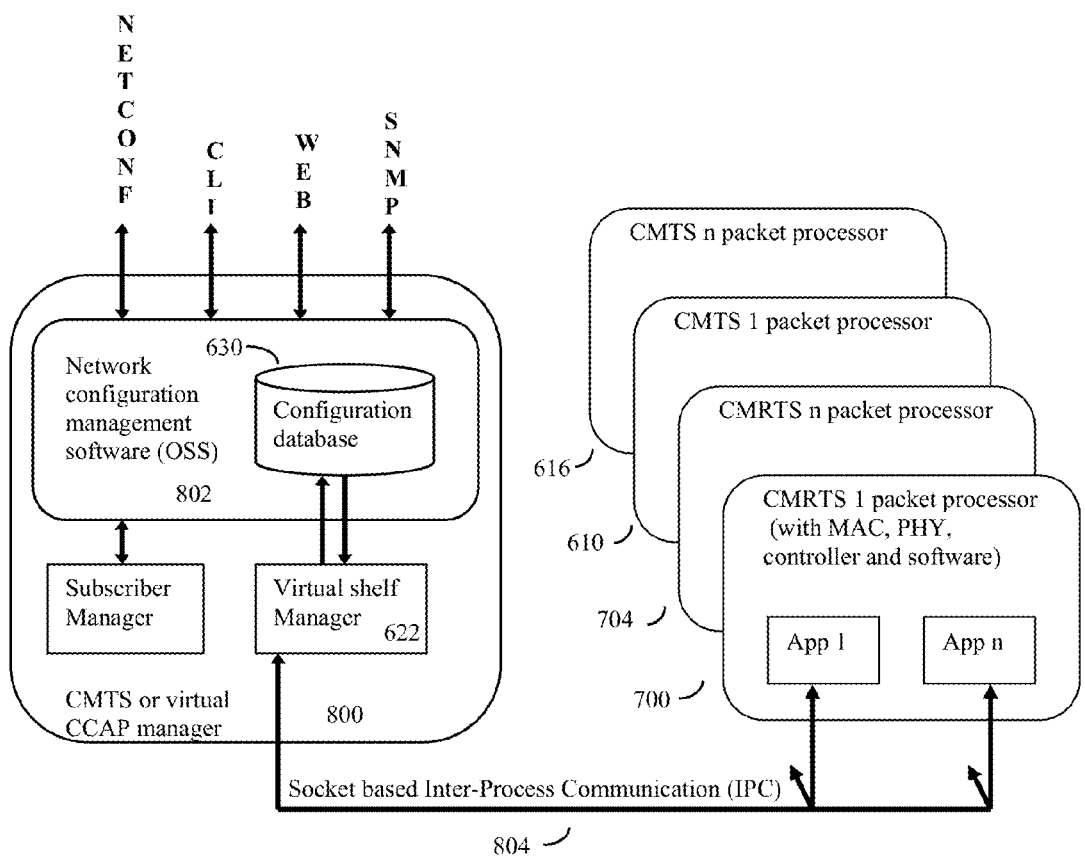
FIG. 8 shows an overview of how the distributed cable modem system may be configured by way of "virtual shelf" software that controls the operation and data flow of the system's CMTS (or virtual head end) and CMRTS devices.

FIG. 8 shows more details of how the virtual shelf manager (622) and the configuration database (630) (previously shown in FIG. 6) may control the functionality of most or all of the plurality of CMRTS fiber nodes (300), improved CMTSs (500) and CMTS line cards (502) (or optionally the operation of edge router 1104) and optionally other active nodes and switches in the HFC network system.

In this example, the virtual shelf manager software (622) is shown running as a module of a broader CMTS manager software package (800); however it also may be run as a standalone package, or as part of the virtual CCAP software. The CMTS manager software (800)/virtual CCAP software, which will often be run on one or more computer processors (such as in controller 1102) which may be located at the cable head or other convenient location, will often be based on network configuration management software (802). Such network configuration software (802) (also called the Operational Support Systems (OSS) software) may be, for example, software based upon the ConfD network management software produced by Tail-f Systems Corporation, Stockholm Sweden (International location) and Round Hill Va. (US location).

In this embodiment, use of software such as ConfD is useful because this type of network management software also provides a number of convenient and commonly used interfaces to allow users to interact with the network and control then network configuration. These interfaces may include NETCONF management agents, SNMP agents, Command Line Interfaces (CLI), Internet (Web) interfaces, and other agents/interfaces as desired.

The virtual CMTS shelf software that may be used to control the status of the various CMTS line cards (502) and CMRTS fiber nodes (300), or edge router (1104) will often interact with a network configuration database (630) run under the control of this network configuration software (802). The virtual CMTS shelf software will in turn send commands out to most or all of the various remote CMRTS fiber nodes, as well as control the operation of the CMTS (500) or edge router (1104) at the cable head, and other devices as desired. As previously discussed, one preferred way for this control to be achieved is by way of socket based inter-process communication (IPC) protocols and packets (804), which may be sent over the same communications lines used to send the CATV and DOCSIS data, such as the Fiber 1 (218) and Fiber 2 lines (302). In this situation, for example, controllers running various types of application software (Apps) in the plurality of remote packet processors (700), (704) in the remote CMRTS fiber nodes (300) can listen for appropriate commands from the virtual shelf manager (622), and adjust the operation of the CMRTS packet (700), (704) processors accordingly. These CMRTS fiber nodes can also transmit their status back to the virtual shelf manager using the same protocols.

The device configuration database (630) of the virtual shelf manager system will often have multiple data fields, including fields that contain the identification code and/or addresses of the various CMRTS units in the network (CMRTS identifier fields). The database will also usually have information on the status of the various cable modems connected to the various CMRTS units, including the cable modem identification data (cable modem identification data fields) and the privileges of the various users that are associated these various cable modems. For example, one user may have privileges to access a broad array of services high bandwidth upload and download data, while another user may have limited access to a different set of services and more limited upload and download data privileges. Other functions that may be implemented include event logging, Authentication, Authorization and Accounting (AAA) support, DOCSIS Management Information BASE (MIBs) functions, etc.

Other fields that normally will be in the database will include information as to user identification fields (user privilege fields), available DOCSIS channels, available IP addresses, instructions for how to remotely configure the various CMRTS software controllable switches, and instructions for how to remotely configure the various CMRTS software controllable RF packet processors.

The virtual shelf manager and configuration database, as well as other components of the system, will usually be run on a computer system with at least one microprocessor, as well as standard hardware and software, such as MAC and PHY units, that will enable the virtual shelf manager to send and receive data packets (often through the IPC protocol) to the various remote CMRTS units on the network.

The OSS software (802) can inform the virtual shelf manager software about the privileges, certificates, and encryption keys assigned to the various users. The OSS can also set policies or allocation limits regarding the frequency and bandwidth that will be assigned to the various channels. The OSS can also respond to queries from the virtual shelf manager when new modems are detected. The OSS can further take statistical data collected by the virtual shelf manager, such as packets transmitted and received, volume of data, and use this information for billing and network management purposes.

Further information on OSS functions, and more examples of functions that may be implemented in the OSS software for the invention, may be found in Misra, "OSS for Telecom Networks: An Introduction to Network Management", Springer (2004).

For example how this system would operate, consider the case where a new cable modem is first connected to the system. The cable modem will send an upstream DOCSIS signal (226) to the CMRTS (604). The RF-up packet processor (704) in the CMRTS (604) will in turn collect the information relating to the cable modem identification number, and other relevant parameters, repackage the data in a digital format, and send it back upstream to the virtual shelf manager system on the fiber GigE link (302). The virtual shelf manager system (622) will look up the cable modem identification data in the device configuration database (630), and determine the privileges of the user associated with the cable modem identification data, and depending upon the value of the user privilege field, available DOCSIS channels, and available IP addresses, send data packets to the CMRTS (700) unit, often by way of the IPC protocol (804) that controls that particular cable modem.

These data packets will interact with applications (e.g. App 1, App n) and configure the software controllable switch(es) on the CMRTS unit (700), to configure the software controllable switches on the QAM-RF packet processor (700) and the cable modem available IP addresses so as transmit downstream data to the cable modem on a first available DOCSIS channel. The data packets will also configure the software controllable RF packet processor (704) to receive upstream data from the cable modem on a second available DOCSIS upstream channel and IP address and retransmit the upstream data as a third upstream digital optical fiber signal (302).

Often the virtual shelf manager (622) will handle IP addresses for the cable modems through the proxy Dynamic Host Configuration Protocol (DHCP) service, or other method.

As also discussed elsewhere, one particular advantage of this approach is its excellent forward and backward compatibility. The same CMRTS units can be used in present HFC networks, HFC networks using conventional CMTS units (option one), advanced HFC networks using advanced CMTS units (option two), or even more advanced HFC networks using edge-router type virtual CCAP head ends (option three).

As an example of the advanced CMTS option two system in operation, suppose that as a result of routine maintenance, the "Dumb" fiber node 3 (204) from FIG. 5 is now replaced by a "smart" CMRTS fiber node 3 (300). As a result of this change, the network may wish to optimize the performance of this branch of the network by, for example, now configuring the CMTS line card (502) that sends a signal to Fiber splitter "n" (220) to now stop sending the DOC1 (116) channel on Fiber 1 (218), (222). By no longer transmitting the DOC1 channel on Fiber 1, additional empty channels (frequencies) are created on this branch of the HFC network that instead can be used to transmit additional IP/On-demand data by way of Fiber 2 (301), (302).

In order to accomplish this change, the virtual shelf manager (622) may send commands to the appropriate Level 2/3 switch (629) and CMTS line card (502) reconfiguring the CATV Video and DOCSIS packet processor (610), CATV MAC (612), and CATV PHY (614) to no longer transmit the DOC 1 channel. The virtual shelf manager will also send commands to the appropriate Level 2/3 switch (629); GigE (Gigabyte Ethernet) packet processor (616), the GigE MAC (618), and the GigE PHY (620), to alternatively send the data that normally would have been transmitted by the DOC 1 channel on Fiber 1 (218) to now transmit this data by Fiber 2 (301). The virtual shelf manager will also communicate with CMRTS fiber nodes 1, 2, and new CMRTS fiber node 3 (300) instructing the fiber nodes to look for the former DOC1 data on Fiber 2 (302) using the QAM-RF packet processor (700) and/or the DOCSIS L2 forwarder (710) and use QAM modulator (712) to QAM modulate this DOC1 data, and send the data out on the empty DOC1 channel (116). The virtual shelf manager can now make better use of this formerly inefficiently used DOC1 channel (frequency) because now it is used to send neighborhood specific data.

Here the improvement in flexibility increases the amount of data available to the system's users. Under the prior art system the DOC1 QAM signal on the Doc1 channel (frequency) (116) was transmitted to all three fiber nodes to the cables in three different neighborhoods, regardless of if any cable modems hooked to CATV cable attached to a particular fiber node needed the data or not. Now, by replacing "dumb" fiber node 3 (204) with "smart" CMRTS fiber node 3 (300), the ability of the other neighborhoods to receive a broader array of customized IP/On-demand services has been increased.

Continuing with this example, further suppose that the CMRTS unit (604) in new CMRTS fiber node 3 (300) experiences an early mortality failure soon after installation. In this case, the optional O/E and E/O portions (600), (602) of CMRTS fiber node 3 will continue to operate, and as a result, the failed CMRTS fiber node 3 (300) now acts like "dumb" fiber node 3 (204) again. In this case, the virtual shelf manager (622) can cope with this failure by simply rolling back the changes that it just made, and service to all three neighborhoods can continue (at the less capable prior level) while the failed new CMRTS fiber node 3 is serviced.

The data and software needed to configure the FPGA and DSP devices for the CMRTS MAC and PNY units (configuration data) can be stored in more than one place. In some embodiments, this configuration data can be stored in memory (i.e. RAM, ROM, Flash memory, etc.), such as FIG. 7B (748) onboard the remote CMRTS units. Indeed configuration data for more than one FPGA and DSP configuration may by be so stored, and the CMRTS units may be equipped with some capability to self-configure depending on local circumstances. Alternatively or additionally, however, the configuration data will often be stored outside of the CMRTS, such as in the remote virtual shelf manager configuration database (630) previously discussed.

Figure 7B:
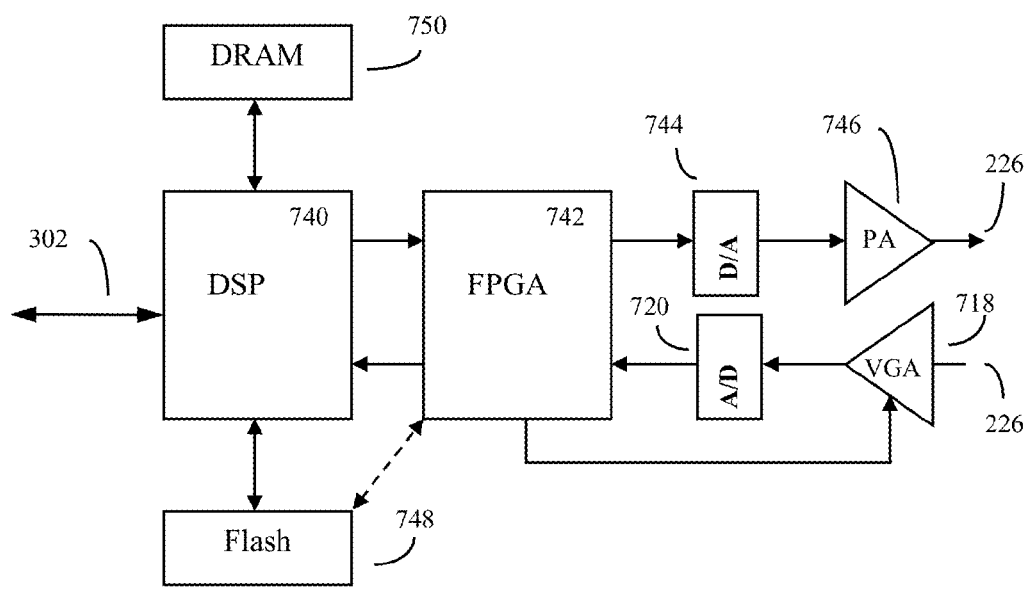

In this later approach, the remote virtual shelf manager (622) can then reconfigure the CMRTS FPGA and DSP based MAC and PHY under central control, using the same type of Socket based Inter-Process Communication (IPC) (804) or other approach. The net effect of this later system is to, in effect, allow instant "field upgrades" of the CMRTS units whenever the managers of the system so desire. Thus for example, a updated FPGA program or image can be downloaded from the configuration database (630) to the CMRTS onboard flash memory (FIG. 7, 748), and then used to update the configuration of the FPGA to allow for additional CMRTS MAC and PHY hardware capability as needed. The DSP program and data can also be updated using this method.

Thus to summarize, the CMRTS FPGA and DSP units can be reconfigured by a virtual shelf manager system, such as FIG. 8 (800) with a device configuration database (630) with at least CMRTS identifier fields, cable modem identification data fields, the privileges of users associated with these cable modem identification fields (user privilege fields), available DOCSIS channels, available IP addresses, instructions to configure said at least one software controllable switch, and instructions to configure remotely software controllable RF packet processor. This virtual shelf manager system will generally comprise at least one processor; and hardware and software capable of sending and receiving data packets to and from a plurality of remote CMRTS units (e.g. 700, 704).

The device configuration database (630) can thus additionally comprise a plurality of FPGA configuration data and DSP program data. The virtual shelf manager can download at least some of this FPGA configuration data and/or DSP program data to various remote CMRTS fiber nodes (e.g. installed CMRTS nodes in the field, such as 700, 704) as needed.

Figure 9:
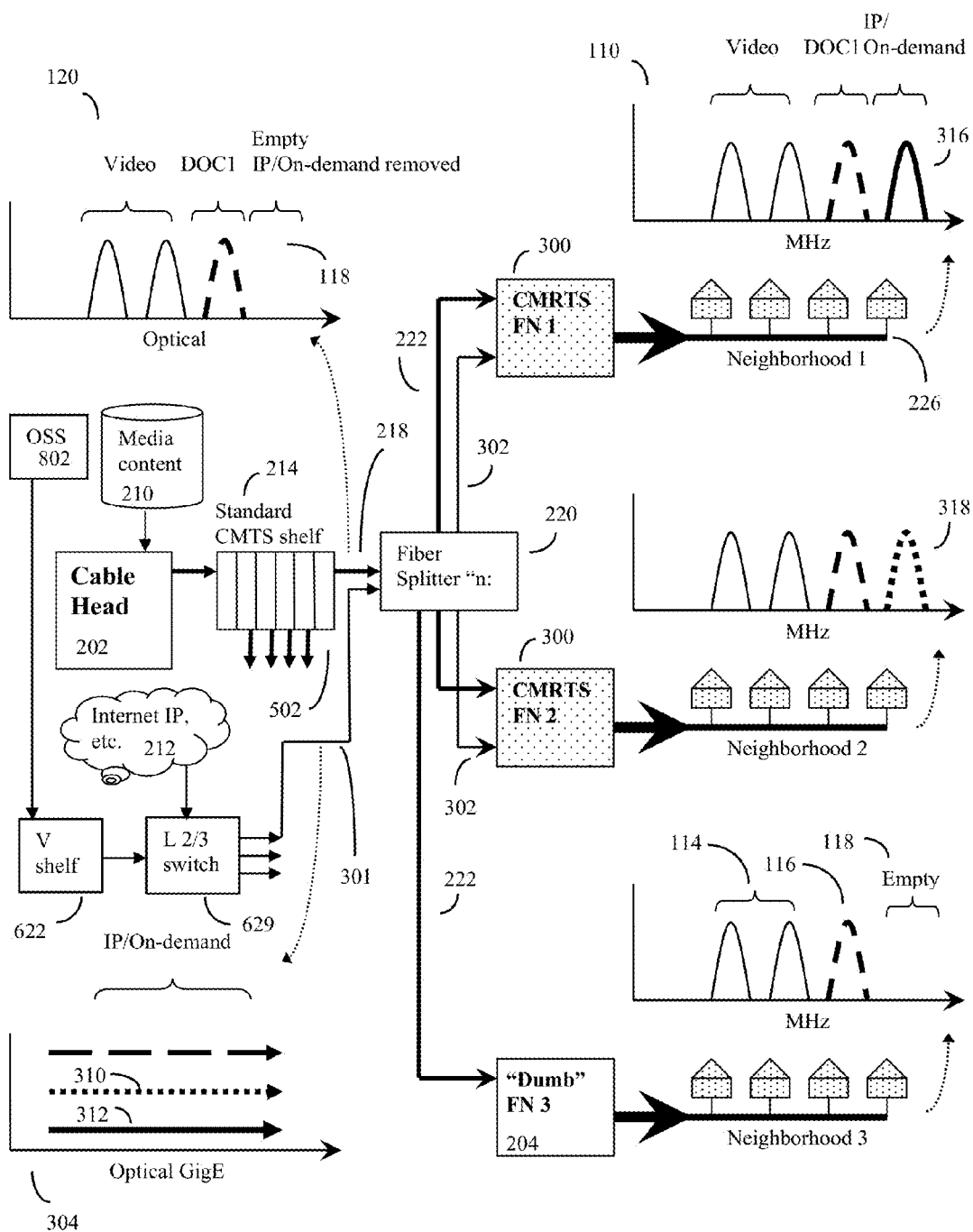
FIG. 9 shows how an alternative embodiment (here the first option is shown) of the invention's distributed cable modem termination system, working with a prior art CMTS, can distribute a greater effective amount of downstream data to various CATV cables serving multiple users in different neighborhoods.

FIG. 9 shows an example in which the invention's CMRTS system is used in a more conventional CMTS HFC system. Here the CMTS shelf is a standard (prior art) CMTS shelf (214), that has been configured by the cable operator to leave some QAM channels (DOCSIS channels) empty. The data that is handled by the CMRTS units (604) in the CMRTS Fiber Node (300) is handled in a manner that is completely separate from the data handled by the standard CMTS shelf (214), which is simply passed back and forth from the local cables (226) in the various neighborhoods by the optional simple O/E (600) and E/O (602) devices in the CMRTS fiber node (300).

Here, the Internet/IP etc. data (212) destined for the various CMRTS units (604) are handled by a Level 2/3 switch that is independent of the CMTS (214), converted to an optical signal by the GigE MAC and PHY units discussed previously (not shown), and sent along fiber 2 (301) as before. Here, the virtual shelf manager (622) interacts only with the Level 2/3 switch (629) and the associated CMRTS units (300), but not directly with the standard CMTS shelf (214). As before, the virtual shelf manager (622) is controlled by the network configuration management software (OSS) (802).

Figure 10:
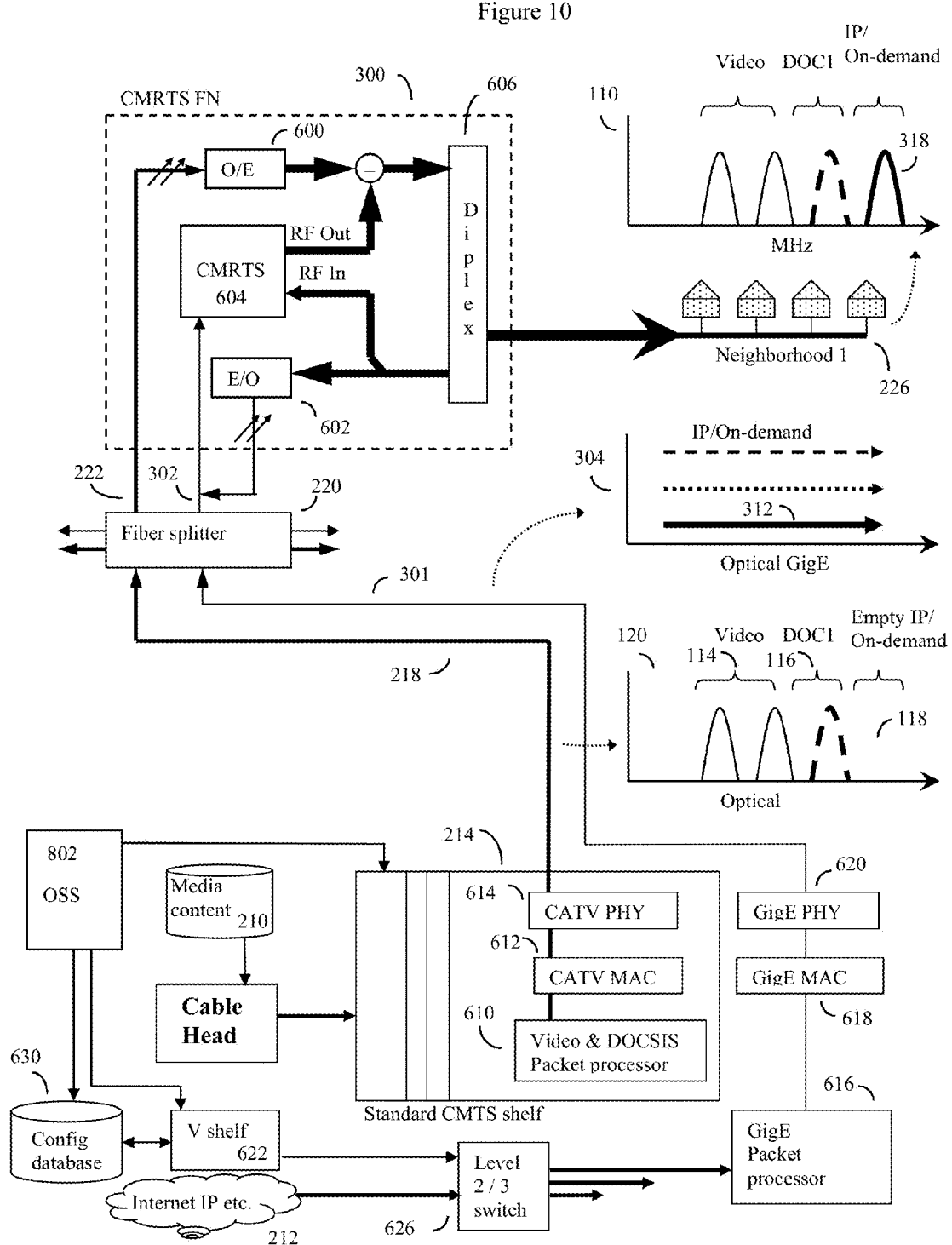
FIG. 10 shows additional details of how an alternative embodiment of the CMRTS fiber nodes may be constructed and operate in the first option.

FIG. 10 shows additional details of how the "smart" CMRTS fiber nodes (300) may operate in conjunction with prior art cable head CMTS (214) and prior art CMTS line cards. As for FIG. 9, the function of the CMRTS is essentially the same, however the prior art CMTS shelf (214) will no longer intelligently manage its QAM channels, but will instead simply have some pre-allocated empty QAM channels that may be filled in by the CMRTS units.

Note that although the CMRTS examples used packet processors (700), (704), in an alternative embodiment, one or more of these packet processors may not be needed. Alternatively the signal may be simply passed through, or else modified by wave shaping, or modified by some other means.

As an example, still another embodiment, the CMRTS FPGA and DSP based MAC and PHY units may be configured to not contain QAM modulators at all. In this alternative embodiment, QAM signals may be sent up and down the second optical fiber (for example, to and from the cable head or optical fiber nodes closer to the cable head), and the CMRTS FPGA and DSP units can simply implement frequency shifting circuitry to convert the second optical fiber QAM signals to an appropriate empty CATV QAM channel (DOCSIS channel).

Figure 11:
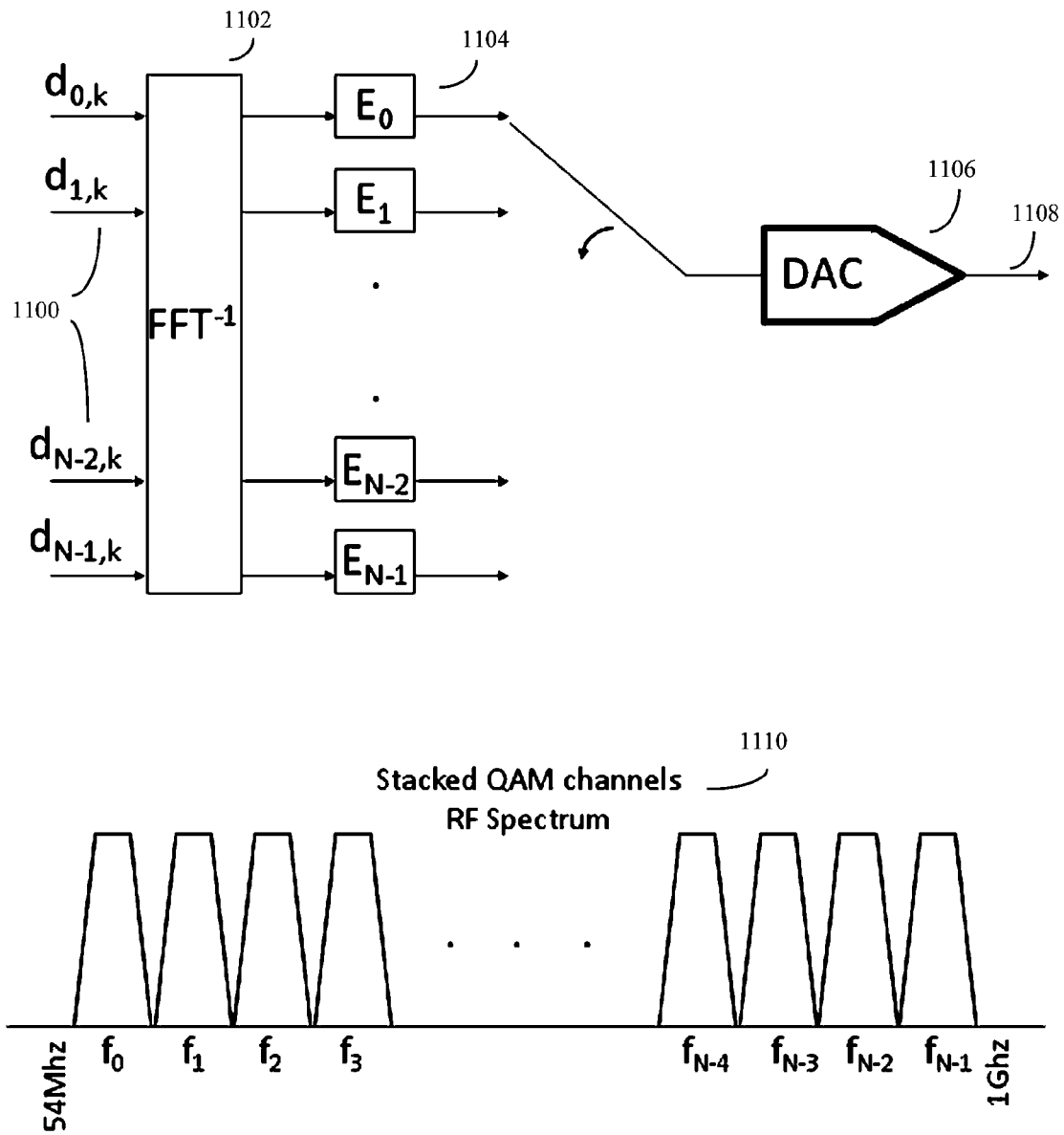
FIG. 11 shows how the FPGA and DSP components of the MAC and PHY units of a CMRTS fiber node can be reconfigured to implement a filter bank transmitter, which may be a QAM transmitter.

FIG. 11 shows how the FPGA and DSP components of the MAC and PHY units of a CMRTS fiber node can be reconfigured to implement an RF filter bank transmitter, such as a RF QAM transmitter. To implement RF QAM transmitters using FPGA and DSP devices, the methods of Harris et. al., ("*Digital Receivers and Transmitters Using Polyphase Filter Banks for Wireless Communications*", *IEEE Transactions on Microwave Theory and Techniques*, 51(4), pages 1395-1412, 2003), or alternative methods, may be useful. Briefly, the CMRTS MAC and PHY transmitter devices can take the incoming bit stream data $d_{0,k}, d_{1,k}, d_{N-2,k}$ and $d_{N-1,k}$, (1100), RF modulate it by running the data through an inverse Fast Fourier Transform ($FFT^{-1}$) waveform generator (1102) implemented by the FPGA and DSP MAC and PHY units of the CMRTS, then run the signal through polyphase filters $E_0 \ldots E_{N-2}$ (1104) (e.g. Finite Impulse Response (FIR) filters), multiplex the result, and output through a Digital to Analog converter producing QAM modulated RF output signals (1108) This system can produce a series of stacked RF QAM channels producing an RF spectrum such as shown below (1110).

In principle, in addition to QAM modulated RF waveforms, other types of RF waveforms, such as Code Division Multiple Access (CDMA), Orthogonal Frequency Division Multiplexing (OFDM) and indeed any type of RF modulation scheme may also be produced by the FPGA and DSP based CMRTS MAC and PHY units.

Additionally, as previously discussed, the software configurable RF modulator/transmitter device may be further configured to implement an RF modulator and transmitter that pre-distorts or customizes said second set of RF waveforms to correct for RF signal impairments in at least part of the Cable portion of said Hybrid Fiber Cable (HFC) network. Here, as previously discussed, the methods of parent application Ser. No. 13/478,461, incorporated herein by reference, may be implemented using the present invention's FPGA and DSP based MAC and PHY transmitter units.

Although the stacked QAM channel RF output channels shown in (1110) are all drawn with equal magnitude, one advantage of this approach is that in actuality, the amplitude of the different channels need not be set to be equal. Generally in CATV cable, higher frequencies are attenuated more rapidly than lower frequencies. Thus here, for example, the FPGA and DSP implemented CMRTS MAC and PHY transmitter can be configured to weigh some channels (e.g. the higher frequency channels) with a higher average amplitude than other channels, thus giving that individual CMRTS unit the ability to cope with local CATV signal impairments. For example, if a given stretch of CATV cable is unusually long, with a cable modem tuned to a higher frequency channel far away and experiencing signal degradation, the CMRTS unit may be reconfigured to weigh that particular channel with a higher amplitude. Such differential weighting intended to overcome channel impairments is called pre-distortion, and the system can thus implement programmable pre-distortion using these methods.

Figure 12:
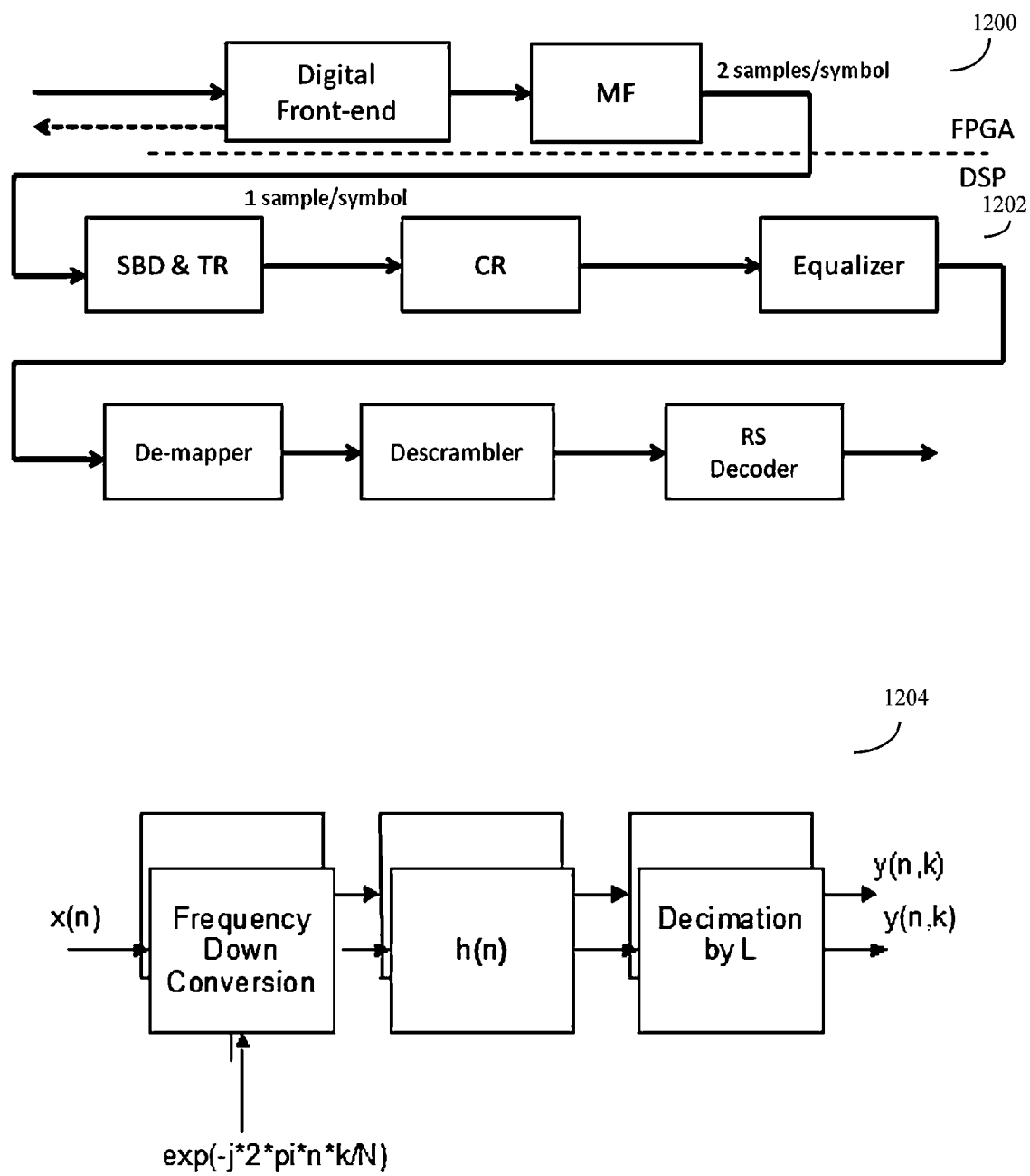
FIG. 12 shows an example of the division of labor between the single handling steps handled by the FPGA portion and the DSP portion of the MAC and PHY units of a FPGA and DSP based CMRTS unit. Here a TDMA burst receiver implementation is shown. The lower portion of FIG. 12 shows an example of a superhetrodyne receiver implementation, most useful when the various upstream CATV channels are not regularly frequency spaced.

FIG. 12 shows an example of the division of labor between the single handling steps handled by the FPGA portion (1200) and the DSP (1202) portion of the MAC and PHY units of a FPGA and DSP based CMRTS unit. Here a TDMA burst receiver implementation is shown. The lower portion of FIG. 12 (1204) shows an example of a superheterodyne receiver implementation, most useful when the various upstream CATV channels are not regularly frequency spaced. Here the methods of Harris et. al. may also be useful.

Here, at the digital front end, the system obtains incoming RF signal samples, and the FPGA component (1200) (which itself is software configurable) can handle the initial stages of the Analog to Digital (A/D) conversion process. The FPGA can also tune into the signal (e.g. implement a tuner and match filter). In this configuration, the FPGA then transfers the data to the DSP (1201) at a first data rate and format, such at a rate of two samples per symbol. The DSP (1202) can then implement other functions, such as a DOCSIS RF signal burst detector (SBD) and Timing recovery (TR) function, carrier recovery (CR), equalization (Equalizer), DOCSIS demapping and descrambling functions (Demapper, Descrambler), and Reed Solomon error correction (RS).

The descrambler here can, for example, be a standard DOCSIS descrambler. DOCSIS transmitters and receivers use scrambler and descrambler methods to introduce enough randomness into the DOCSIS QAM RF signals as to produce enough signal transitions for the receiver to lock on to, thus allowing the system to maintain proper synchronization.

The system may also do additional DOCSIS functions, such as header inspection, parsing, fragmentation correction, error suppression, and the like. As before, although RF QAM modulation methods are often used as the main example of an RF modulation scheme throughout, the system may be configured to receive other non-DOCSIS RF modulation schemes such as CDMA or OFDM modulated RF signals.

It should also be apparent that as for the CMRTS transmitter, the CMRTS software controllable RF packet processor's at least one FPGA device may also be configured or reconfigured using FPGA configuration data that is either stored in memory at the remote CMTS fiber node (e.g. FIG. 7A (748)), or downloaded from the configuration database FIG. 8 (638) of a remote virtual shelf manager system FIG. 8 (622), (800). Similarly the CMRTS software controllable RF packet processor's at least one DSP device may also be programmed using DSP software that is either stored in memory at said remote CMTS fiber node (748), or downloaded from the database (638) of a remote virtual shelf manager system (622), (800).

Various types of receivers may be implemented using FPGA and DSP techniques. One type is a superheterodyne receiver (1204), which is often more useful when the various RF channels to be received are not regularly spaced. Here for example, the local oscillator signal of the type such as $$e^{-\frac{j2\pi nk}{N}}$$

is mixed with the incoming signal x(n) by multiplication, and the sum and difference of the two signals is then filtered at step h(n) using, for example, an impulse response filter. The output of this process is then further decimated to reduce what may be initially a very high frequency sampling rate down to a lower sampling rate, producing useful output. These steps will often be implemented in the FPGA portion of the circuit.

Figure 13:
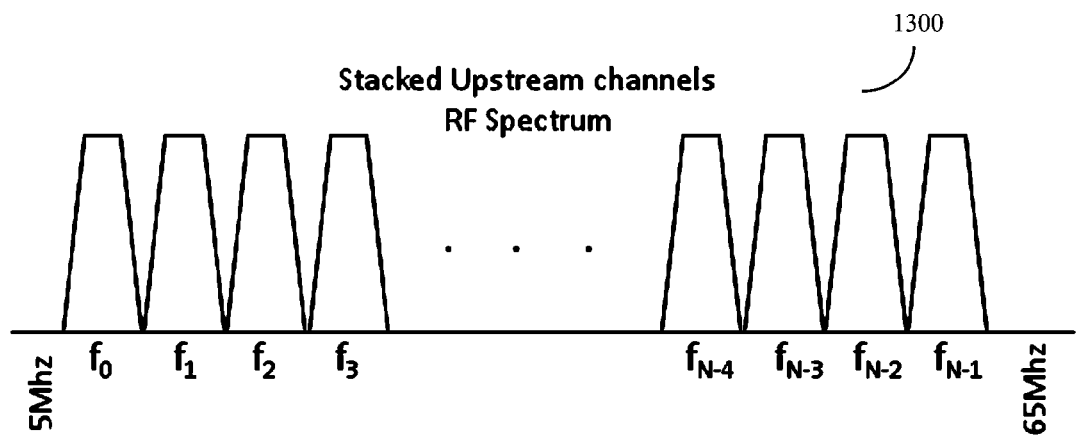
FIG. 13 shows how the FPGA and DSP components of the MAC and PHY units of a CMRTS fiber node can also be reconfigured to implement a filter bank receiver, which may be a QAM receiver. This configuration is most useful when the various upstream CATV channels are regularly frequency spaced.
Figure 13:
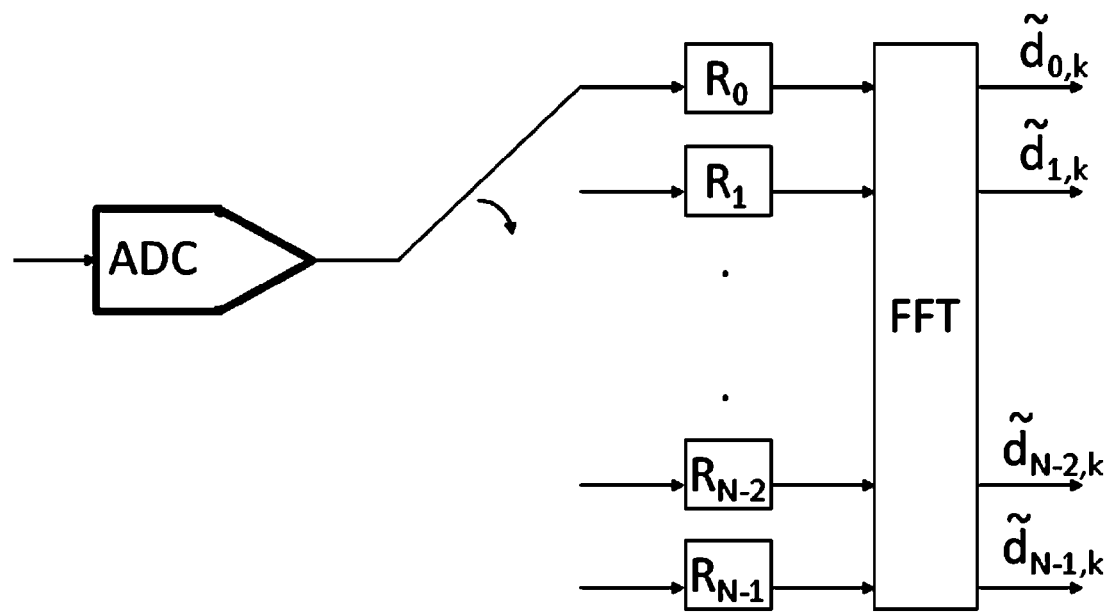

FIG. 13 shows how the FPGA and DSP components of the MAC and PHY units of a CMRTS fiber node can also be reconfigured to implement a filter bank receiver, which may be a QAM receiver. This configuration is most useful when the various upstream CATV channels are regularly frequency spaced. Here again the methods of Harris et. al., or alternative methods, may be used.

Filter bank receivers tend to be more useful when there is a series of regularly spaced incoming RF channels to receive, as shown in FIG. 13 (1300). Filter bank receivers generally function by a method that is the inverse of the filter bank transmitter previously described in FIG. 11.

In this embodiment, the CMRTS FPGA and DSP based MAC and PHY units can be configured to implement a software controllable RF packet processor receiver. One advantage of this approach is that it then becomes relatively easy to further configure the various receiver(s) with capability to equalize or adjust various CATV upstream RF signals (usually originating from various cable modems) to correct for RF signal impairments in at least part of the cable portion of the Hybrid Fiber Cable (HFC) network.

Figure 14:
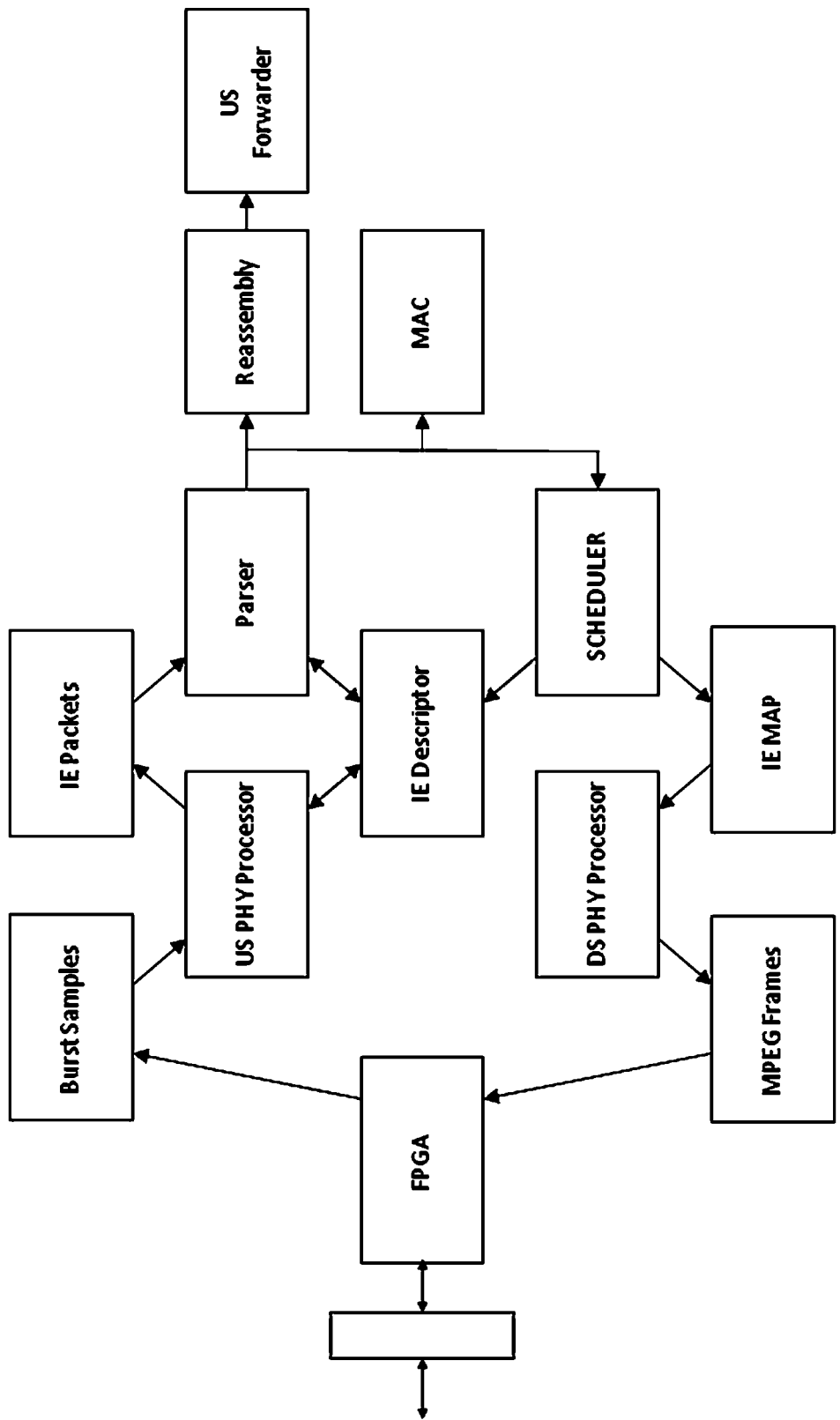
FIG. 14 shows a simplified flow diagram of some of the signal flow processing steps, often handled by the DSP portion of the FPGA and DSP based CMRTS MAC and PHY units.

FIG. 14 shows a simplified flow diagram of some of the signal flow processing steps required to perform other DOCSIS functions. These again are often handled by the DSP portion of the FPGA and DSP based CMRTS MAC and PHY units.

Here the RF burst signals are first acquired by the FPGA. The RF bursts are then processed, the various data packets transmitted by the RF bursts detected, and these data packets in turn are parsed, reassembled, ad directed to various functions. For example, the system may inspect the header of a data packet, determine if it is a MAC message or a data packet that needs to be forwarded, and take appropriate action depending on the header.

Figure 15:
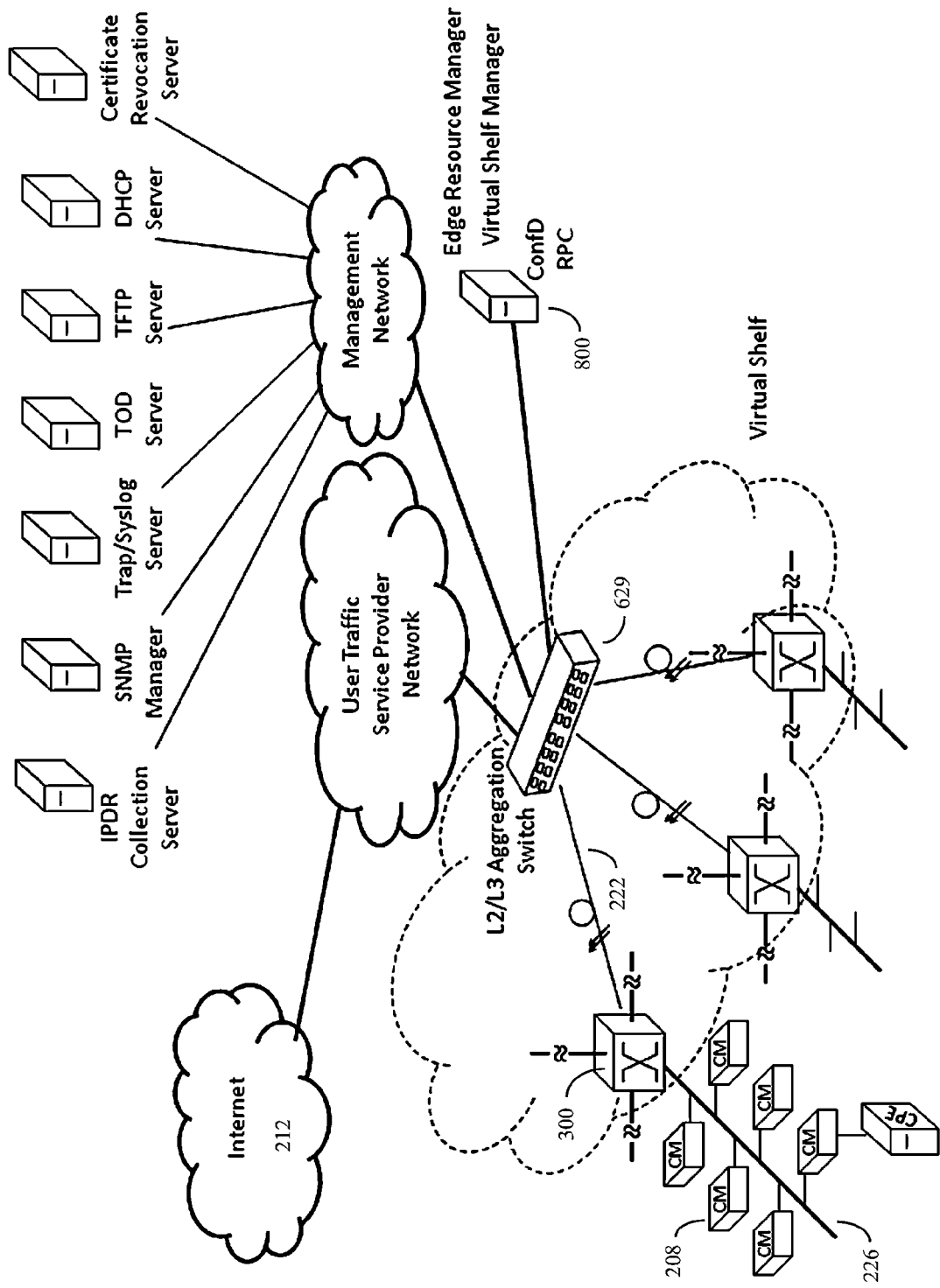
FIG. 15 shows an alternative view of the CMRTS based CATV network from a software management perspective.

FIG. 15 shows an alternative view of the CMRTS based CATV network from a software management and system control perspective.

Other Embodiments

Other alternative embodiments of the invention are also possible. In these alternative embodiments, the CMRTS, described in more detail in U.S. provisional application 61/511,395, the contents of which are incorporated herein by reference, units can have multiple outputs, such as multiple CATV cable outputs, or even a mix of CATV or Coax cable outputs and, other output types such as data outputs (e.g. GigE or other data output), telephony outputs, and the like.

In other alternative embodiments, the CMRTS units may also be positioned much closer to an individual household. For example, in some alternative embodiments, the CMRTS units may be positioned extremely close to, or even attached to, either a multiple household unit such as an office or apartment building, or even attached to an individual household, in which case the CMRTS unit can act, to some extent, somewhat like a "fiber to the home" Optical Network Terminal.

Figure 16:
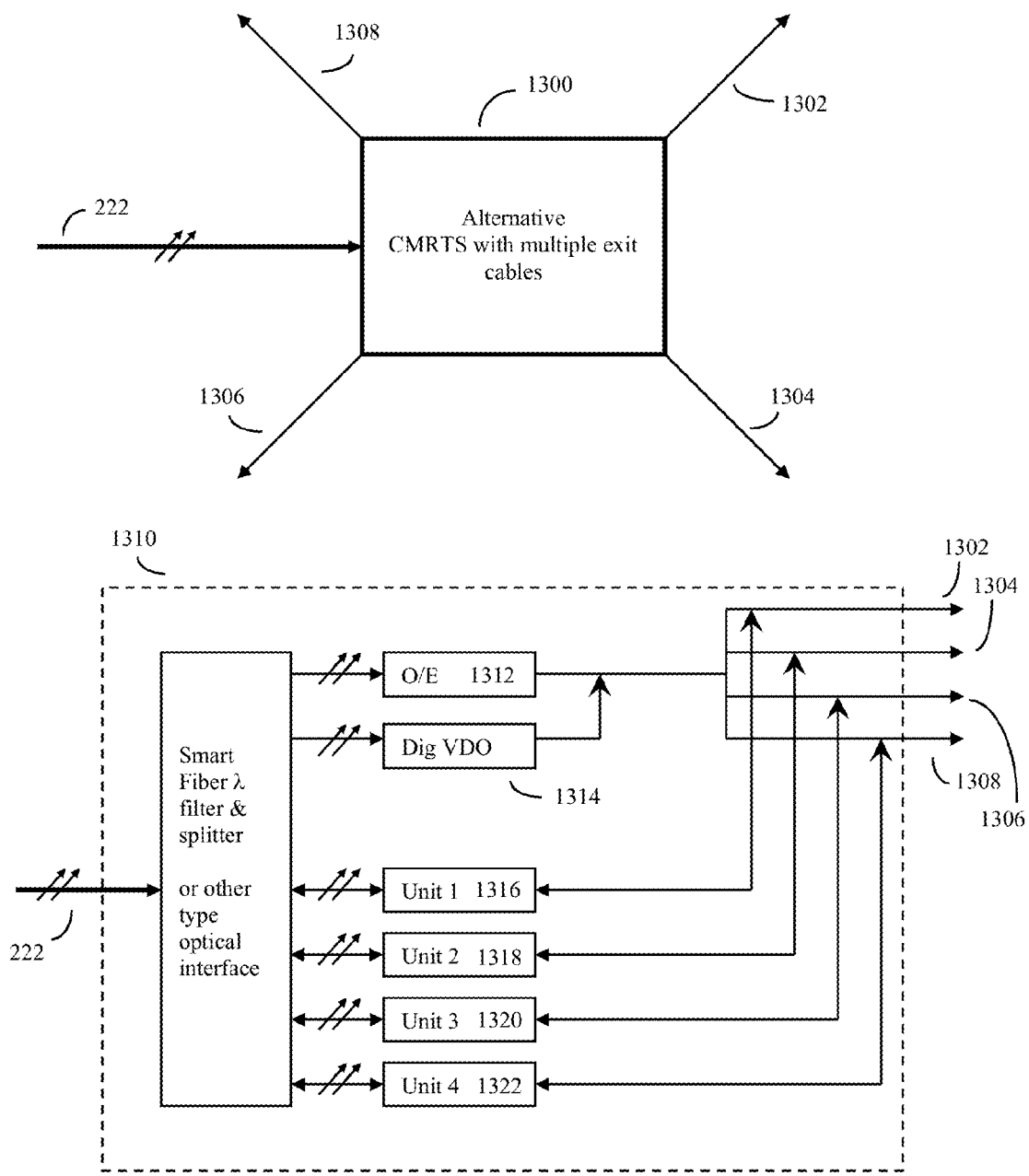
FIG. 16 shows an alternative embodiment in which the CMRTS unit is configured to feed multiple electrical RF or data outputs, such as four CATV cable outlets, or alternatively a mix of CATV cable outlets and other electrical outputs, such as data ports (e.g. GigE ports) and/or telephony ports.

FIG. 16 shows an alternative embodiment in which the CMRTS unit (1300) is configured to feed multiple electrical RF or data outputs, such as four CATV cable outlets (1302, 1304, 1306, 1308), or alternatively a mix of CATV cable outlets and other electrical outputs, such as data ports (e.g. GigE ports) and/or telephony ports.

A diagram of one potential configuration for (1300) is shown in (1310). This configuration, where the CMRTS unit is configured to drive multiple CATV cables, may be useful when the CMRTS unit (1310) is used to drive a multiple-household facility, or where the CMRTS unit may be configured to drive a neighborhood partitioned into multiple CATV cables (e.g. see FIG. 6, where the CMRTS unit (1300) is essentially used as a single unit to replace both smart fiber splitter (220) and CMRTS FN 1 (300) and CMRTS FN 2 (300), and possibly even Dumb FN 3 (204)).

Here the standardized video signals, intended to be transmitted on all cables (1302, 1304, 1306, 1308), can be handled by a method common to all cables (1302, 1304, 1306, 1308), such as a simple Optical to Electrical converter (1312), and these results may go to all output cables (1302 to 1308). Indeed, common digital video signals (1314) may be handled by a similar mechanism. In the simplest alternative however, the different Units 1, 2, 3, and 4 (1316, 1318, 1320, 1322) can be different CMRTS units (e.g. formerly 604), and may be now assigned to different cables (e.g. one CMRTS for cable (1302), another CMRTS for cable (1304), and so on, thus enabling this alternative D-CMRTS fiber node to now handle multiple neighborhood portions of cable, or multiple portions of cable for a single building.

In yet another and more radical alternative, however, at least units (1318), (1320), (1322) may be other types of optical to electronic data handling units assigned to other purposes. For example, in one alternative embodiment, unit 2 (1318) may configured with the MAC and PHY capability for IP data, in which case electrical cable or interface (1304) may be a data port, such as a GigE port or other type data port. Similarly Unit 3 and/Unit 4 (1320), (1322) may be configured with the MAC and PHY capability for telephony data, in which case electrical cable or interface(s) (1306) and/or (1308) may be one or more telephony cables or interfaces, such as for a phone and/or fax line.

Thus in an extreme case, the neighborhood(s) (206) may be as little as a single household or at least a single multiple unit facility. In this extreme situation, the length of the CATV cable (226) may be de-minimis (i.e. extremely short), and the CMRTS unit (1300), (1310) may indeed be affixed to the household or other facility.

Figure 17:
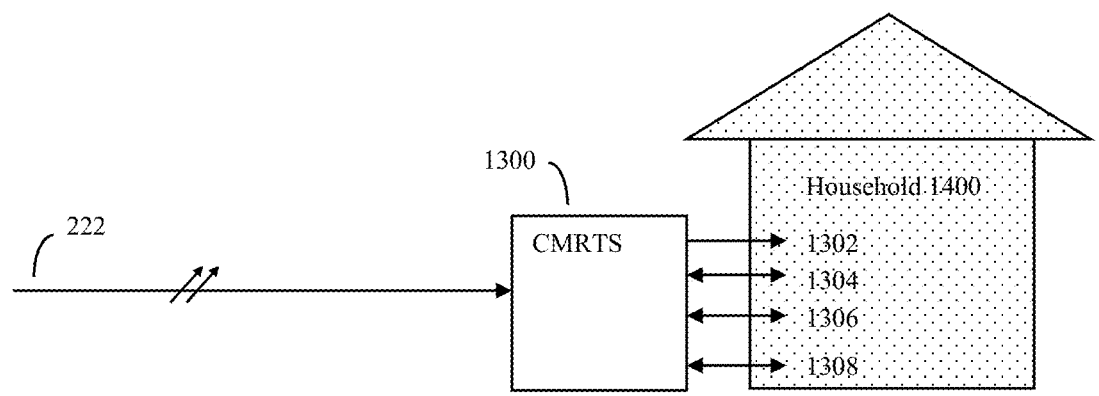
FIG. 17 shows an alternative embodiment in which the CMRTS unit is configured to feed multiple electrical RF or data outputs, and is further configured to connect directly to a single household, which may be a single house or a multiple unit facility such as an office building or apartment house.
Figure 18:
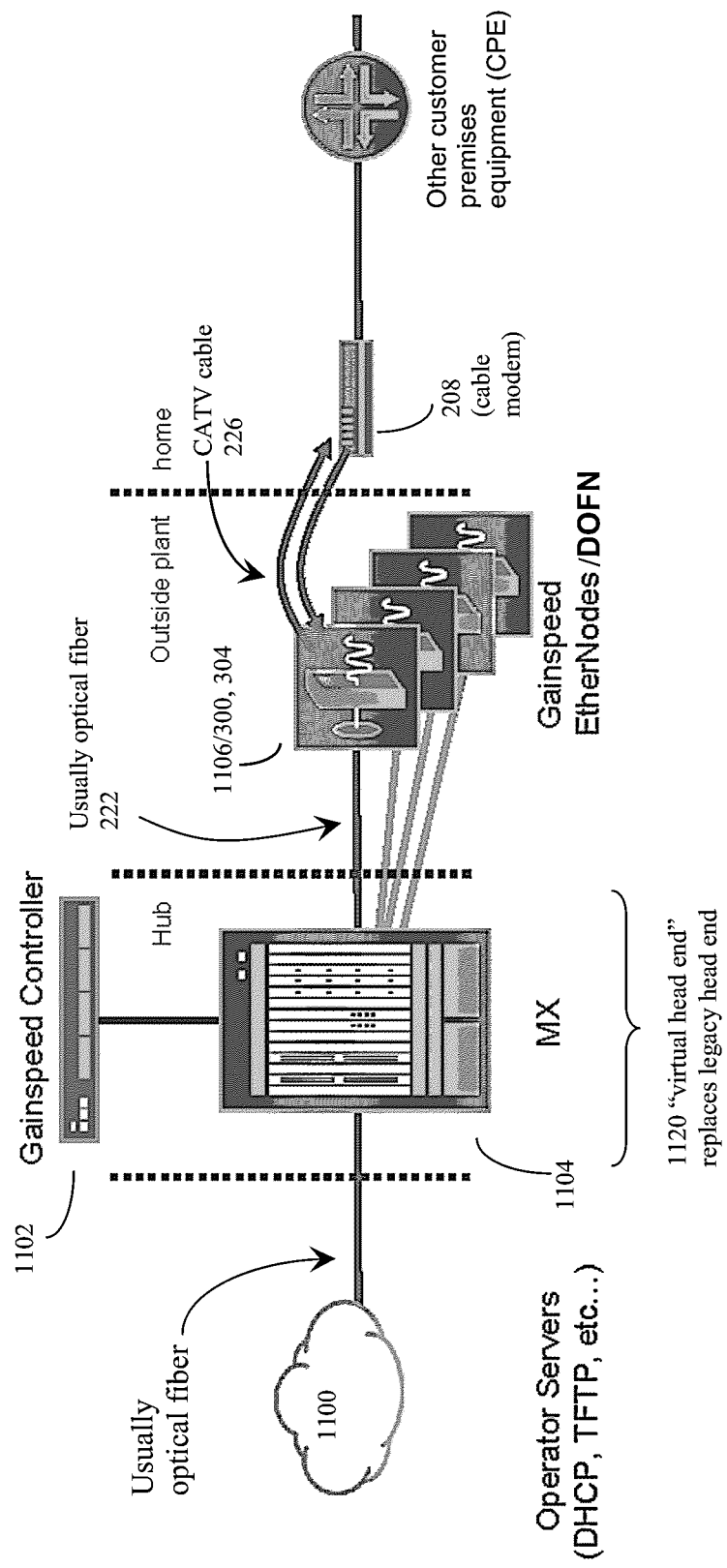
FIG. 18 shows one embodiment of the virtual converged cable access platform (e.g. virtual CCAP, virtual cable head).
Figure 19:
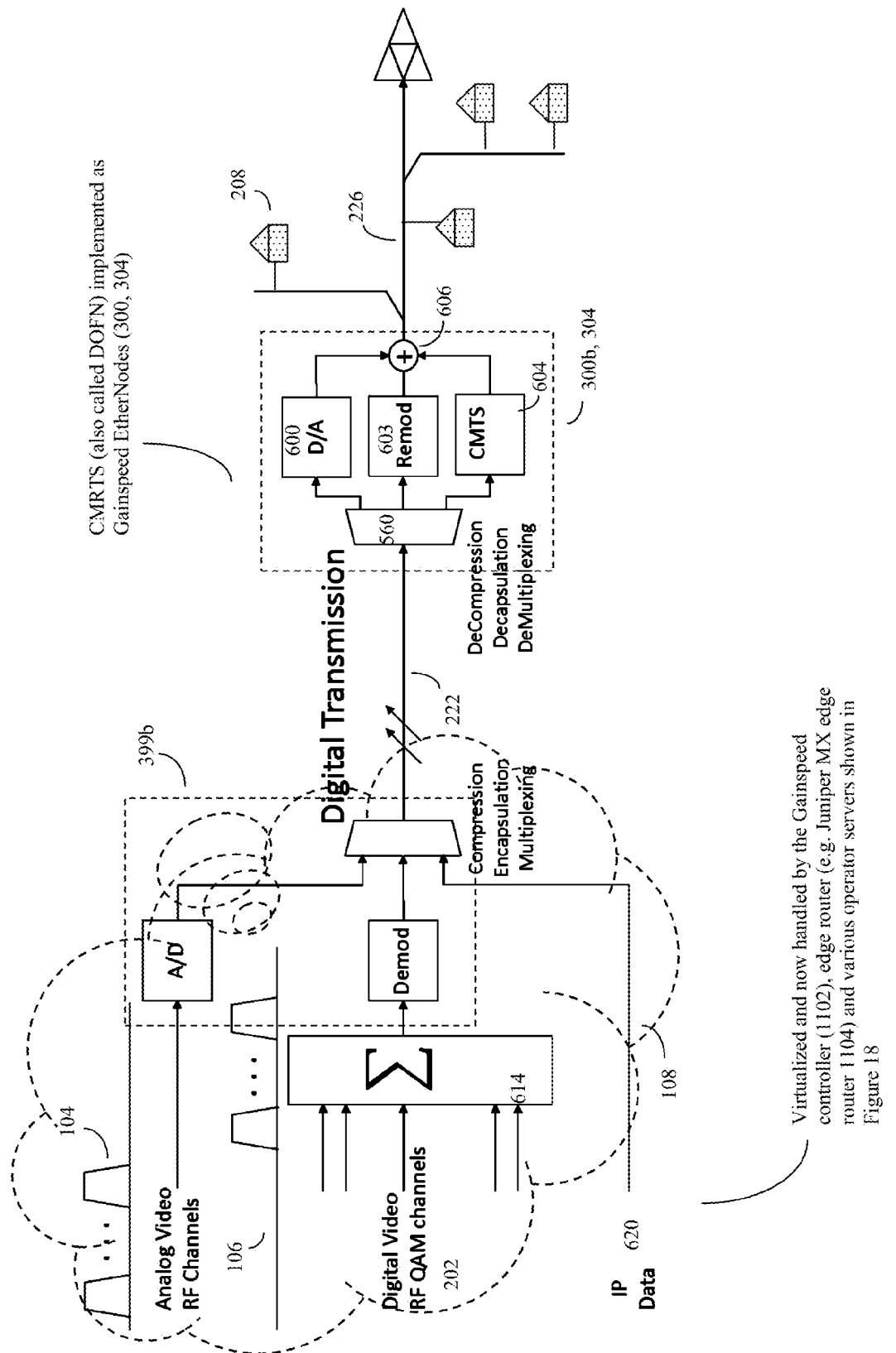
FIG. 19 is based on FIG. 4C from U.S. patent application Ser. No. 14/098,656, the contents of which are herein incorporated by reference in their entirety, shows how the various functions of prior art cable head ends may be handled by that application's virtual converged cable access platform. However the invention's CMRTS optical fiber nodes (alternatively called Digital Optical Fiber Nodes "DOFN", or Gainspeed EtherNodes) can continue to handle the interface between the cable RF signals, and the optical fiber data.

FIG. 17 shows an alternative embodiment in which CMRTS unit (1300) is configured to feed multiple electrical RF or data outputs (1302 to 1308), and is further configured to connect directly to a single household (1400), which may be a single house or a multiple unit facility such as an office building or apartment house.

An additional advantage of placing the improved optical fiber nodes proximate to or attached to a house or other building (which may be a multi-household/office building) is that use of other protocols, including TDD protocols, taught previously (e.g. application 61/511,395, incorporated herein by reference) may also be used as desired.

Use in HFC Systems with Non-Legacy Head Ends and/or Non-Legacy Optical Fiber Signals.

As discussed earlier in this specification, and also as discussed extensively in parent application Ser. No. 13/674, 936 "HYBRID ALL DIGITAL FIBER TO CATV CABLE SYSTEM AND METHOD" the complete contents of which are incorporated herein by reference, in some embodiments, it may be useful to drop the requirement that the optical fiber portion of the HFC cable system carry legacy CATV waveforms. In these alternative embodiments, the cable head end may not necessarily have any RF QAM modulators capable of generating the optical counterpart of legacy CATV RF waveforms. Instead, all data to and from the head end to the various CMRTS optical fiber node units may be carried over the optical fiber in the form of IP data packets.

In this type of system, all non-HFC-maintenance data ultimately carried by the CATV RF cable downstream or carried by the CATV RF upstream signals are transmitted over the HFC optical fiber either to or from said head end by digitally encoded second optical fiber signals. No non-HFC maintenance data, and indeed often no data of any sort, will be transmitted, over the HFC optical fiber by legacy first optical fiber signals. Essentially the legacy first optical fiber is free of any legacy signals. Here all data to and from the head end to the various CMRTS optical fiber node units may be carried over second optical fiber in the form of IP data packets.

In this embodiment, the cable operator is free to use whatever optical fibers and wavelengths that the cable operator desires because there are no problems with optical fiber interference or conflict with legacy signals (there are no legacy signals). Although for consistency, in this specification, the term "second optical fiber signals" will continue to be used even if there are no signals at all transmitted over the first optical fiber, it should be evident that there is no requirement for two optical fibers or alternate optical fiber wavelengths. Here the term "second optical fiber signals" should be understood to mean the medium used to transmit IP data packets over the optical fiber. Thus if legacy first optical fiber is unused, it of course may be repurposed or otherwise used to transmit second optical fiber signals.

Note also that in this all digital embodiment, some communications between the CMRTS units (remote CMTS fiber nodes) and various cable modems and customer premises equipment will travel over the local stretch of cable (neighborhood cable) to and from the CMRTS units and the various household cable modems for the purposes of synchronization and set up. Not all of this "HFC maintenance data" need be transmitted over the HFC optical fiber, however. This is because often the CMRTS units will have their own intelligence and processors configured to handle at least some of the HFC maintenance chores of properly synchronizing with the various household cable modems and other customer premises located on the stretch of neighborhood CATV cable served by the respective CMRTS unit. However all of the data that the various cable customers are actually paying for and value—customer useful data such as program data, communication data, and other general "non HFC maintenance data" will be transmitted by, or travel over, the digitally encoded second optical fiber signals.

For high backward compatibility, the system can digitize legacy RF waveforms, or demodulate legacy QAM waveforms to QAM symbols. This data can then be transmitted over the optical fiber as IP data packets, and then reconstituted back to their original waveforms as needed. Using such a scheme, with a properly configured head end, and suitably configured CMRTS units, the system can still handle legacy NTSC, FM, QPSK waveforms, as well as do partial (QAM symbol level) compression of legacy QAM waveforms without requiring any additional optical fiber wavelengths. The CMRTS optical fiber nodes, constructed according the disclosure herein, can use FPGA/DSP/ASIC methods and filter bank receivers to also implement other advanced CATV functionality, such as non-standard upstream/downstream CATV frequency splits.

To do this, the various FPGA and DSP units on the CMRTS fiber node may be configured to implement various functions, including any and all of the following:

1: Implement a RF digital reconstitution device configured to accept digital samples of downstream RF waveforms digitally transmitted downstream over the optical fiber, and to reconstitute these digital samples into one or more downstream digitally reconstituted RF channels.

2: Implement a RF remodulator device configured to accept downstream digital QAM symbols transmitted over the optical fiber, and remodulate these QAM symbols into one or more downstream QAM symbol remodulated RF QAM channels 3: Implement an IP to QAM conversion device configured to accept downstream digital IP data packets transmitted over the optical fiber, and to modulate these digital IP data packets into one or more downstream IP based RF QAM channel.

4: Implement a RF combiner device configured to combine various digital channels, such as digitally reconstituted RF channels, QAM symbol remodulated RF QAM channels IP based RF QAM channels, and the like, and transmit these channels downstream over said CATV cable.

5: Implement a RF digital converter device configured to accept upstream RF waveforms transmitted over the CATV cable, and digitize these upstream RF waveforms, thereby producing digitally encoded upstream RF channel data.

6: Implement a RF demodulator device configured to accept upstream RF QAM channels transmitted over the CATV cable, and demodulate these RF QAM channels producing upstream digital QAM symbols.

7: Implement a QAM to IP conversion device configured to accept upstream digital IP data packets transmitted by upstream QAM RF channels over the CATV cable, and extract the upstream digital IP data packets, thus producing upstream digital IP packets.

8: Implement a digital data to optical converter device configured to combine any of these various digitally encoded upstream RF channel data, upstream digital QAM symbols, and upstream digital IP packets and transmit these data, symbols, and packets digitally upstream over the optical fiber.

This scheme was discussed in more detail in U.S. patent application Ser. No. 13/756,302 "METHOD OF TRANSFORMING HFC CATV ANALOG FIBER TRANSMISSION TO DIGITAL FIBER TRANSMISSION", the complete contents of which are incorporated herein by reference. In this application, the invention's CMRTS optical fiber units were often referred to in the alternative as Digital Optical Fiber Nodes or "DOFN".

There are actually various alternative names for the remote CMRTS (CMRTS) optical fiber units/nodes in use in this present specification. Because the CMRTS optical fiber units were being developed at Gainspeed Inc., and because some CMRTS optical fiber units were configured to function using optical fiber Ethernet frames or data packets, rather than legacy HFC optical fiber waveforms, the CMRTS/DOFN units configured to function with non-legacy Ethernet data packets over the optical fiber portion of the HFC system will occasionally be referred to in the alternative as "Gainspeed Ether/Nodes" as well.

The "all digital over fiber" approach can be understood to be a method of digitally transmitting downstream data over at least the optical fiber portion of a Hybrid Fiber Cable (HFC) network. As before, this HFC network will generally comprise at least a head end and at least one of the present invention's CMRTS optical fiber nodes, here configured to perform as a digital optical fiber node (DOFN). The various CMRTS/DOFN will generally be connected to at least one set of neighborhood CATV cables.

In this approach, consider the case where the data comprises various downstream QAM. The head end will transmit at least one downstream QAM channel over the optical fiber, not as standard QAM waveforms, but rather as a plurality of QAM constellation symbols. To do this, the head end will generally encapsulate the QAM constellation symbols into a plurality of Ethernet frames (or other digital transmission format frames). The head end will then digitally transmit these Ethernet frames (or other digital transmission format frames) over the optical fiber;

Here the CMRTS/DOFN will be configured (often by appropriate FPGA/DSP configuration) to receive these Ethernet frames (or other digital transmission format frames), and extract the downstream QAM constellation symbols from these frames. The CMRTS/DOFN will then also be configured to use the downstream video QAM constellation symbols to modulate at least one QAM modulator (located on the CMRTS/DOFN), thus producing reconstituted downstream QAM RF signals. The CMRTS/DOFN can then transmit these reconstituted downstream QAM modulated RF signals further downstream over the neighborhood CATV cable portion of the HFC system.

Similarly on the upstream end, the invention's CMRTS/DOFN optical fiber node units can be further configured to receive upstream RF channel data (which can include legacy upstream data from legacy cable modems or customer premises equipment), and digitally sampling this RF channel data. As a result, the CMRTS/DOFN will produce digitized upstream waveform data. The CMRTS/DOFN can be further configured, by suitable FPGA/DSP configuration methods, to encapsulate this digitized upstream waveform data into a plurality of Ethernet frames (or other digital transmission frames). The CMRTS/DOFN can further be configured to use the optical fiber to digitally transmit these Ethernet frames (or other digital transmission frames) upstream to the head end.

Use with Virtual Head Ends, Such as Virtual CCAP Systems

As previously discussed in U.S. patent application Ser. No. 14/098,656 "VIRTUAL CONVERGED CABLE ACCESS PLATFORMS FOR HFC CABLE NETWORKS", the contents of which are incorporated herein by reference, abandoning the constraint that the optical fiber portion of the HFC system must transmit the optical equivalent of legacy CATV RF waveforms enables HFC system head ends to be radically redesigned. In this radical redesign, the HFC head end can comprise one or more virtual CCAP controller(s), edge router(s), and virtual CCAP software, but may have no QAM modulators or other type of modulators capable of producing legacy cable RF waveforms (or the optical counterparts of these legacy cable RF waveforms) at all. Instead the input and output from the virtual CCAP head end (virtual head end) may be just data packets, such as Ethernet frames/data packets and the like, and some or often all of all optical fiber communications will be done in this all digital domain.

However by using the invention's CMRTS/DOFN/Gainspeed Ethernodes, the invention's CMRTS units may be configured to interface between the optical fiber portion of the HFC system, which may be all digital, and the cable and RF portion of the HFC system, which may still operate using legacy CATV RF waveforms as desired. In this embodiment, the CMRTS FPGA and DSP components can be configured to translate back and forth between the optical data transmission formats, and the cable RF data transmission formats.

In this configuration, the remote CMTS units (here called DOFN 300,304/1106) will generally be configured to manage a plurality of Cable Radiofrequency and DOCSIS functions, such as RF modulation, implementation of suitable CATV cable and optical fiber MAC/PHY functionally, data encryption, and various data scheduling functions. These remote CMTS units/CMRTS units/DOFN will often be connected to the CATV RF cable at one end, and to the optical fiber (222) which eventually (often by various intermediate switches and sections that are not shown) connect to the virtual CCAP edge router (1104).

In this embodiment, the virtual CCAP controller(s) (1102) and edge router(s) (1104) create a virtual head end (1120) that in turn connects to and controls the rest of the HFC cable network (i.e. least one optical fiber cable to at least one remote CMTS unit (here called a digital optical fiber node DOFN) that is connected to at least one set of neighborhood CATV cables). This embodiment can operate to transmit, for example, various legacy CATV downstream QAM channels, as desired, by transmitting at least one downstream QAM channel over the optical fiber as a plurality of QAM constellation symbols. This can be done digitally by encapsulating these QAM constellation symbols into a plurality of Ethernet frames or other digital transmission format frames, and digitally transmitting this plurality of Ethernet frames or other digital transmission format frames over the optical fiber (222). Note that QAM symbol encapsulation or other digital transmission format can be either done in real time by one or more operator servers (1100) or converters (399), or alternatively this QAM symbol encapsulation or other digital transmission format can be done in non-real time, and simply saved on the operator servers (1100) for use as needed for later transmission.

Note that in this embodiment, the previously discussed virtual shelf manager system may be implemented, at least in part by, by the virtual CCAP controller and virtual CCAP software (1102) portion of this virtual head end (1120). The virtual CCAP software and associated controller will generally also comprise the functions of the previously discussed "virtual shelf" control system (see FIGS. 8 and 15).

Once the digital transmission is handled by edge router (1104), as commanded by controller (1102), and is transmitted over the optical fiber (222) to the remote CMTS/DOFN (1106/300,304) (often as Ethernet frames or other digital transmission format), the remote CMTS/DOFN can then receive this plurality of Ethernet frames or other digital transmission format claims. The remote CMTS/DOFN can then extract the downstream QAM constellation symbols, and use the downstream video QAM constellation symbols to modulate at least one DOFN QAM modulator (607), (712), thus producing downstream QAM RF signals. The remote CMTS/DOFN can then transmit these remote CMTS/DOFN generated downstream QAM modulated RF signals further downstream over said at least one set of neighborhood CATV cables (226).

As previously discussed, many different types of QAM channels may be transmitted by this type of process, including video QAM channels, video Edge-QAM channels, or IP-QAM channels.

In other embodiments, these methods may also be used to transmit other types of downstream data, such as National Television System Committee (NTSC) or Orthogonal Frequency Division Multiplexing (OFDM) RF channels. This can be done using operator servers (1100) and or converters to further digitally process the data prior to the data then being processed by the controller (1102) and edge router (1104), and being transmitted over the optical fiber (222). Here again, the process will generally comprise, either in real time, or on a non-real time basis (e.g. using a converter or storing the data in an operator server 1100 after digital sampling), digitally sampling the NTSC or OFDM RF channels, thus producing a plurality of digitized waveform data, and again encapsulating this digitized waveform data into a plurality of digitized waveform data containing Ethernet frames or other digital transmission frames. This data can then, with the aid of controller (1102) and edge router (1104) be digitally transmitted downstream over the optical fiber (222). Once at the CMRTS/DOFN (1106/300,304), the remote CMTS/DOFN can be used to receive the digitized waveform data containing Ethernet frames or other digital transmission frames, extract this plurality of digitized waveform data, and use this plurality of digitized waveform data to drive at least one digital to analog converter, thus producing downstream NTSC or OFDM RF channels. These remote CMTS/CMRTS/DOFN generated NTSC or OFDM RF signals are then transmitted further downstream, in RF form, over the neighborhood CATV cables (226) to the subscriber's equipment.

Similarly, when the downstream data comprises Orthogonal Frequency Division Multiplexing (OFDM) RF channels, the system can operate by either in real time or non-real time demodulating the OFDM RF channels, producing a plurality of OFDM symbols, and encapsulating this plurality of OFDM symbols into a plurality of OFDM symbol carrying Ethernet frames or other digital transmission frames. As before, the edge router (1104), as commanded by the controller (1102), can digitally transmit this information over the optical fiber (222) to the remote CMTS/DOFN (1106/300,304), where again the remote CMTS/DOFN can extract the information, use it to drive at least one OFDM RF modulator, and transmit the resulting OFDM RF signals further downstream over the neighborhood CATV cables (226).

Figure 20:
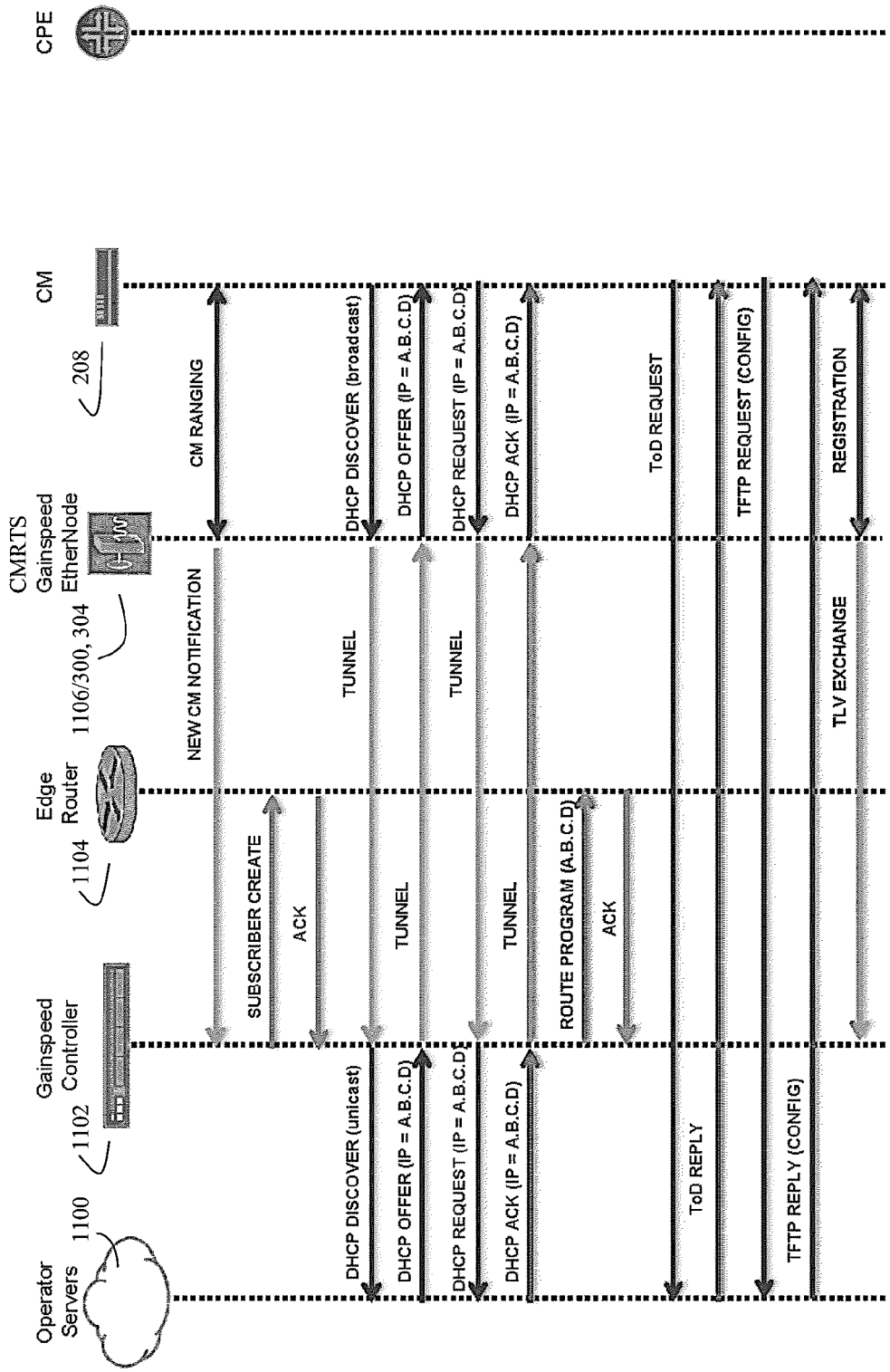
FIG. 20 shows a detail showing how the invention's CMRTS/DOFN/Gainspeed EtherNodes can be configured to handle the high-level operational workflow of a virtual CCAP based HFC system.
Figure 21:
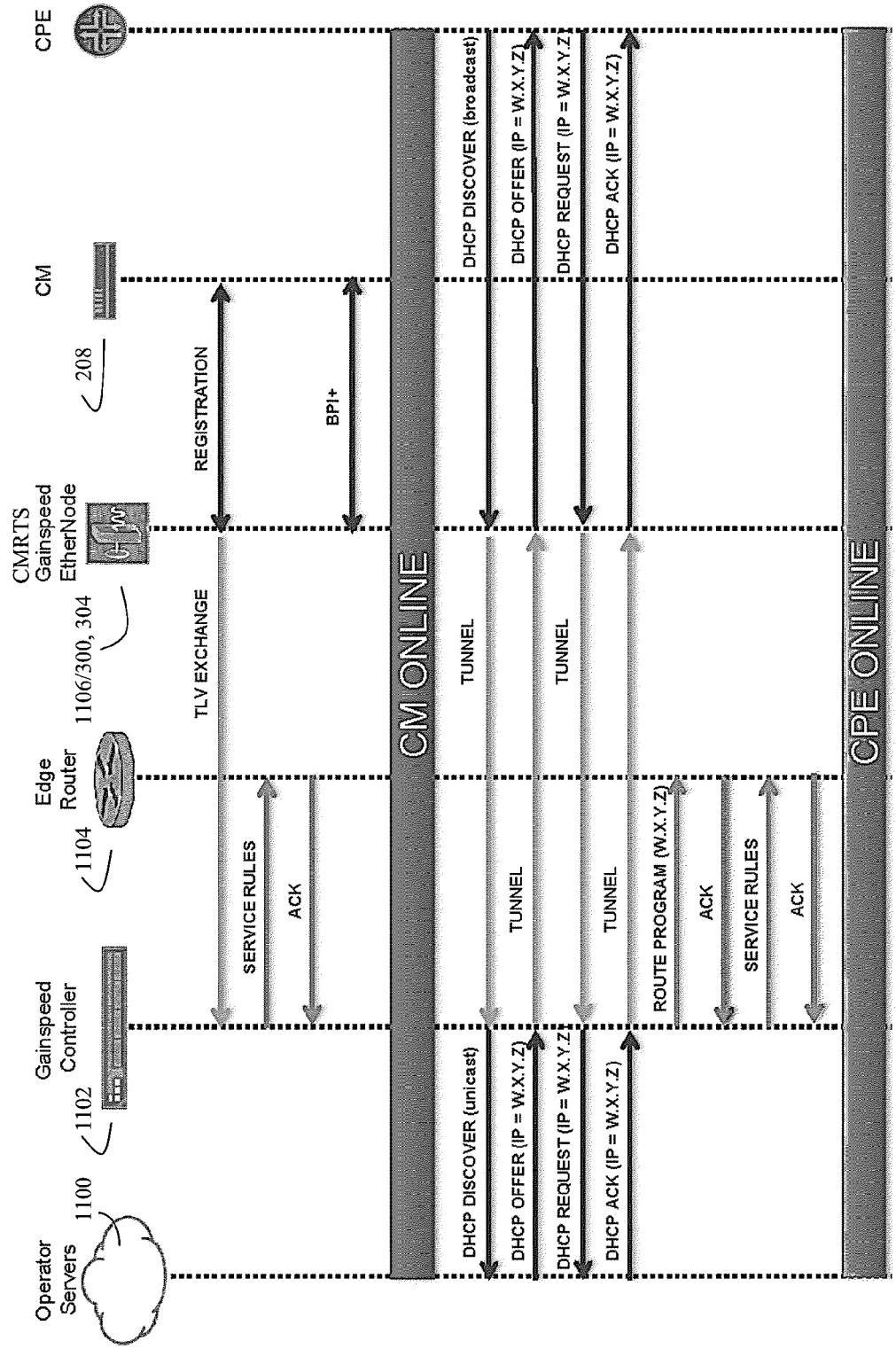
FIG. 21 shows additional details of how the invention's CMRTS/DOFN/Gainspeed EtherNodes can be configured to handle the high-level operational workflow of a virtual CCAP based HFC system.
Figure 22:
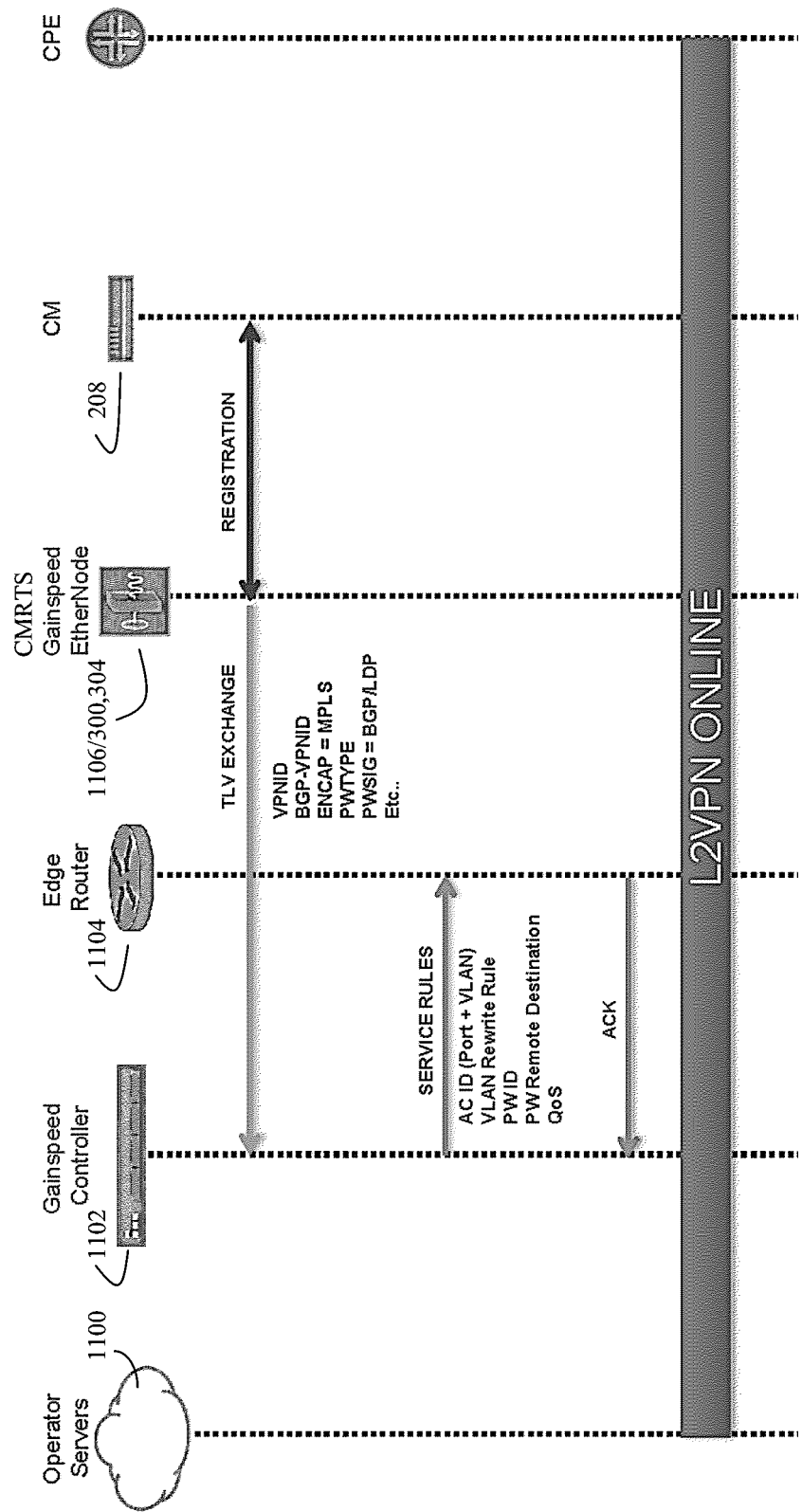
FIG. 22 shows additional details of how the invention's CMRTS/DOFN/Gainspeed EtherNodes can be configured to handle the Business Services over DOCSIS (BSoD) workflow of a virtual CCAP based HFC system.
Figure 23:
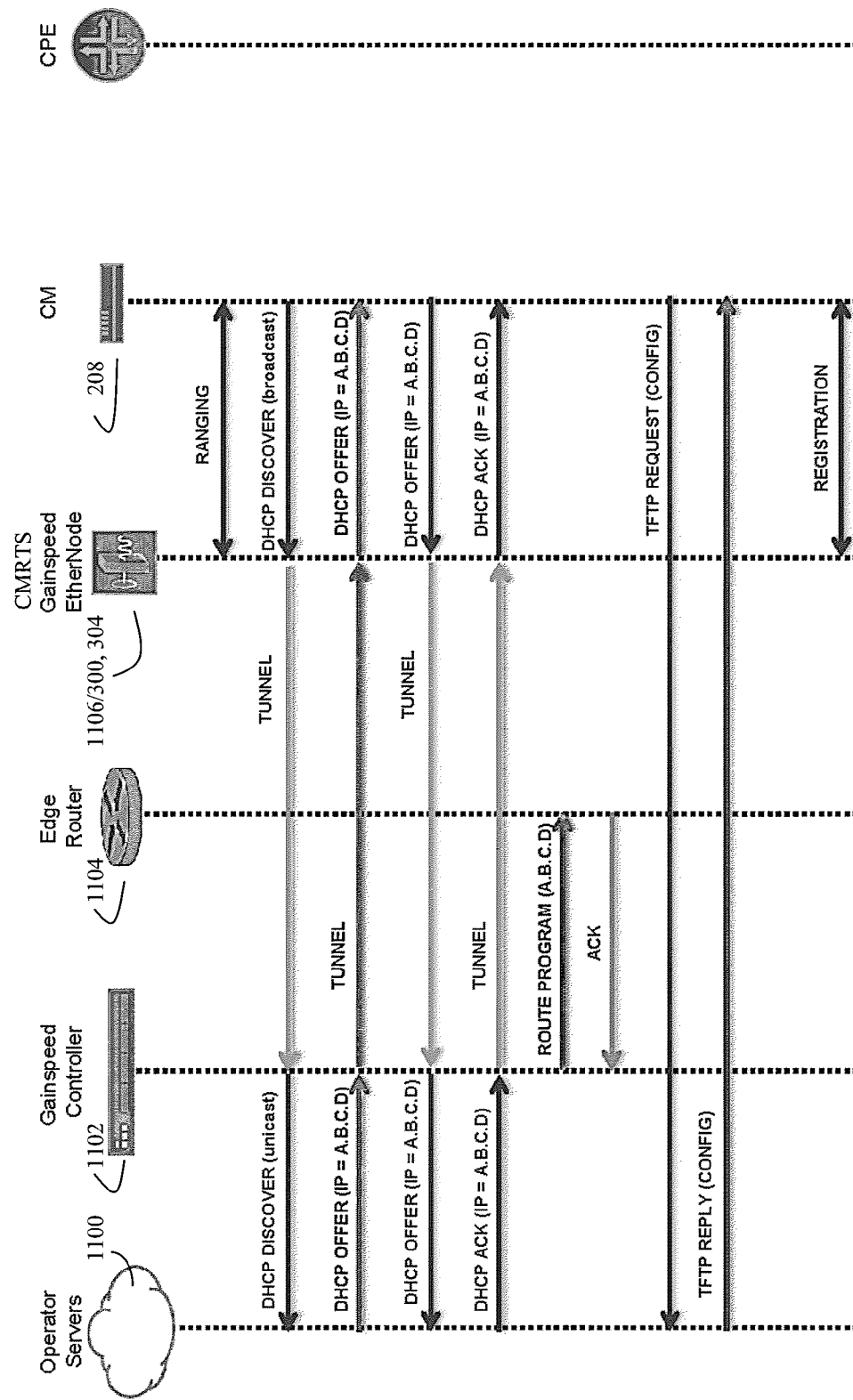
FIG. 23 shows additional details of how the invention's CMRTS/DOFN/Gainspeed EtherNodes can be configured to handle various protocol operations of a virtual CCAP based HFC system.

Going upstream, the process essentially can be run in reverse. For example, the invention's systems and methods may also be used to, over the optical fiber, digitally transmit upstream RF QAM channel data originating from at least one CATV cable (226) connected cable modem (208) or other neighborhood CATV cable connected devices. Here the remote CMTS/DOFN (1106/300,304) will receive this upstream RF QAM channel data, will demodulate least one upstream RF QAM channel into a plurality of upstream QAM constellation symbols. The remote CMTS/DOFN will then encapsulate this plurality of upstream QAM constellation symbols into a plurality of Ethernet frames or other digital transmission format frames, and use the optical fiber (222) to digitally transmit said plurality of Ethernet frames or other digital transmission format frames upstream to said virtual head end. There the edge router (1104) and Gainspeed controller (1102), aided by virtual CCAP software (which implements an edge-server version of the previously discussed virtual shelf software) can then interpret the upstream information or further route this upstream information as appropriate. This process is shown in more detail in FIGS. 20, 21, and 23.

Similarly, the invention's methods may also be used to digitally transmit upstream RF OFDM channel data (again typically originating from the cable modem (208) or other cable connected devices) over the optical fiber (222) as well. Here again, the remote CMTS/CMRTS/DOFN can receive upstream RF OFDM channel data, and demodulate this into a plurality of upstream OFDM symbols. These OFDM symbols can then also be encapsulated into a plurality of Ethernet frames or other digital transmission format frames, and transmitted upstream, over optical fiber (222), to the virtual head end (1120) where the same type of interpretation and routing process can occur.

In the same manner, the invention's methods may also be used to digitally transmit upstream RF channel data. Here the remote CMTS/CMRTS/DOFN, upon receiving the upstream RF channel data, can digitally sample the RF channel data, producing a plurality of digitized waveform data. This can also be encapsulated into a plurality of Ethernet frames or other digital transmission frames, and also transmitted upstream, over optical fiber (222) to the virtual head end (1120) where again this data may be interpreted and routed as appropriate.

Note that often upstream data may consist, at least in part; of various types of instructions for the HFC head end (for example, see FIGS. 20-23). Here to interpret these instructions, the virtual head end, usually using the controller (1102) and controller software (e.g. virtual CCAP controller software) can, while still operating in the digital domain, interpret these various instructions and act on them without the need to reconstitute the original RF waveforms originally used to transmit RF upstream data over the cable (226). Other types of upstream data, such as DOCSIS IP data, and the like, can also be handled by the controller (1102) and edge router (1104) and directed to the desired destination, again keeping entirely to the digital domain during this process. Thus the virtual head end (1120) can operate entirely in the digital domain, as desired. The invention's remote CMTS/CMRTS/DOFN/Gainspeed EtherNodes can handle the "dirty work" of converting between the digital domain of the virtual CCAP head end and optical fiber portion of the HFC system, and the RF waveforms of the cable portion of the HFC system, where many legacy waveforms, including even pure analog RF waveforms such as NTSC video channels and the like, can continue to exist. Thus from the customer standpoint (cable modems and other customer premises equipment), any changes caused this radically redesigned HFC system can be partially or completely transparent. At the same time, the HFC cable operator has greater freedom to optimize the performance of the HFC system, and introduce new or improved services as desired. Any breaking of backward compatibility for customer equipment can thus be done only when desired by the cable operator and/or customers.

The invention's remote CMTS/CMRTS/DOFN/Gainspeed EtherNodes can also be configured to help the virtual converged cable access program manage cable service rules and other cable management functions as well. For example, the remote CMTS/CMRTS/DOFN units can detect a cable modem, and transmit notification of this cable modem detection via the edge router to the system's virtual CCAP controller. The virtual CCAP controller and edge router can then create an appropriate entry into a configuration database, and instruct the remote CMTS/CMRTS/DOFN units to acknowledge this cable modem. The system can optionally also transmit various service rules to the remote CMTS/CMRTS/DOFN units to assist in helping control the amount and type of data relayed between the cable modem and the operator servers as needed. Such service rules can include rules such as VLAN rewrite rules, password identification, password remote destination, or Quality of service rules.

Additionally, the remote CMTS/CMRTS/DOFN/Gainspeed EtherNodes can also be configured to work with the virtual CCAP controller to manage the process of bringing cable modem and customer premises equipment online to the HFC cable network. This process can include coordinating with the virtual CCAP controller to further implement various dynamic host configuration (DHCP) relay and edge router program interface protocols as needed. The remote CMTS/CMRTS/DOFN/Gainspeed Ethernodes may be further configured to manage a plurality of Cable Radiofrequency and DOCSIS functions, such as RF modulation, MAC/PHY, encryption, scheduling, and the like.

In some embodiments, the virtual head end may transmit at least one downstream QAM channel over the optical fiber as a plurality of QAM constellation symbols. For example, this may be done by encapsulating these QAM constellation symbols into a plurality of Ethernet frames or other digital transmission format frames, and the virtual head end can then digitally transmit these Ethernet frames or other digital transmission format frames over the optical fiber to the remote CMTS/CMRTS/DOFN/Gainspeed Ethernodes. In this embodiment, the remote CMTS/CMRTS/DOFN/Gainspeed Ethernodes may be configured to receive these Ethernet frames (or other digital transmission format claims), extract these downstream QAM constellation symbols, and use these extracted downstream video QAM constellation symbols to modulate at least one remote CMTS/CMRTS/DOFN/Gainspeed Ethernode QAM modulator (which may be implemented by the invention's FPGA/DSP methods), thus producing downstream QAM RF signals. These remote CMTS/CMRTS/DOFN/Gainspeed Ethernode units can then transmit these downstream QAM modulated RF signals further downstream over the neighborhood CATV cables. All types of QAM channels may be transmitted using these methods, including various combinations of video QAM channels, video Edge-QAM channels, and/or IP-QAM channels.

Other Transport Stream Methods

One of the biggest strengths of the invention is that the remotely programmable FPGA/DSP based optical fiber nodes (remote CMTS fiber nodes, CMRTS) can be readily reconfigured to cope with a variety of different bit streams. For example, in some embodiments, the CMRTS units may be configured to handle various MPEG transport stream methods (MPEG-TS). This is a media container format, specified at least in part under ISO/ICE standard 13818-1 and/or ITU-T Recommendation H.222.0.

In some embodiments, Forward Error Correction (FEC) may be applied to this multi-program transport stream, and the FEC forward error correction map encoded bit stream handling the MPEG transport stream can then be sent over the optical fiber to the CMRTS units. The CMRTS units FPGA/DSP systems can be software configured to take this data, add additional PHY layer framing, and reform the bit stream (or IP packets containing the bit stream) into MPEG frames at the CMRTS node. The CMRTS can then RF modulate these reformatted MPEG frames (such as by mapping the reformatted MPEG frames into QAM symbols and then transmitting the appropriate RF QAM waveforms) and transmit them over the various neighborhood CATV cables for subsequent viewing by digital television type customer premises equipment.

Indeed, the invention also allows the CMRTS FPGA/DSP components to be software reconfigured to handle essentially any standard, non-standard, proprietary or non-proprietary bit stream format, and (for example) also convert them to standard MPEG frames as desired.

In this regard, note that although Ethernet protocols have been most frequently cited in this specification as a good example of one bit stream transport protocol or format, other framing methods, such as synchronous optical networking (SONET), Synchronous Digital Hierarchy (SDH) and the like may be used. Examples of the SONET format may be found in *Telcordia GR-253-CORE, Synchronous Optical Network (SONET) Transport Systems: Common Generic Criteria* (*October* 2009). *Issue* 5 and elsewhere.

Indeed, the CMRTS may be configured so that they can convert data from one format/framework to a DOCSIS format/framework. For example, MPEG or DOCSIS data may be transmitted over the optical fiber using the SONET format, and then converted back to the MPEG or DOCSIS format/framework at the CMRTS unit, and then transmitted over the cable portion of the HFC network in standard MPEG and/or DOCSIS format.

Similarly, all DOCSIS processing need not be either all at the head end, or all at the CMRTS optical fiber node. Instead there may be shared or partial DOCSIS processing, or alternatively partitioned DOCSIS processing, between the head end (which may be a cloud based head end) and the CMRTS optical fiber node.

Thus downstream information may be digitally transported in various unprocessed or partially processed forms. In some embodiments, the information may be also transmitted with side information to enable partial RF spectrum or full RF spectrum QAM synthesis. Similarly, additional side information may be digitally transported by the CMRTS units to enable various types of upstream signal pre-processing as well as burst acquisition.

As previously discussed, the CMRTS may be configured to generate various types of RF waveforms for the CATV cable. These waveforms can include the previously discussed QAM waveforms, typically modulated according to ITU-T Recommendations J.83 annex A, B or C. Other types of waveforms can include other single-carrier Modulation or orthogonal multi-carrier modulation such as OFDM, CDMA, Wavelets and so on.

HFC Clock Distribution and Synchronization Methods

HFC networks require precise time synchronization to operate. Here for example, a master time clock, generally a 10.24 MHz clock, is often kept at the head end CMTS, or at least at a higher level hub, and used to synchronize signals sent by various HFC system components.

In some embodiments, the invention's CMRTS units may be configured to do their own DOCSIS time stamp insertion. This may be done with the assistance of various time synchronization methods, such as the IEEE-1588 precision time protocol, or by other methods. Thus the CMRTS units can, depending upon operating mode desired, be configured to act as either timing master or slave units for both DOCSIS and MPEG time stamp purposes.

Thus the CMRTS time stamp can have either a clock slaved to the head end clock, or alternatively create their own independently generated clock signals. At the CMRTS, time stamps can thus be derived, generated, inserted or modified at the CMRTS optical fiber node.

These flexible time synchronization methods can also be used to for CMRTS node based time alignment for various purposes, such as to derive DOCSIS timing to process upstream DOCSIS channels and upstream DOCSIS bursts. In general, using CMRTS node based time synchronization can be used to help better control both upstream and downstream signal timing, and to better process upstream signals.

Thus in some embodiments, the remote CMTS fiber nodes may be configured with a time clock that can be either slaved to a master head end time clock, or which can be an independent CMRTS time clock. These remote CMTS fiber nodes may be further configured to either insert or modify DOCSIS or MPEG time stamps on the various types of HFC data that is processed and transported by the remote CMTS fiber nodes.

The invention claimed is:

1. A remote CMTS fiber node (CMRTS) system for a Hybrid Fiber Cable (HFC) network, the remote CMTS fiber node comprising:
at least one optical to electrical converter for converting optically transmitted RF waveforms received from a first optical fiber medium to first set of downstream CATV RF waveforms;
at least one software controllable radio frequency (RF) modulator device;
at least one software controllable switch remotely configured to (i) select a set of digitally encoded optical signals received from a second optical fiber medium and (ii) direct the at least one software controllable RF modulator device to encode said selected set of digitally encoded optical signals into a second set of downstream CATV RF waveforms;
wherein said at least one software controllable RF modulator device, and/or said software controllable switch comprise at least one software configurable field programmable gate array (FPGA) and at least one digital signal processor (DSP) configured to implement Media Access Control (MAC) and physical layer (PHY) operations;
wherein said at least one software controllable switch and said RF modulator device are controlled by a remote virtual shelf manager system that comprises at least one virtual CCAP controller and at least one edge router.

2. The system of claim 1, wherein said at least one FPGA device is configured using FPGA configuration data that is either stored in memory at said remote CMTS fiber node, or downloaded from said remote virtual shelf manager system, wherein said at least one DSP device is programmed using DSP software that is either stored in memory at said remote CMTS fiber node, or downloaded from said remote virtual shelf manager system.

3. The system of claim 2, wherein said at least one FPGA device and at least one DSP device are configured to implement a filter bank type RF modulator and transmitter.

4. The system of claim 2, wherein said at least one FPGA and DSP devices are configured to produce QAM or CDMA or OFDM waveforms, and said second set of RF waveforms are QAM or CDMA or OFDM waveforms.

5. The system of claim 2, wherein said software configurable RF modulator device is further configured to implement an RF modulator and transmitter that pre-distorts or customizes said second set of RF waveforms to correct for RF signal impairments in CATV cables of said HFC network, wherein said at least one FPGA and DSP devices are further configured to implement at least one receiver with the capability to equalize or adjust said CATV upstream RF signals to correct for RF signal impairments in CATV cables of said HFC network.

6. The system of claim 1, wherein said at least one FPGA and DSP devices are further configured to implement at least one filter bank receiver and/or at least one superheterodyne receiver.

7. The system of claim 1, in which the virtual shelf manager system comprises a device configuration database with at least CMRTS identifier fields, cable modem identification data fields, the privileges of users associated with said cable modem identification fields (user privilege fields), available DOCSIS channels, available IP addresses, instructions to configure said at least one software controllable switch, and instructions to configure said remotely software controllable RF packet processor;
at least one processor; and
hardware and software capable of sending and receiving data packets to and from a plurality of remote CMRTS units.

8. The system of claim 7, in which said virtual shelf manager system sends data packets to said software controllable switch to detect upstream cable modem identification data transmitted by at least one newly initialized cable modem and transmit said modem identification data to said remote virtual shelf manager system.

9. The system of claim 7, in which said device configuration database additionally comprises a plurality of FPGA configuration data and DSP program data, and wherein at least some of said FPGA configuration data and DSP program data are downloaded from said remote virtual shelf manager system to said remote CMTS fiber node.

10. The system of claim 7, in which said virtual shelf manager system is implemented at least in part by a virtual CCAP controller and virtual CCAP software portion of a virtual converged cable access platform system.

11. The system of claim 1, wherein said remote CMTS fiber node is further configured to implement at least one of:

A: a RF digital reconstitution device configured to accept digital samples of downstream RF waveforms digitally transmitted downstream over the optical fiber, and to reconstitute these digital samples into one or more downstream digitally reconstituted RF channels;

B: a RF remodulator device configured to accept downstream digital QAM symbols transmitted over the optical fiber, and remodulate these QAM symbols into one or more downstream QAM symbol remodulated RF QAM channels;

C: an IP to QAM conversion device configured to accept downstream digital IP data packets transmitted over the optical fiber, and to modulate these digital IP data packets into one or more downstream IP based RF QAM channels; and a RF combiner device configured to combine any of said digitally reconstituted RF channels, QAM symbol remodulated RF QAM channels and said IP based RF QAM channels, and transmit said channels downstream over said CATV cable.

12. The system of claim 1, wherein said remote CMTS fiber node is further configured to implement at least one of:

D: a RF digital converter device configured to accept upstream RF waveforms transmitted over said CATV cable, and digitize said upstream RF waveforms, thereby producing digitally encoded upstream RF channel data;

E: a RF demodulator device configured to accept upstream RF QAM channels transmitted over said CATV cable, and demodulate said RF QAM channels producing upstream digital QAM symbols;

F: a QAM to IP conversion device configured to accept upstream digital IP data packets transmitted by upstream QAM RF channels over said CATV cable, and extract said upstream digital IP data packets, thus producing upstream digital IP packets; and a digital data to optical converter device configured to combine any of said digitally encoded upstream RF channel data, upstream digital QAM symbols, and upstream digital IP packets and transmit said data, symbols, and packets digitally upstream over sad optical fiber.

13. The system of claim 1, wherein said remote CMTS fiber node is connected to said at least one edge router by at least one optical fiber;

wherein said virtual CCAP controller is configured to interface with legacy operator servers or systems using at least one of simple network management protocol (SNMP), internet protocol detail record (IPDR), packet cable multimedia (PCMM), Network Configuration Protocol (NETCONF), or command line interface (CLI) protocol;

wherein said virtual CCAP controller comprises at least one processor, memory, and virtual CCAP software configured to run on said at least one processor, and to issue commands to said edge router to either:

1: interface with legacy operator servers or systems using at least one of simple network management protocol (SNMP), internet protocol detail record (IPDR), packet cable multimedia (PCMM), Network Configuration Protocol (NETCONF), or command line interface (CLI) protocol; or 2: issue commands to said remote CMTS fiber node to manage the process of bringing cable modem and customer premises equipment online to said HFC cable network, and to further implement dynamic host configuration (DHCP) relay and edge router program interface protocols.

14. The system of claim 1, wherein all non-HFC-maintenance data ultimately carried by either said CATV RF downstream or said CATV RF upstream signals are transmitted over said HFC optical fiber to and from said remote CMTS fiber nodes by said second optical fiber medium, and no non-HFC-maintenance data are transmitted over said HFC optical fiber by said first optical fiber medium.

15. The system of claim 1, wherein said remote CMTS fiber nodes are configured with a time clock that can be either slaved to a master head end time clock, or which can be an independent CMRTS time clock; and wherein said remote CMTS fiber nodes are further configured to either insert or modify DOCSIS or MPEG time stamps on data processed by said remote CMTS fiber node.

16. The system of claim 1, wherein the at least one software controllable RF modulator device and the at least one software controllable switch implements a upstream packet processor and a downstream packet processor.

17. The system of claim 1, wherein said upstream packet processor is configured to (i) detect upstream data carried by cable television (CATV) RF upstream signals generated by at least one cable modem, (ii) digitally repackage the upstream data, and (iii) retransmit the upstream data as an upstream digital optical fiber signal.

18. The system of claim 1, wherein the first and second optical fiber mediums are different wave lengths of a same optical fiber.

19. The system of claim 1, wherein the first and second optical fiber mediums are different optical fibers.

20. A method for transmitting downstream data over a Hybrid Fiber Cable (HFC) network, said method comprising:

at a CMTS fiber node (CMRTS), converting optically transmitted RF waveforms received from a first optical fiber medium to first set of downstream CATV RF waveforms; and extracting a set of digitally encoded optical signals received from a second optical fiber medium and modulating a second set of downstream CATV RF waveforms according to said extracted set of digitally encoded optical signals, wherein a field programmable gate array (FPGA) device and a digital signal processor (DSP) device in the CMTS fiber node are configured to (i) implement said extracting and modulating and (ii) implement MAC and PHY functionality, wherein the FPGA and DSP are controlled by a remote virtual shelf manager system that comprises at least one virtual CCAP controller and at least one edge router.

21. The method of claim 20, further comprising:

at said remote CMTS fiber node, receiving upstream RF QAM channel data and demodulating said at least one upstream RF QAM channel into a plurality of upstream QAM constellation symbols;

encapsulating said plurality of upstream QAM constellation symbols into a plurality of Ethernet frames or other digital transmission format frames; and using said second optical fiber medium to digitally transmit said plurality of Ethernet frames or other digital transmission format frames upstream to a cable head end.

22. The method of claim 20, wherein said all non-HFC-maintenance data ultimately carried by either the CATV RF cable downstream or the CATV RF cable upstream signals are transmitted over said HFC optical fiber either to or from said head end to said remote CMTS fiber nodes by said second optical fiber medium, and no non-HFC-maintenance data are transmitted over said HFC optical fiber by the first optical fiber medium.

23. The method of claim 20, wherein the DSP and the FPGA are configured and controlled by a remote virtual shelf manager system.

24. The method of claim 20, wherein said digitally encoded optical signals comprises a plurality of QAM constellation symbols encapsulated into a plurality of Ethernet frames or other digital transmission format frames, wherein the FPGA and the DSP use said downstream video QAM constellation symbols to modulate at least one DOFN QAM modulator, thus producing downstream QAM RF signals.

25. The method of claim 20, wherein the first and second optical fiber mediums comprise different wave lengths of a same optical fiber.

26. The method of claim 20, wherein the first and second optical fiber mediums are different optical fibers.

* * * * *